(12) United States Patent
Golla et al.

(10) Patent No.: US 7,023,840 B2
(45) Date of Patent: Apr. 4, 2006

(54) MULTISERVER SCHEDULING SYSTEM AND METHOD FOR A FAST SWITCHING ELEMENT

(75) Inventors: Prasad N. Golla, Plano, TX (US); Gerard Damm, Dallas, TX (US); John Blanton, Dallas, TX (US); Mei Yang, Richardson, TX (US); Dominique Verchere, Plano, TX (US); Hakki Candan Cankaya, Dallas, TX (US); Yijun Xiong, Plano, TX (US)

(73) Assignee: Alcatel, Paris (FR)

( * ) Notice: Subject to any disclaimer, the term of this patent is extended or adjusted under 35 U.S.C. 154(b) by 943 days.

(21) Appl. No.: 10/059,641

(22) Filed: Jan. 28, 2002

(65) Prior Publication Data

US 2002/0176431 A1 Nov. 28, 2002

Related U.S. Application Data

(60) Provisional application No. 60/269,688, filed on Feb. 17, 2001.

(51) Int. Cl.
*H04L 12/56* (2006.01)
*G06F 13/00* (2006.01)

(52) U.S. Cl. ............. 370/360; 370/412; 370/422; 370/395.4; 709/238; 710/38

(58) Field of Classification Search ............... 370/229, 370/230, 360, 395.4, 395.21, 397, 399, 400, 370/422, 463, 419; 709/238; 710/38
See application file for complete search history.

(56) References Cited

U.S. PATENT DOCUMENTS 6,747,971 B1 * 6/2004 Hughes et al. ............ 370/387

| | | | |
|---|---|---|---|
| 6,848,017 B1 * | 1/2005 | MacEachern et al. ....... | 710/317 |
| 6,865,154 B1 * | 3/2005 | Charny et al. ............... | 370/235 |
| 2001/0050916 A1 * | 12/2001 | Krishna et al. ............. | 370/419 |

FOREIGN PATENT DOCUMENTS

WO WO 99/40754 8/1999

(Continued)

OTHER PUBLICATIONS

Feihong Chen, Necdet Uzun, Ali N. Akansu; A Scalable Multicast ATM Switch Using Link Sharing and Prioritized Link Reservation; Computer Communications and Networks, 1999; Proceedings; Oct. 11-13, 1999, pp. 218-222.

(Continued)

*Primary Examiner*—Afsar Qureshi
(74) *Attorney, Agent, or Firm*—Danamraj & Youst; Craig A. Hoersten; V. Lawrence Sewell

(57) ABSTRACT

A scheduling system and methodology for use in a network switch element having multiserver, multiple-arbiter architecture. Ingress ports and egress ports coupled to the cross-connect fabric of the network element are provided with multiple ingress and egress arbiters, respectively, for effectuating an iterative arbitration strategy such as RGA or RG. Arbiter architectures include singe-arbiter-per-port; single-arbiter-per-server; multiple-arbiters-per-port; and multiple-arbiters-per-server arrangements, wherein the arbiters can be implemented using RRA, BTA, Flexible Ring, or any other arbiter technology. Depending on the iteration strategy, ingress arbiter architecture and egress arbiter architecture, a variety of iterative, multiserver-capable scheduling algorithms can be obtained, which scheduling algorithms can also be implemented in QoS-aware network nodes.

59 Claims, 33 Drawing Sheets

FOREIGN PATENT DOCUMENTS

WO     WO 00/38375     6/2000

OTHER PUBLICATIONS

Pankaj Gupta and Nick McKeown; Designing and Implementing a Fast Crossbar Scheduler; IEEE Micro, IEEE, Inc., vol. 19, No. 1, Jan. 1999, pp. 20-28.

Rainer Schoenen and Roman Hying; Distributed Cell Scheduling Algorithms for Virtual-Output-Queued Swithces; 1999 IEEE Global Telecommunications Conference; Globecom '99; Seamless Interconnection for Universal Services; vol. 2, Dec. 5-9, 1999, pp. 1211-1215.

\* cited by examiner

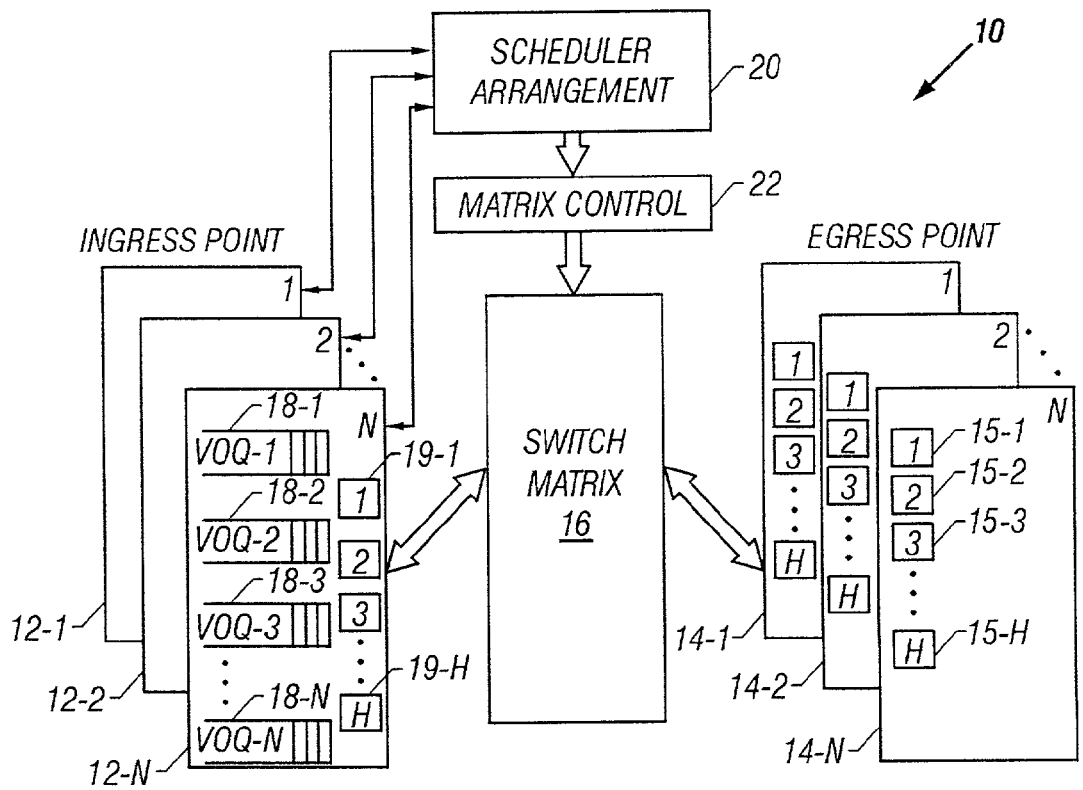
FIG. 1
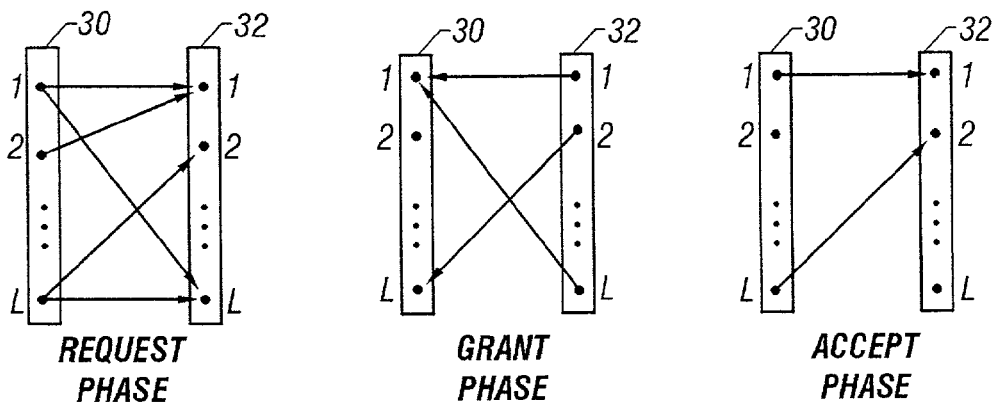
FIG. 2A  REQUEST PHASE
FIG. 2B  GRANT PHASE
FIG. 2C  ACCEPT PHASE
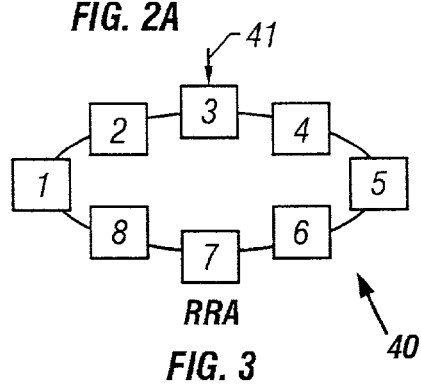
RRA
FIG. 3
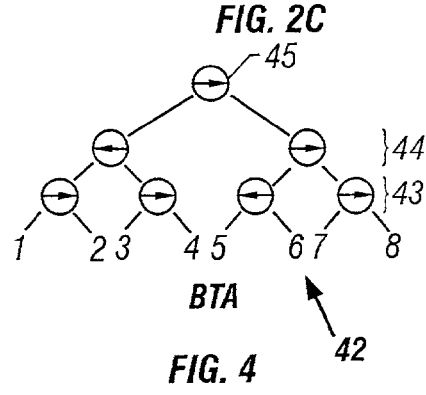
BTA
FIG. 4

Iteration 1

| | Requests out | | | Grants out | | | Accepts out | | | Schedule out | | |
|---|---|---|---|---|---|---|---|---|---|---|---|---|
| in | 2 | 2 | 4 | 1 | 2 | 1 | 1 | 1 | 0 | 1 | 1 | 0 |
| | 2 | 3 | 1 | 1 | 0 | 1 | 1 | 0 | 1 | 1 | 0 | 1 |
| | 2 | 0 | 3 | 0 | 0 | 0 | 0 | 0 | 0 | 0 | 0 | 0 |

*Iteration 1*

| Requests | Grants | Schedule | out · out · out

|     | 1 | 1 | 0 |
| --- | - | - | - |
| in  | 1 | 0 | 1 |
|     | 0 | 0 | 2 |

|     | 1 | 1 | 0 |
| --- | - | - | - |
| in  | 1 | 0 | 1 |
|     | 0 | 0 | 1 |

|     | 1 | 1 | 0 |
| --- | - | - | - |
| in  | 1 | 0 | 1 |
|     | 0 | 0 | 1 |

Iteration 2

| Requests out | Grants out | Schedule out |
|---|---|---|
| (see figure) | (see figure) | (see figure) |

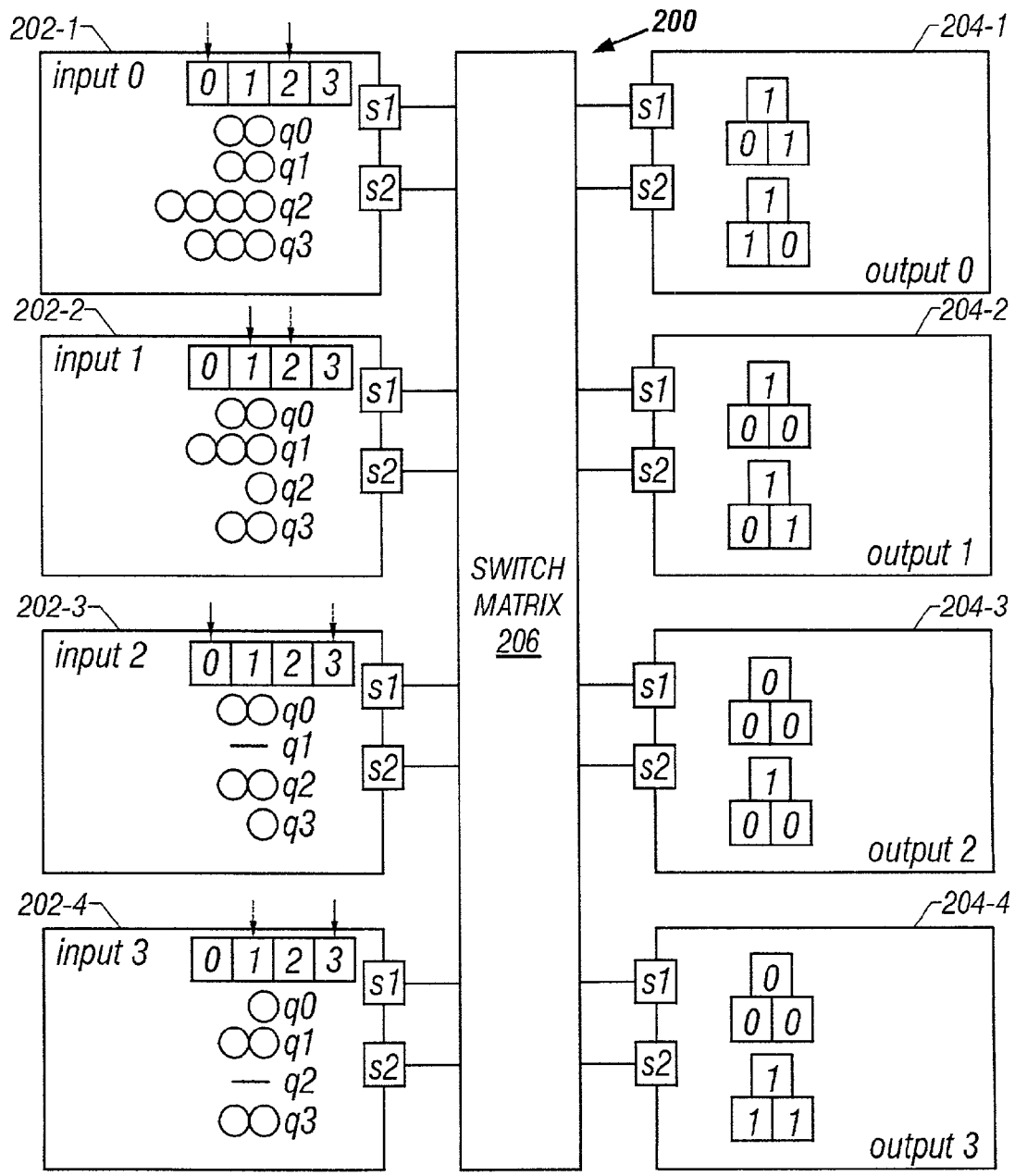

| input port 1 VOQs | | | input port 2 VOQs | | | input port 3 VOQs | | | input port 4 VOQs | | |
|---|---|---|---|---|---|---|---|---|---|---|---|
| k | R | P | k | R | P | k | R | P | k | R | P |
| 1 | 1 | 2 | 1 | - | - | 1 | 2 | 0 | 1 | 1 | 1 |
| 2 | 2 | 0 | 2 | - | - | 2 | - | - | 2 | - | - |
| 3 | 1 | 1 | 3 | 1 | 3 | 3 | - | - | 3 | - | - |
| 4 | - | - | 4 | 1 | 1 | 4 | - | - | 4 | - | - |

| k | R | P | k | R | P | k | R | P | k | R | P |
|---|---|---|---|---|---|---|---|---|---|---|---|
| 1 | - | - | 1 | - | - | 1 | 3 | 0 | 1 | - | - |
| 2 | 1 | 4 | 2 | - | - | 2 | - | - | 2 | - | - |
| 3 | 1 | 1 | 3 | 3 | 2 | 3 | - | - | 3 | - | - |
| 4 | 1 | 2 | 4 | - | - | 4 | - | - | 4 | 1 | 4 |

| k | R | P | k | R | P | k | R | P | k | R | P |
|---|---|---|---|---|---|---|---|---|---|---|---|
| 1 | - | - | 1 | - | - | 1 | 2 | 0 | 1 | - | - |
| 2 | 1 | 4 | 2 | - | - | 2 | - | - | 2 | 1 | 0 |
| 3 | 2 | 0 | 3 | - | - | 3 | - | - | 3 | - | - |
| 4 | 3 | 1 | 4 | 1 | 1 | 4 | - | - | 4 | - | - |

| k | R | P | k | R | P | k | R | P | k | R | P |
|---|---|---|---|---|---|---|---|---|---|---|---|
| 1 | 1 | 1 | 1 | - | - | 1 | 5 | 0 | 1 | - | - |
| 2 | - | - | 2 | - | - | 2 | - | - | 2 | - | - |
| 3 | 1 | 0 | 3 | 1 | 2 | 3 | - | - | 3 | 1 | 2 |
| 4 | - | - | 4 | 4 | 1 | 4 | - | - | 4 | - | - | k: priority level (external QoS-related priority)
R: number of requests (chosen by L1 scheduler)
P: subpriority (internal priority, chosen by L1 scheduler)

*FIG. 22*

| initial requests matrices | subpriorities matrices | phase 1 matrices | phase 2 matrices (acquired matchings) |
|---|---|---|---|

R[1]

| 1 | - | - | 1 |
|---|---|---|---|
| - | - | - | - |
| 2 | 3 | 2 | 5 |
| 1 | - | - | - |

P[1]

| 2 | - | - | 1 |
|---|---|---|---|
| - | - | - | - |
| 0 | 0 | 0 | 0 |
| 1 | - | - | - |

IR[1]

| 1 | - | - | 1 |
|---|---|---|---|
| - | - | - | - |
| 1 | 1 | 1 | 1 |
| 1 | - | - | - |

IM[1]

| 1 | - | - | 1 |
|---|---|---|---|
| - | - | - | - |
| 1 | 1 | 1 | 1 |
| 1 | - | - | - |

R[2]

| 2 | 1 | 1 | - |
|---|---|---|---|
| - | - | - | - |
| - | - | - | - |
| - | - | 1 | - |

P[2]

| 0 | 4 | 4 | - |
|---|---|---|---|
| - | - | - | - |
| - | - | - | - |
| - | - | 0 | - |

IR[2]

| - | 1 | 1 | - |
|---|---|---|---|
| - | - | - | - |
| - | - | - | - |
| - | - | 1 | - |

IM[2]

| - | 1 | 1 | - |
|---|---|---|---|
| - | - | - | - |
| - | - | - | - |
| - | - | 1 | - |

R[3]

| 1 | 1 | 2 | 1 |
|---|---|---|---|
| 1 | 3 | - | 1 |
| - | - | - | - |
| - | - | - | 1 |

P[3]

| 1 | 1 | 1 | 0 |
|---|---|---|---|
| 3 | 2 | - | 2 |
| - | - | - | - |
| - | - | - | 2 |

IR[3]

| - | - | - | - |
|---|---|---|---|
| 1 | 2 | - | 1 |
| - | - | - | - |
| - | - | - | 1 |

IM[3]

| - | - | - | - |
|---|---|---|---|
| 1 | 2 | - | 1 |
| - | - | - | - |
| - | - | - | 1 |

R[4]

| - | 1 | 3 | - |
|---|---|---|---|
| 1 | - | 1 | 4 |
| - | - | - | - |
| - | 1 | - | - |

P[4]

| - | 2 | 1 | - |
|---|---|---|---|
| 1 | - | 1 | 1 |
| - | - | - | - |
| - | 4 | - | - |

IR[4]

| - | - | - | - |
|---|---|---|---|
| - | - | - | - |
| - | - | - | - |
| - | 1 | - | - |

IM[4]

| - | - | - | - |
|---|---|---|---|
| - | - | - | - |
| - | - | - | - |
| - | - | - | - |

G

| 1 | 1 | 1 | 1 |
|---|---|---|---|
| 1 | 2 | - | 1 |
| 1 | 1 | 1 | 1 |
| 1 | - | 1 | 1 |

*FIG. 23A* initial requests matrices | subpriorities matrices | iteration 1 phase 1 matrices | iteration 1 phase 2 matrices | end of iteration 1 total

R[1]

| 1 | - | - | 1 |
|---|---|---|---|
| - | - | - | - |
| 2 | 3 | 2 | 5 |
| 1 | - | - | - |

P[1]

| 2 | - | - | 1 |
|---|---|---|---|
| - | - | - | - |
| 0 | 0 | 0 | 0 |
| 1 | - | - | - |

IR[1]

| 1 | - | - | - |
|---|---|---|---|
| - | - | - | - |
| - | - | 2 | 1 |
| 1 | - | - | - |

IM[1]

| 1 | - | - | - |
|---|---|---|---|
| - | - | - | - |
| - | - | 2 | 1 |
| - | - | - | - |

G[1]

| 1 | - | - | - |
|---|---|---|---|
| - | - | - | - |
| - | - | 2 | 1 |
| - | - | - | - |

R[2]

| 2 | 1 | 1 | - |
|---|---|---|---|
| - | - | - | - |
| - | - | - | - |
| - | - | 1 | - |

P[2]

| 0 | 4 | 4 | - |
|---|---|---|---|
| - | - | - | - |
| - | - | - | - |
| - | - | 0 | - |

IR[2]

| - | - | - | - |
|---|---|---|---|
| - | - | - | - |
| - | - | - | - |
| - | - | - | - |

IM[2]

| - | - | - | - |
|---|---|---|---|
| - | - | - | - |
| - | - | - | - |
| - | - | - | - |

G[2]

| - | - | - | - |
|---|---|---|---|
| - | - | - | - |
| - | - | - | - |
| - | - | - | - |

R[3]

| 1 | 1 | 2 | 1 |
|---|---|---|---|
| 1 | 3 | - | 1 |
| - | - | - | - |
| - | - | - | 1 |

P[3]

| 1 | 1 | 1 | 0 |
|---|---|---|---|
| 3 | 2 | - | 2 |
| - | - | - | - |
| - | - | - | 2 |

IR[3]

| - | - | - | - |
|---|---|---|---|
| 1 | - | - | - |
| - | - | - | - |
| - | - | - | - |

IM[3]

| - | - | - | - |
|---|---|---|---|
| - | - | - | - |
| - | - | - | - |
| - | - | - | - |

G[3]

| - | - | - | - |
|---|---|---|---|
| - | - | - | - |
| - | - | - | - |
| - | - | - | - |

R[4]

| - | 1 | 3 | - |
|---|---|---|---|
| 1 | - | 1 | 4 |
| - | - | - | - |
| - | 1 | - | - |

P[4]

| - | 2 | 1 | - |
|---|---|---|---|
| 1 | - | 1 | 1 |
| - | - | - | - |
| - | 4 | - | - |

IR[4]

| - | - | - | - |
|---|---|---|---|
| - | - | - | - |
| - | - | - | - |
| - | - | - | - |

IM[4]

| - | - | - | - |
|---|---|---|---|
| - | - | - | - |
| - | - | - | - |
| - | - | - | - |

G[4]

| - | - | - | - |
|---|---|---|---|
| - | - | - | - |
| - | - | - | - |
| - | - | - | - |

G

| 1 | - | - | - |
|---|---|---|---|
| - | - | - | - |
| - | - | 2 | 1 |
| - | - | - | - |

FIG. 24A remaining requests matrices RR[1]

|   |   |   |   |
|---|---|---|---|
| - | - | - | 1 |
| - | - | - | - |
| 2 | 3 | - | 4 |
| 1 | - | - | - | subpriorities matrices P[1]

|   |   |   |   |
|---|---|---|---|
| - | - | - | 1 |
| - | - | - | - |
| 0 | 0 | - | 0 |
| 1 | - | - | - | iteration 2 phase 1 matrices IR[1]

|   |   |   |   |
|---|---|---|---|
| - | - | - | 1 |
| - | - | - | - |
| - | 1 | - | - |
| 1 | - | - | - | iteration 2 phase 2 matrices IM[1]

|   |   |   |   |
|---|---|---|---|
| - | - | - | 1 |
| - | - | - | - |
| - | 1 | - | - |
| 1 | - | - | - | end of iteration 2 total G[1]

|   |   |   |   |
|---|---|---|---|
| 1 | - | - | 1 |
| - | - | - | - |
| - | 1 | 2 | 1 |
| 1 | - | - | - |

RR[2]

|   |   |   |   |
|---|---|---|---|
| 2 | 1 | 1 | - |
| - | - | - | - |
| - | - | - | - |
| - | - | 1 | - |

P[2]

|   |   |   |   |
|---|---|---|---|
| 0 | 4 | 4 | - |
| - | - | - | - |
| - | - | - | - |
| - | - | 0 | - |

IR[2]

|   |   |   |   |
|---|---|---|---|
| - | - | - | - |
| - | - | - | - |
| - | - | - | - |
| - | - | - | - |

IM[2]

|   |   |   |   |
|---|---|---|---|
| - | - | - | - |
| - | - | - | - |
| - | - | - | - |
| - | - | - | - |

G[2]

|   |   |   |   |
|---|---|---|---|
| - | - | - | - |
| - | - | - | - |
| - | - | - | - |
| - | - | - | - |

RR[3]

|   |   |   |   |
|---|---|---|---|
| 1 | 1 | 2 | 1 |
| 1 | 3 | - | 1 |
| - | - | - | - |
| - | - | - | 1 |

P[3]

|   |   |   |   |
|---|---|---|---|
| 1 | 1 | 1 | 0 |
| 3 | 2 | - | 2 |
| - | - | - | - |
| - | - | - | 2 |

IR[3]

|   |   |   |   |
|---|---|---|---|
| - | - | - | - |
| 1 | - | - | - |
| - | - | - | - |
| - | - | - | - |

IM[3]

|   |   |   |   |
|---|---|---|---|
| - | - | - | - |
| - | - | - | - |
| - | - | - | - |
| - | - | - | - |

G[3]

|   |   |   |   |
|---|---|---|---|
| - | - | - | - |
| - | - | - | - |
| - | - | - | - |
| - | - | - | - |

RR[4]

|   |   |   |   |
|---|---|---|---|
| - | 1 | 3 | - |
| 1 | - | 1 | 4 |
| - | - | - | - |
| - | 1 | - | - |

P[4]

|   |   |   |   |
|---|---|---|---|
| - | 2 | 1 | - |
| 1 | - | 1 | 1 |
| - | - | - | - |
| - | 4 | - | - |

IR[4]

|   |   |   |   |
|---|---|---|---|
| - | - | - | - |
| - | - | - | - |
| - | - | - | - |
| - | - | - | - |

IM[4]

|   |   |   |   |
|---|---|---|---|
| - | - | - | - |
| - | - | - | - |
| - | - | - | - |
| - | - | - | - |

G[4]

|   |   |   |   |
|---|---|---|---|
| - | - | - | - |
| - | - | - | - |
| - | - | - | - |
| - | - | - | - |

G

|   |   |   |   |
|---|---|---|---|
| 1 | - | - | 1 |
| - | - | - | - |
| - | 1 | 2 | 1 |
| 1 | - | - | - |

FIG. 24B

| remaining requests matrices | subpriorities matrices | iteration 3 phase 1 matrices | iteration 3 phase 2 matrices | end of iteration 3 total |
|---|---|---|---|---|
| RR[1] | P[1] | IR[1] | IM[1] | G[1] |

| | | | | | | | | | | | | | | | | | | | | 1 | - | - | 1 |
|---|---|---|---|---|---|---|---|---|---|---|---|---|---|---|---|---|---|---|---|---|---|---|---|
| - | - | - | - | - | - | - | - | - | - | - | - | - | - | - | - | - | - | - | - | 1 | - | - | 1 |
| - | - | - | - | - | - | - | - | - | - | - | - | - | - | - | - | - | - | - | - | - | - | - | - |
| - | - | - | - | - | - | - | - | - | - | - | - | - | - | - | - | - | - | - | - | - | 1 | 2 | 1 |
| - | - | - | - | - | - | - | - | - | - | - | - | - | - | - | - | - | - | - | - | 1 | - | - | - |

| RR[2] | P[2] | IR[2] | IM[2] | G[2] |
|---|---|---|---|---|

| 2 | 1 | 1 | - | 0 | 4 | 4 | - | - | 1 | 1 | - | - | 1 | 1 | - | - | 1 | 1 | - |
|---|---|---|---|---|---|---|---|---|---|---|---|---|---|---|---|---|---|---|---|
| - | - | - | - | - | - | - | - | - | - | - | - | - | - | - | - | - | - | - | - |
| - | - | - | - | - | - | - | - | - | - | - | - | - | - | - | - | - | - | - | - |
| - | - | 1 | - | - | - | 0 | - | - | - | 1 | - | - | - | - | - | - | - | - | - |

| RR[3] | P[3] | IR[3] | IM[3] | G[3] |
|---|---|---|---|---|

| 1 | 1 | 2 | 1 | 1 | 1 | 1 | 0 | - | - | - | - | - | - | - | - | - | - | - | - |
|---|---|---|---|---|---|---|---|---|---|---|---|---|---|---|---|---|---|---|---|
| 1 | 3 | - | 1 | 3 | 2 | - | 2 | 1 | - | - | - | 1 | - | - | - | 1 | - | - | - |
| - | - | - | - | - | - | - | - | - | - | - | - | - | - | - | - | - | - | - | - |
| - | - | - | 1 | - | - | - | 2 | - | - | - | - | - | - | - | - | - | - | - | - |

| RR[4] | P[4] | IR[4] | IM[4] | G[4] |
|---|---|---|---|---|

| - | 1 | 3 | - | - | 2 | 1 | - | - | - | - | - | - | - | - | - | - | - | - | - |
|---|---|---|---|---|---|---|---|---|---|---|---|---|---|---|---|---|---|---|---|
| 1 | - | 1 | 4 | 1 | - | 1 | 1 | - | - | - | - | - | - | - | - | - | - | - | - |
| - | - | - | - | - | - | - | - | - | - | - | - | - | - | - | - | - | - | - | - |
| - | 1 | - | - | - | 4 | - | - | - | - | - | - | - | - | - | - | - | - | - | - |

G

| 1 | 1 | 1 | 1 |
|---|---|---|---|
| 1 | - | - | - |
| - | 1 | 2 | 1 |
| 1 | - | - | - |

FIG. 24C

| remaining requests matrices | subpriorities matrices | iteration 4 phase 1 matrices | iteration 4 phase 2 matrices | end of iteration 4 total |
|---|---|---|---|---|
| RR[1] | P[1] | IR[1] | IM[1] | G[1] |

| RR[1] | | | | P[1] | | | | IR[1] | | | | IM[1] | | | | G[1] | | | |
|---|---|---|---|---|---|---|---|---|---|---|---|---|---|---|---|---|---|---|---|
| - | - | - | - | - | - | - | - | - | - | - | - | - | - | - | - | 1 | - | - | 1 |
| - | - | - | - | - | - | - | - | - | - | - | - | - | - | - | - | - | - | - | - |
| - | - | - | - | - | - | - | - | - | - | - | - | - | - | - | - | - | 1 | 2 | 1 |
| - | - | - | - | - | - | - | - | - | - | - | - | - | - | - | - | 1 | - | - | - |

| RR[2] | | | | P[2] | | | | IR[2] | | | | IM[2] | | | | G[2] | | | |
|---|---|---|---|---|---|---|---|---|---|---|---|---|---|---|---|---|---|---|---|
| - | - | - | - | - | - | - | - | - | - | - | - | - | - | - | - | - | 1 | 1 | - |
| - | - | - | - | - | - | - | - | - | - | - | - | - | - | - | - | - | - | - | - |
| - | - | - | - | - | - | - | - | - | - | - | - | - | - | - | - | - | - | - | - |
| - | - | 1 | - | - | - | 0 | - | - | - | 1 | - | - | - | 1 | - | - | - | 1 | - |

| RR[3] | | | | P[3] | | | | IR[3] | | | | IM[3] | | | | G[3] | | | |
|---|---|---|---|---|---|---|---|---|---|---|---|---|---|---|---|---|---|---|---|
| - | - | - | - | - | - | - | - | - | - | - | - | - | - | - | - | - | - | - | - |
| - | 3 | - | 1 | 1 | 2 | - | 2 | - | 1 | - | 1 | - | 1 | - | 1 | 1 | 1 | - | 1 |
| - | - | - | - | - | - | - | - | - | - | - | - | - | - | - | - | - | - | - | - |
| - | - | - | 1 | - | - | - | 2 | - | - | - | - | - | - | - | - | - | - | - | - |

| RR[4] | | | | P[4] | | | | IR[4] | | | | IM[4] | | | | G[4] | | | |
|---|---|---|---|---|---|---|---|---|---|---|---|---|---|---|---|---|---|---|---|
| - | - | - | - | 2 | - | - | - | - | - | - | - | - | - | - | - | - | - | - | - |
| 1 | - | 1 | 4 | 1 | - | 1 | 1 | - | - | - | - | - | - | - | - | - | - | - | - |
| - | - | - | - | - | - | - | - | - | - | - | - | - | - | - | - | - | - | - | - |
| - | 1 | - | - | - | 4 | - | - | - | - | - | - | - | - | - | - | - | - | - | - |

G

| 1 | 1 | 1 | 1 |
|---|---|---|---|
| 1 | 1 | - | 1 |
| - | 1 | 2 | 1 |
| 1 | - | 1 | - |

| OUTPUT PORT | SLOT 0 A1 A2 | SLOT 1 A1 A2 | SLOT 2 A1 A2 |
|---|---|---|---|
| 0 | 0  1 | 1  2 | 2  3 |
| 1 | 1  2 | 2  3 | 3  0 |
| 2 | 2  3 | 3  0 | 0  1 |
| 3 | 3  0 | 0  1 | 1  2 |

FIG. 26

MULTISERVER SCHEDULING SYSTEM AND METHOD FOR A FAST SWITCHING ELEMENT

PRIORITY UNDER 35 U.S.C. §119(e) & 37 C.F.R. §1.78

This nonprovisional application claims priority based upon the following prior United States provisional patent application entitled: Multiserver Scheduling System And Method For A Fast Switching Element, Ser. No.: 60/269,688, filed Feb. 17, 2001, which is hereby incorporated by reference for all purposes.

BACKGROUND OF THE INVENTION

1. Technical Field of the Invention

The present invention generally relates to switching systems used in communications networks. More particularly, and not by way of any limitation, the present invention is directed to a scheduling system and method for use in a network switch element having a multiserver architecture.

2. Description of Related Art

Network communications technology is rapidly advancing in a direction in which the transmission speeds will continue to supersede the switching speeds. Accordingly, switching systems of the future will require the ability to accommodate data transfer rates in excess of 100 times what has been common until recently. For example, a switching system to be used in the core network (e.g., a core router) may have up to 512 input channels and 512 output channels, each with a data transmission rate of several gigabits per second. The ability to switch such high-speed traffic requires the use of advanced scheduling systems in conjunction with fast switching fabrics having very short time slots. Furthermore, it is expected that these concerns will become particularly acute in the deployment of the Next Generation Network (NGN) infrastructure where Quality of Service (QoS) will also be of critical importance.

Numerous approaches to implementing fast scheduling algorithms currently exist. Whereas these solutions are generally adequate with respect to the state-of-the-art switching system architectures, several deficiencies and shortcomings persist. First, the current scheduling techniques are amenable only with single-server-per-port arrangements wherein only one cell per port can be scheduled per time slot. Where multiple channels per port are available, e.g., optical switches or routers, such a limitation gives rise to inefficient use of the bandwidth provided by the switching fabric. Also, the switched units (i.e., cells) are typically required to be of fixed length, and the existing solutions do not allow aggregation of multiple cells into "bursts" for transmission across the switching fabric as single units. Furthermore, the scheduling algorithms of today are not capable of distinguishing between differentiated traffic levels imposed in accordance with a network's QoS management policy.

SUMMARY OF THE INVENTION

Accordingly, it should be appreciated that to make use of the availability of multiple channels per input port and to optimize the bandwidth provided by the switching fabric, multiple servers per input port and the aggregation of cells destined for the same output is required. The present invention advantageously provides a scheduling system and methodology for use in a network switch element having such a multiserver architecture. Preferably, the ingress ports and egress ports coupled to the cross-connect fabric of the network element are provided with multiple ingress and egress arbiters, respectively, for effectuating an iterative arbitration strategy such as the Request-Grant-Accept (RGA) strategy or the Request-Grant (RG) strategy.

Exemplary arbiter architectures include singe-arbiter-per-port; single-arbiter-per-server; multiple-arbiters-per-port; and multiple-arbiters-per-server arrangements, wherein the arbiters can be implemented using round robin arbiters (RRAs), binary tree arbiters (BTAs), or any other arbiter technology. The scheduling system and methodology of the present invention affords a generalized scheduler mechanism (also referred to as a "metascheduler") which can give rise, depending on the iteration strategy, ingress arbiter architecture and egress arbiter architecture, to a variety of iterative, multiserver-capable scheduling algorithms.

In one aspect, the present invention is directed to a network element having a switching apparatus for switching information between a plurality of ingress ports and a plurality of egress ports via a cross-connect matrix disposed therebetween. In a presently preferred exemplary embodiment of the present invention, each of the ingress ports is provided with a plurality of ingress servers, which ingress servers operate to serve a plurality of virtual output queues (VOQs) supported by the corresponding ingress port. A plurality of egress servers are associated with each of the egress ports also, wherein the egress servers operate to serve outgoing traffic supported by a corresponding egress port. At least one ingress arbiter is associated with each of the ingress ports and at least one egress arbiter is associated with each of the egress ports, wherein the ingress and egress arbiters are operable to effectuate a particular type of arbitration. A scheduler is operable to configure the cross-connect matrix for transporting one or more transmission units (e.g., fixed length cells, protocol data units or PDUs, variable packets, etc.) from at least one of the ingress ports to at least one of the egress ports during each time slot associated with the cross-connect matrix. Preferably, the scheduler effectuates a particular scheduling mechanism based at least in part upon an ingress arbiter architecture, an egress arbiter architecture and a predetermined arbitration iteration strategy.

In another aspect, the present invention is directed to a scheduling system for use in a QoS-aware network switching element having a cross-connect fabric disposed between a plurality of ingress ports and a plurality of egress ports. Each of the ingress ports is provided with a plurality of ingress servers and each of the egress ports is provided with a plurality of egress servers. Each ingress port supports a plurality of VOQ groups, wherein each VOQ group is classified into multiple sub-queues therein based on a QoS-related priority level. The scheduling system is comprised of a first level (L1) scheduler partition operable to generate requests associated with an arbitration iteration strategy used in computing matches between the ingress servers and the egress servers, wherein the requests are organized based on the QoS priority level. A second level (L2) scheduler partition is included as part of the scheduling system, which partition is operable in response to the requests assembled by the first level scheduler partition to generate a scheduling matrix at each slot time associated with the cross-connect fabric. The contents of the scheduling matrix, which are iteratively computed, identify the matches between at least a portion of the ingress servers and a portion of said egress servers.

In yet another aspect, the present invention is directed to a scheduling methodology for use in a network switching element (e.g., an optical router) having the architecture summarized hereinabove. For each matrix cycle associated with the cross-connect fabric of the switch element, the method initializes a scheduling matrix and a request matrix, wherein the request matrix includes requests generated in accordance with an arbitration iteration strategy used in computing maximal matches between the ingress servers and egress servers. Thereafter, an arbitration iteration is performed to obtain a current match matrix. The arbitration iteration implementation depends on the selected iteration strategy, ingress arbiter architecture and type, and egress arbiter architecture and type. Exemplary multiserver scheduling algorithms resulting from the permutations and combinations of such implementational aspects include: (i) Multiserver iterative SLIP (MSLIP); (ii) iterative Ping Pong (PP) using RGA (iPP-RGA); (iii) iterative Ping Pong using RG (iPP-RG); (iv) multiserver dual round robin (MDRR); (v) prioritized dual round robin (PDRR); and (vi) flexible ring dual round robin (FRDRR).

Upon completing the current iteration, the request matrix and the scheduling matrix are updated based on the current match matrix. Specifically, if all of the ingress servers associated with a particular ingress port are matched, requests issuing from that particular ingress port are removed from the request matrix. Also, if all of the egress servers associated with a particular egress port are matched, requests directed to that particular egress port are removed from the request matrix. Preferably, the current match matrix is reset and the next arbitration iteration is performed using the updated request matrix. The iterative process continues until a particular stop condition is encountered. Thereafter, the updated scheduling matrix is forwarded to a controller for configuring one or more connection paths in the cross-connect fabric based on the entries of the updated scheduling matrix so as to effectuate the transfer of transmission units between matched ingress and egress servers.

BRIEF DESCRIPTION OF THE DRAWINGS

A more complete understanding of the present invention may be had by reference to the following Detailed Description when taken in conjunction with the accompanying drawings wherein:

FIG. 1 depicts a high-level architectural block diagram of an exemplary switch element wherein the teachings of the present invention may be advantageously employed;

FIGS. 2A–2C depict the various phases of an iterative arbitration mechanism that may be implemented between ingress points and egress points of the exemplary switch element for effectuating therein a particular scheduling scheme in accordance with the teachings of the present invention;

FIG. 3 depicts an exemplary round robin arbiter (RRA) that may be implemented on the ingress side, the egress side, or both sides, of the switch element for operation with the iterative arbitration mechanism therebetween;

FIG. 4 depicts an exemplary binary tree arbiter (BTA) that may be implemented on the ingress side, the egress side, or both sides, of the switch element for operation with the iterative arbitration mechanism therebetween;

FIGS. 14A–14C illustrate the operation of an exemplary iterative Ping Pong (iPP) scheduling mechanism of the present invention wherein the Request-Grant-Accept (RGA) arbitration iteration strategy is used;

FIG. 22 depicts the ingress ports' initial state of an exemplary 4-server/4-port switch that is used for illustrating the monoselection and multiselection schemes of the present invention;

FIG. 23A illustrates the various iteration matrices involved in the first iteration of the exemplary monoselection scheme;

FIG. 24A–24D illustrate the various iteration matrices involved in four iterations of the exemplary multiselection scheme of the present invention;

FIG. 25 depicts an exemplary rotating pattern for desynchronizing the arbiters in a 4×4 switch; and FIG. 26 shows the initial state of two arbiters in each output port of the 4×4 switch for the first three time slots.

DETAILED DESCRIPTION OF THE DRAWINGS

Figure 5:
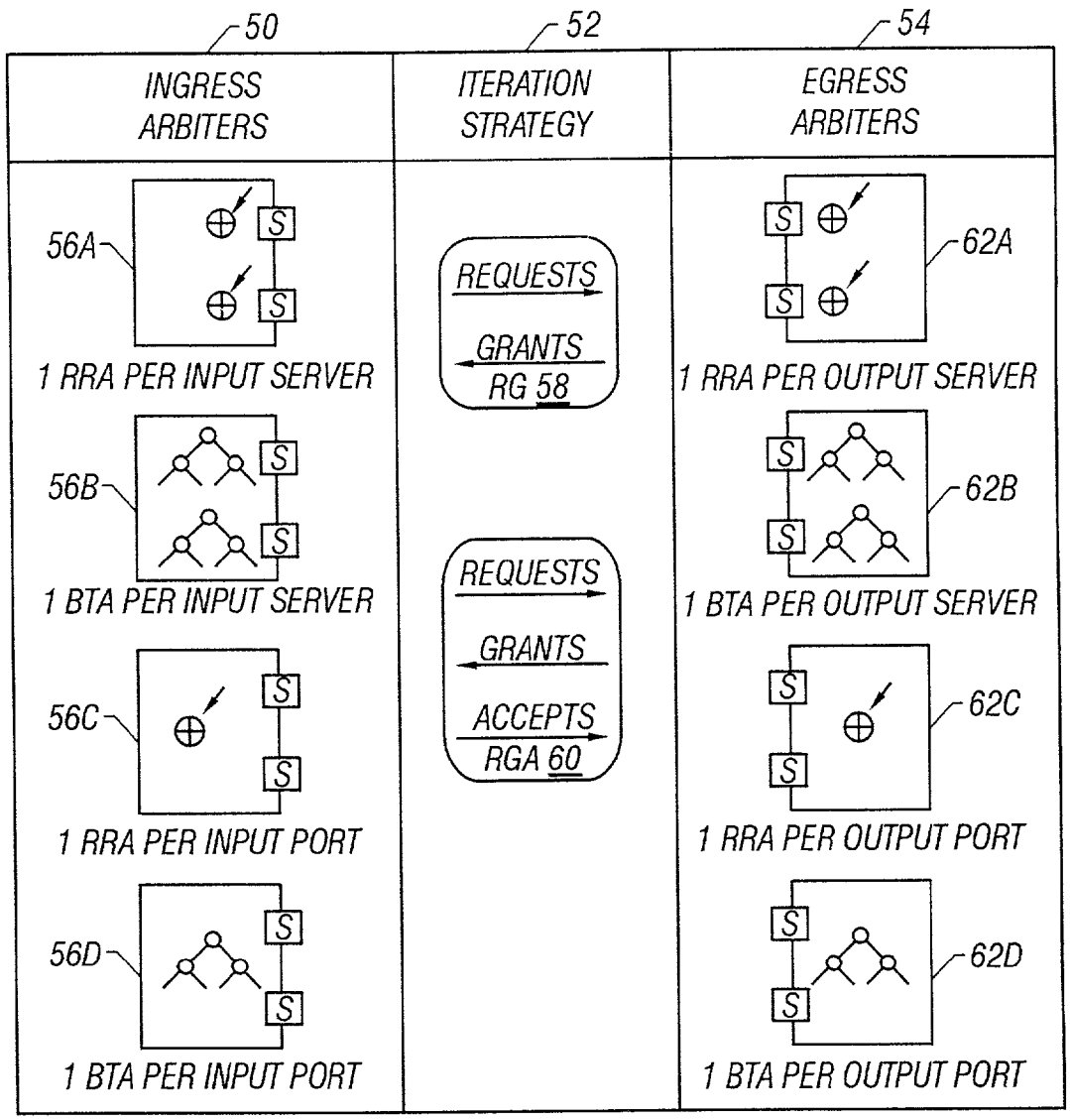
FIG. 5 depicts a generalized scheme for scheduling traffic within the exemplary multiserver switch element based on ingress arbiter architecture, egress arbiter architecture and arbitration iteration strategy, in accordance with the teachings of the present invention.

In the drawings, like or similar elements are designated with identical reference numerals throughout the several views thereof, and the various elements depicted are not necessarily drawn to scale. Referring now to FIG. 1, depicted therein is a high-level architectural block diagram of an exemplary network switch element 10 wherein the teachings of the present invention may be advantageously practiced for scheduling traffic between a plurality of ingress points (reference numerals 12-1 through 12-N) and a plurality of egress points (reference numerals 14-1 through 14-N). A suitable switch matrix 16 is disposed as a cross-connect fabric (XCF) between the ingress and egress points for facilitating the traffic therebetween. The switch matrix 16 may be embodied as a crossbar or switched backplane that is realized in a pure optical, electrical, or an electro-optical domain. When implemented in an optical domain, the switch matrix may be referred to as the optical matrix (OM).

As those skilled in the art should appreciate, the various input and output ports of the switch element 10 may be supported by a number of line cards, depending on the specific implementational objectives. Additionally, the line cards may be further concentrated into burst cards in some embodiments. Accordingly, for purposes of the present patent application, the ingress and egress points depicted in FIG. 1 are illustrative of ports, line cards, burst cards, and the like, and should be conceptualized as entities that are connected to the switch matrix for injecting traffic into it or for receiving traffic from it. For the sake of convenience and organizational simplicity, however, the ingress and egress points will be treated as ingress and egress ports, respectively.

Each ingress point is preferably provided with a plurality of virtual output queues (VOQs) in order to overcome the well known "head-of-line" (HOL) blocking problem encountered in any high-speed switching/routing element. Essentially, each VOQ of an ingress point is operable to contain incoming traffic that is to be routed to a particular corresponding destination across the switch matrix, i.e., the corresponding egress point. Accordingly, it should be understood that after a forwarding decision has been made, the incoming traffic units (e.g., cells, packets, protocol data units or PDUs, etc.) are segregated into VOQ buffers corresponding to the egress ports they are destined to.

In the exemplary network element 10, each ingress port is operable to support N VOQs, as there are N egress ports coupled to the XCF. Reference numerals 18-1 through 18-N exemplify N VOQs supported by the ingress ports. In addition, each ingress and egress port is provided with a plurality of servers, which are entities operable to put traffic into the XCF or to extract traffic from it for downstream transmission. Reference numerals 19-1 through 19-H exemplify the plural servers supported by each ingress port and hence may be referred to as ingress servers. In similar fashion, reference numerals 15-1 through 15-H exemplify the egress servers supported by each egress port.

In accordance with the teachings of the present invention, a generalized scheduling arrangement 20 is provided for configuring the XCF at each time slot associated therewith (also referred to as a matrix cycle) so as to transmit a plurality of transmission units from the ingress side to the egress side of the network element 10. As will be described in greater detail hereinbelow, the essential purpose of the generalized scheduler 20 is to compute, at each time slot, a matching between the VOQs and the servers such that certain performance properties (e.g., fairness, starvation, server use, low implementation cost, etc.,) are optimized as much as possible. At each time slot, the generalized scheduler 20 generates control input to a matrix control unit 22 based on the input information exchanged between the scheduler and the ingress ports. Thereafter, the matrix controller 22 utilizes the control input for configuring the transmission paths through the XCF. It will be further shown that the generalized scheduler of the present invention is extremely versatile in implementation, in that a large number of scheduling schemes may be realized depending on the ingress/egress server architecture, arbiter architecture, and the particular iteration strategy used. Moreover, the resulting scheduling algorithms advantageously overcome the various shortcomings and deficiencies of the state of the art scheduling solutions set forth in the Background section of the present patent applications. To better understand the generalized switch scheduling problem that the present invention aims to solve, a brief description thereof is provided immediately hereinbelow.

It is well known that the switch scheduling problem falls into a class of optimization problems identified as "maximum/maximal bipartite matching problems" (MBMP) where optimal matching is to be achieved between two sets of entities which, for our purposes, can be a plurality of input nodes and a plurality of output nodes. There are two kinds of matches for a bipartite graph. A "maximum" match is one that pairs the maximum number of inputs and outputs together, i.e., there is no other pairing that will result in more input/output pairs. A "maximal" match is one for which pairings cannot be trivially added, i.e., each node is either matched or has no edge to an unmatched node.

Algorithmic solutions to the MBMP problem typically involve arbitration between inputs and outputs. Also, it is generally preferred that algorithmic solutions to the MBMP problem be iterative because: (i) the arbitration times are smaller; and (ii) simpler hardware implementations are possible. As iterative solutions, it is further preferred that the algorithms rapidly converge to an optimal or near-optimal solution, with less control data exchange between the input/ingress arbiters and output/egress arbiters.

As is well known, an iterative algorithm exchanges control signal information such as Requests, Grants and Accepts between the ingress and egress arbiters. Requests are formed at the ingress points based on the transmission units in each VOQ. The requests are either first filtered by the ingress arbiters (which may also be referred to as request arbiters) or sent directly to the egress arbiters (also referred to as grant arbiters) for arbitration. Each egress (grant) arbiter receives requests from the ingress (request) arbiters and arbitrates using a suitable arbitration mechanism (e.g., the round robin arbitration (RRA) mechanism or the binary tree arbitration (BTA) mechanism (also known as the Ping Pong (PP) arbitration), et cetera) to resolve the grants to be sent to the ingress arbiters. The grants are either accepted implicitly or resolved by another set of ingress arbiters (accept arbiters). The accepts are then sent to the egress arbiters.

Thus, it can be seen that there are two arbitration iteration strategies that may be implemented in an iterative scheduling arrangement, namely, the Requests-Grants (RG) strategy and the Requests-Grants-Accepts (RGA) strategy. FIGS. 2A–2C depict the three phases of an iterative arbitration mechanism that may be implemented between the ingress points and egress points of an exemplary network switch element (e.g., network switch element 10 shown in FIG. 1). A plurality of ingress entities (reference numeral 30) collectively exemplify the input side entities such as VOQs, ingress ports, ingress line cards, ingress arbiters, etc. Similarly, a plurality of egress entities (reference numeral 32) collectively exemplify the output side entities such as egress ports, egress line cards, egress arbiters, etc. In the Request phase, an ingress node is operable to make up to L requests (corresponding to L egress entities), as shown in FIG. 2A. Each of the L egress entities grants, based on a predetermined arbitration scheme, one request out of all the requests it has received (FIG. 2B). Thereafter, in the Accept phase, each of the L ingress entities accepts one of the grants it has received from the subset of the egress entities to which it sent requests previously, based on the arbitration scheme employed (FIG. 2C).

It should be apparent that in the iterative RG strategy accepts are implicit at the ingress side since a grant is always accepted. In order to avoid the Accept phase, the requests from the VOQs are first sent to the ingress arbiters which resolve one request per available server. That is, the ingress ports limit themselves to H requests in total (or fewer, depending on the current matching status). Thus, an arbitration of the initial requests is performed by the ingress arbiters and the filtered requests are in turn sent to the egress arbiters. Upon applying a suitable arbitration method at the egress side, the egress arbiters issue one grant per available server. The grants are implicitly accepted at the ingress side and the number of available servers at each egress port is updated for the next iteration.

In the iterative RGA strategy, the Request phase involves building an intermediate request matrix by taking into account the initial requests and the current matching status. The requests cannot exceed H for each destination (or fewer, depending on the number of unmatched servers available in the current iteration). This is simply a maximum limit mechanism rather than an arbitration. Thus, all the requests from the VOQs are directly sent to the egress arbiters which arbitrate according to the available servers at the egress side in order to issue grants. The grants per egress point cannot exceed H for each requesting ingress point, and are sent to the ingress arbiters which arbitrate and select one grant (i.e., accept) according to the available servers at the ingress side. In the next iteration, the unmatched VOQs again make requests to the output arbiters to start the cycle all over again.

Those skilled in the art should appreciate that the RG strategy is better than the RGA strategy where the amount of control data exchanged between the ingress and egress arbiters may be of concern, particularly if the arbiters reside on separate chips or cards. For an N×N switch, RGA makes $O\{N^2\}$ requests while the requests in RG are limited to only $O\{N\}$. Since there are N VOQs per each ingress point, $N^2$ requests are made in RGA. On the other hand, since one request per each server per ingress point is made in RG (i.e., a total of HN for the input side), the amount of control traffic exchanged is much lower.

As alluded to hereinabove, the arbitration schemes at the ingress side, egress side, or both, may be effectuated by ring-based arbitrators (e.g., RRA), tree-based arbitrators (e.g., BTA), or other arbiter types. FIGS. 3 and 4 depict an exemplary RRA 40 and exemplary BTA 42, respectively. The RRA 40 is a sequential circular list of all port or card identification numbers (e.g., eight such entities are exemplified herein), with a persistent pointer 41 that steps through the list in a round robin fashion to ensure fairness. The BTA 42, which is a data structure associated with a selection mechanism, is arranged such that the tree nodes are binary (i.e., only two "children" per node). Each tree node is an arbiter that is responsible for selecting between two entities. For an N×N switch, the binary tree will have k levels, wherein $k=\log_2[N]$. In the exemplary BTA depicted in FIG. 4, where N=8, three levels of binary arbiters are arranged in a tree, where reference numeral 43 refers to the leaf arbiter nodes, reference numeral 44 refers to the intermediate arbiter nodes, and reference numeral 45 refers to the root arbiter node.

The tree arbiter nodes have various attributes, among which is a Boolean flag (illustrated as an arrow pointing in the left or right direction) that allows to select one of the two children. The leaves 43 of the tree are connected to an input vector of 0's and 1's (not shown in this FIG.), representing requests from the ingress points. The selection mechanism which allows to select one of the two requests from each group (i.e., group size=2), is comprised of two phases: an upward propagation phase of requests and a downward propagation phase of grants. In the upward propagation phase, each parent node (starting from the lowest level) will pick one of its children according to its flag and propagate a request to its parent on the next higher level. If both children have requests, the arbiter node selects the one its flag points to. If only one child has a request, the arbiter node selects it irrespective of its flag. Further, if there are no requests to an arbiter node from its children, it propagates no requests to its own parent (i.e., the arbiter node above it to which it is coupled).

As shown in the example of FIG. 4, between the requests of entity 1 and entity 2, the leaf arbiter associated therewith selects the request from entity 2 because the arrow flag points to it. In similar fashion, between the requests of entity 3 and entity 4, the corresponding leaf arbiter selects the request from entity 4. When these requests are propagated upward, the corresponding intermediary arbiter node then selects the request from entity 2 because of its flag. The propagation of the requests continues until the final selection is made by the root arbiter 45, whose choice is the start of the downward propagation. A child that was picked will update its flag to point to the other child than the one it picked itself during the upward propagation. If only one child had a request, the flag is not modified. At the end, only one leaf is selected, which selection is appropriately ANDed.

Where the BTA is employed on the egress side (i.e., as a grant arbiter), the flags in each two-input arbiter (AR2) may be updated after each arbitration. The flags can be modified so as to reflect the present grant. However, if the grant is not accepted, the modified flags can be reverted to the past iteration's state or be left as if the grant has been accepted. These two options for the output BTAs can be termed as "reverting" and "non-reverting" options, respectively.

As pointed out earlier, the generalized scheduler arrangement of the present invention is capable of effectuating a number of specific scheduling algorithms, each being advantageous over the current schedulers in use, by varying several aspects such as, e.g., ingress arbiter architecture, egress arbiter architecture, and the arbitration iteration strategy, etc. As described hereinabove, the arbiter architecture involves type of arbiters (RRA, BTA, circular queues, etc.), number of arbiters (one per ingress port (i.e., single arbiter) or one per server (i.e., multi-arbiter)), and the like. As will be seen in greater detail below, additional aspects of the arbiter management also play a role in further refining the scheduling algorithm species that the present invention's generalized scheduler arrangement can spawn. The arbitration iteration strategies involve the RGA and RG strategies which have been explained hereinabove, as well as other considerations such as arbiter status update schemes (for example, updating the egress arbiters only after the first iteration), priority management, and the like.

Referring now to FIG. 5, depicted therein is a generalized schematic arrangement for scheduling traffic within the exemplary multiserver switch element 10, which scheme can generate up to 32 scheduler designs by combining a subset of the aspects set forth above. Reference numeral 50 refers to the exemplary ingress arbiter architecture features. Four specific architectural themes are exemplified in association therewith. Reference numeral 56A refers to the single RRA per ingress server arrangement where the symbol ⊕ exemplifies an RRA associated with a server ☐. Reference numeral 56B refers to the single BTA per ingress server arrangement where a BTA is associated with a server ☐. In FIG. 5, the BTA is exemplified as an inverted tree of nodes which are represented by the symbol ○. In similar fashion, reference numerals 56C and 56D respectively refer to the single RRA per ingress port and single BTA per ingress port arrangements.

With respect to the arbitration iteration strategy 52, reference numeral 58 refers to the RG strategy and reference numeral 60 refers to the RGA strategy. Finally, reference numeral 54 refers to the exemplary egress arbiter architecture features. Again, four specific architectural themes are exemplified in association therewith. Reference numeral 62A refers to the single RRA per egress server arrangement where the symbol ⊕ again denotes an RRA associated with an egress port server ☐. Reference numeral 62B refers to the single BTA per egress server arrangement where a BTA (exemplified by a tree of the nodes (○)) associated with an egress server ☐. Similarly, reference numerals 62C and 62D respectively refer to the single RRA per egress port and single BTA per egress port arrangements.

Whereas it is advantageous to use an arbiter per each server (because the input/output matching selection can be performed in parallel), there may be certain costs associated therewith, however. As there are more arbiters needed, the hardware costs can increase in certain implementations. Also, there is an added validation cost, which results from the requirement that the selections are valid after the parallel selection process has been effected. It will be shown below that a matrix minimization method employed in the exemplary embodiment of the present invention is advantageous in this respect.

Figure 6:
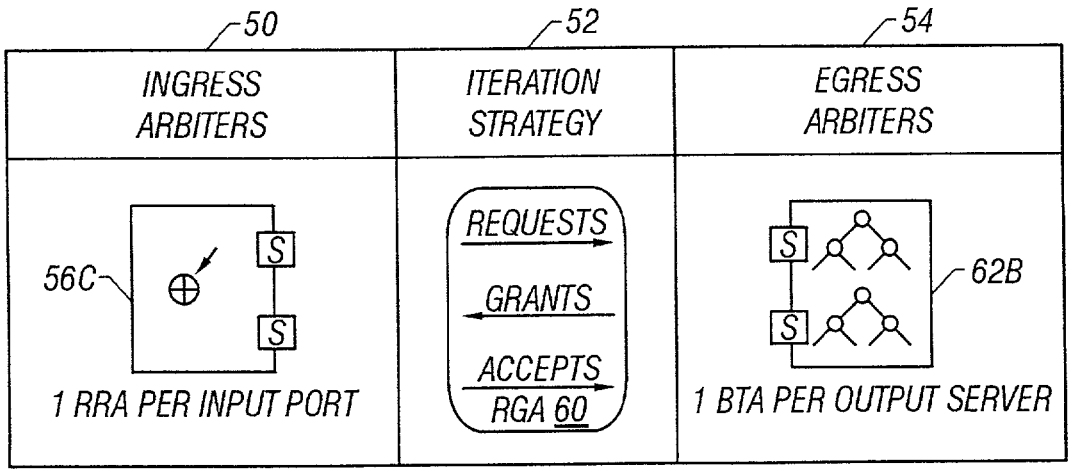
FIG. 6 illustrates the realization of an iterative Ping Pong-type (PP) scheduling mechanism as a particular implementation derived from the generalized scheduling scheme of FIG. 5.

By varying the ingress arbiters, egress arbiters, and the iteration strategy as described above, the total number of scheduling algorithm species that can be obtained is 32 (=4×4×2). For example, FIG. 6 illustrates the realization of an iterative Ping Pong (PP) scheduling mechanism (iPP) as a particular implementation derived from the generalized scheduling scheme of FIG. 5. In one embodiment, the iPP algorithm may be provided as an RGA-based scheduler (which will described in additional detail hereinbelow), with one RRA per ingress port and one BTA per egress server.

It should be appreciated that several distinct scheduling algorithms can be obtained from such combinations. Also, with enough manpower and processing power, it is possible to systematically evaluate the performance of the resultant algorithms in the context of the multiserver, multi-arbiter switching architecture addressed in this present patent application. Whereas several current scheduling algorithms are known by their name, and some of the present invention's resultant algorithms are novel and nonobvious extensions of some of the existing algorithms, a possible naming convention for the algorithm species of the present invention is as follows, with the understanding that RR denotes the round robin scheme and that the BTA arbitration is also sometimes referred to as the Ping Pong (PP) arbitration:

$$Mi-\{RG|RGA\}-\{1|N\}\{PP|RR\}_{INGRESS}-\{1|N\}\{PP|RR\}_{EGRESS};$$

where M denotes multiple servers; i denotes iterative capability; {RG|RGA} denotes either the RG or RGA iteration strategy; and {1|N} denotes either single arbiter per ingress/egress point or multiple arbiters (N) per ingress/egress point (which is the same as having one arbiter per each ingress or egress server). As pointed out earlier, additional refinements may be added based on priority management, arbiter update schemes, etc.

Figure 7:
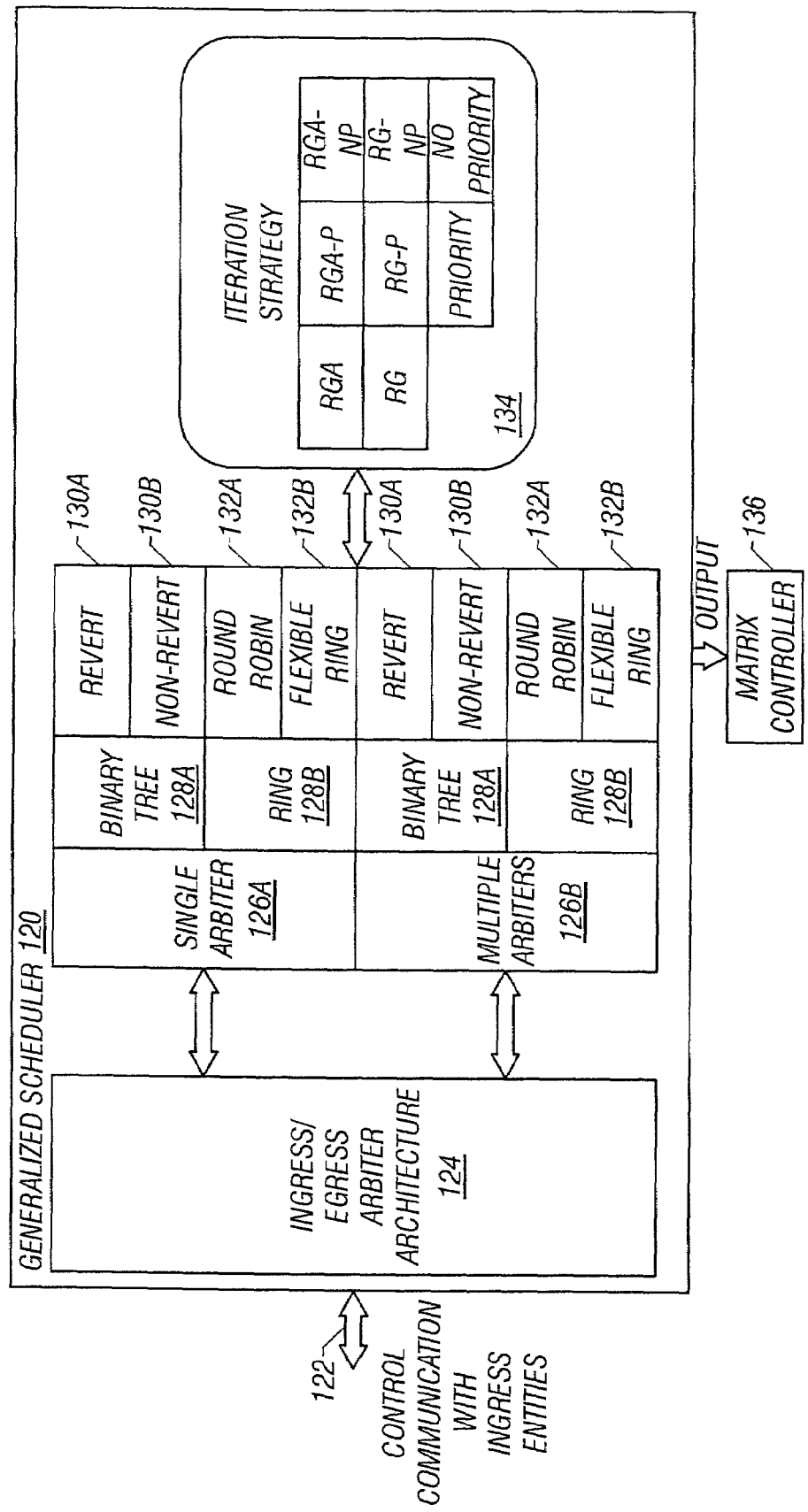
FIG. 7 depicts a high level functional block diagram of a generalized scheduler of the present invention.

Referring now to FIG. 7, depicted therein is a high level functional block diagram of an exemplary generalized scheduler 120 of the present invention operable to realize a plurality of scheduling algorithm species for use with a multiserver network element such as, e.g., the network element 10 shown in FIG. 1. It should be appreciated that the generalized scheduler 120 is a further overall abstraction of the scheduling arrangement described above. Reference numeral 122 refers to the control communication path between the generalized scheduler 120 and the various ingress entities of the network element. The output from the scheduler comprises a scheduling matrix S that is sent to a matrix controller 136 for configuring a plurality of connection paths of the XCF for the time slot under consideration. Clearly, the contents of S matrix are determined by the specific implementation of the scheduler 120 which, as has been explained hereinabove, can be varied based on several architectural aspects.

Reference numeral 124 refers to the ingress/egress arbiter architecture which is composed of single arbiter architecture 126A as well as multiple arbiter architecture 126B. Each of these architectures is further refined according to the arbiter scheme employed: (i) tree-based arbiter scheme 128A, and (ii) ring-based arbiter scheme 128B. The tree-based arbiter schemes 128A are further categorized based on whether the reverting option 130A or non-reverting option 130B is employed at the egress side. The ring-based arbiter schemes 128B are also categorized based on whether a fixed circular list (i.e., fixed round robin) 132A or a flexible ring 132B is used. The iteration strategy 134 is further defined based on whether the requests are classified in accordance with a predetermined priority basis (e.g., regular requests vs. alarm requests).

Figure 8:
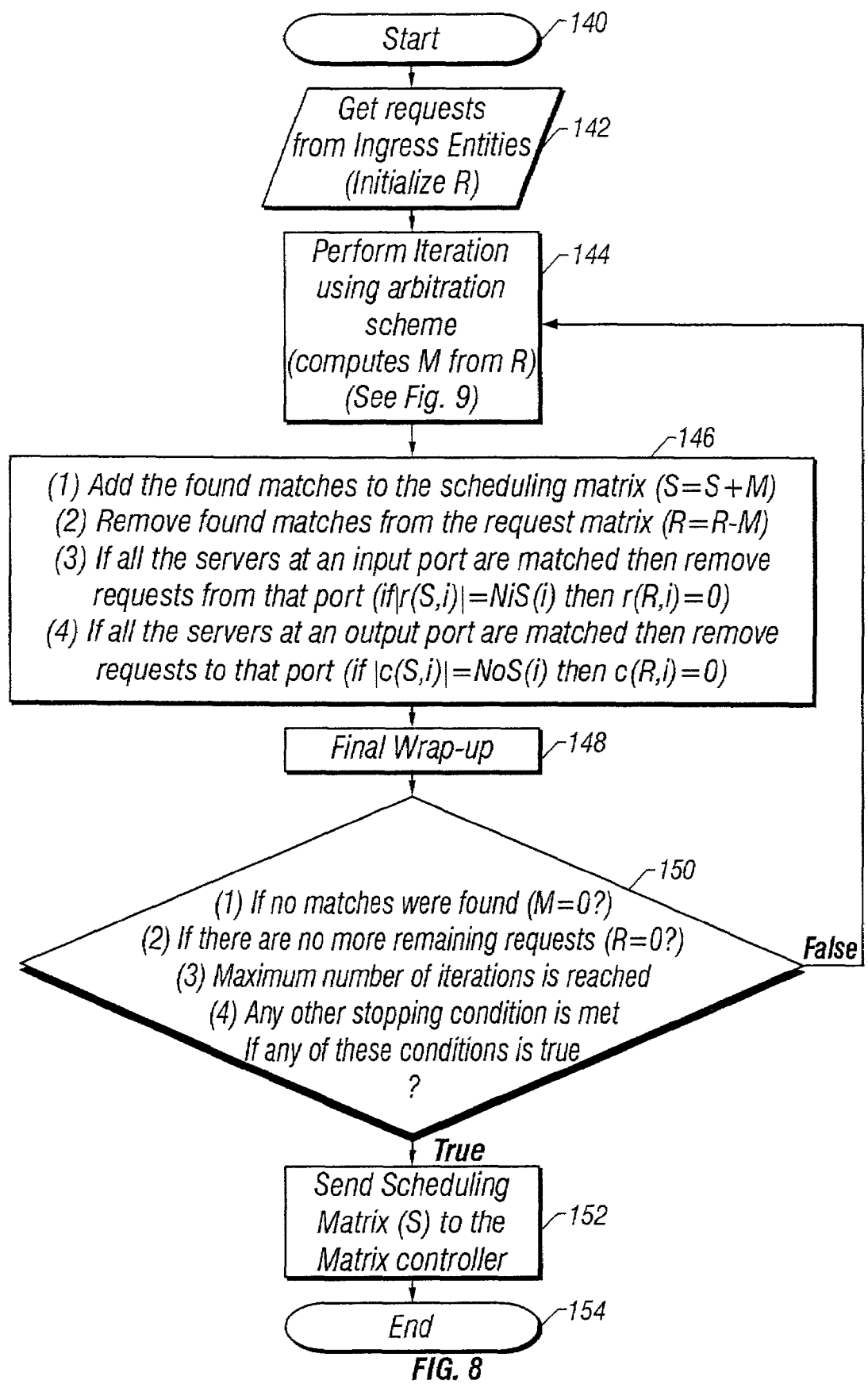
FIGS. 8–10 are multiple nested flow charts that illustrate the various steps involved in the generalized scheduling mechanism of the present invention.
Figure 9:
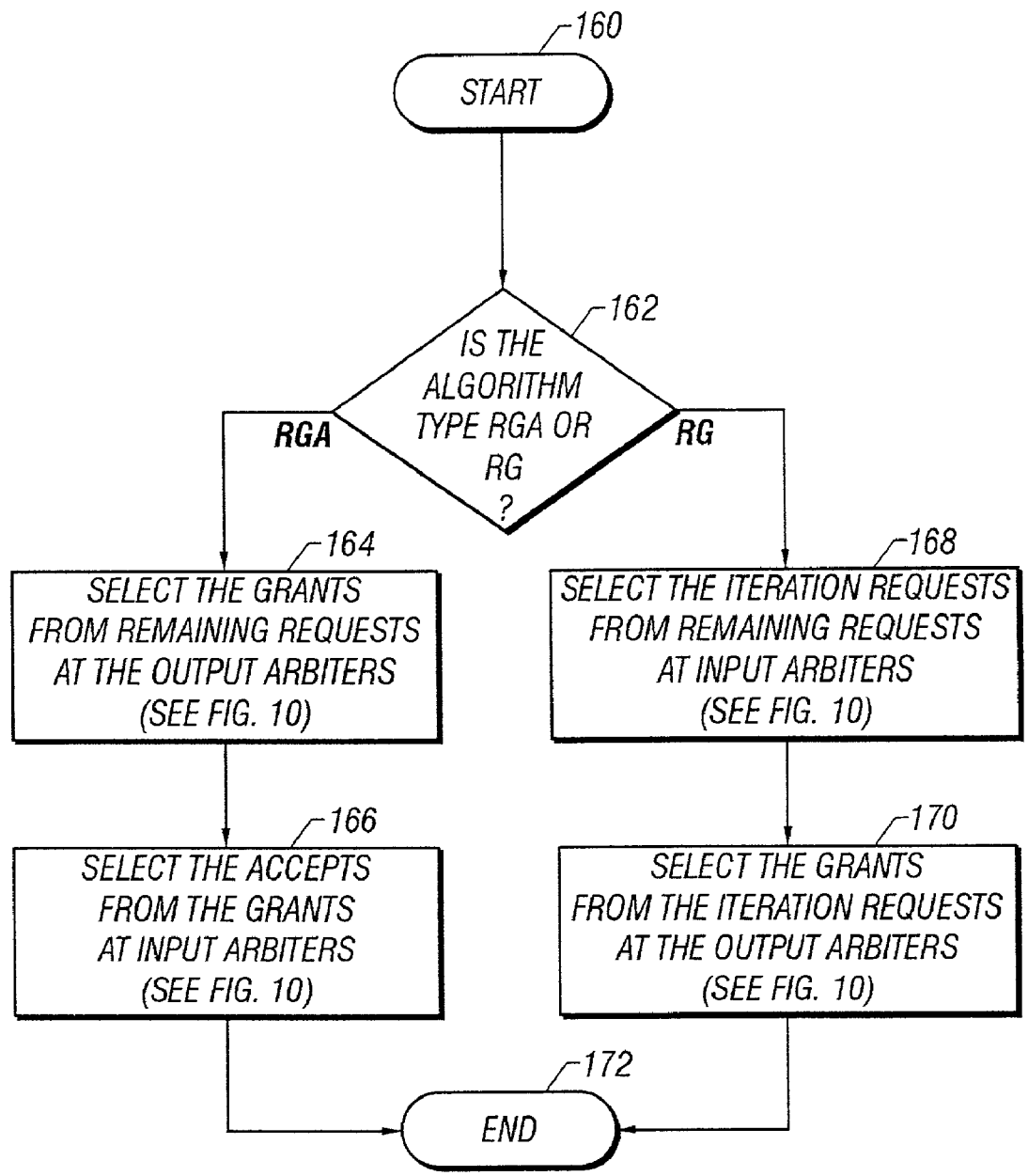
Figure 10:
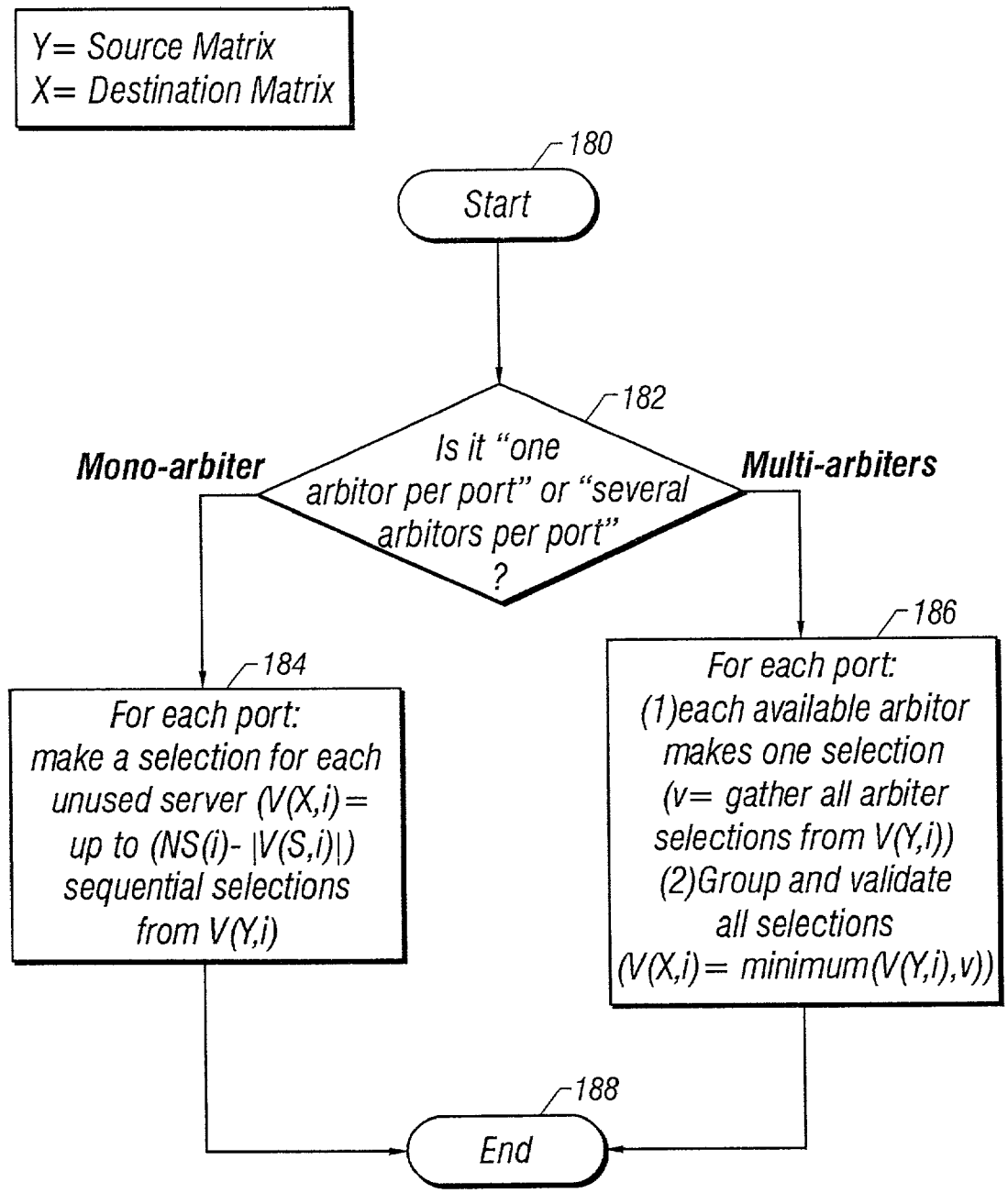

FIGS. 8–10 are multiple nested flow charts that illustrate the various steps involved in the generalized scheduling mechanism of the present invention. The following notation is used in the steps set forth in the flow charts:

| | |
|---|---|
| M | = matrix of matches found in an iteration (In one exemplary implementation, M is reset to 0 before each iteration); |
| S | = scheduling matrix (iteratively built with initial value S = 0); |
| r[S,i] | = matches found for ingress port i; |
| c[S,i] | = matches found egress port i; |
| \|r[S,i]\| | = number of matched servers in ingress port i; |
| \|c[S,i]\| | = number of matched servers in egress port i; |
| R | = matrix of remaining requests; |
| r[R,i] | = requests from ingress port i; |
| c[R,i] | = requests to egress port i; |
| r[X,i] | = row i in matrix X; |
| c[X,i] | = column i in matrix X; |

-continued

| | |
|---|---|
| V[X,i] | = vector i in matrix X, which can be either r[X,i] or c[X,i]; |
| \|V[X,i]\| | = sum of the values in vector i in Matrix X; |
| $N_iS[i]$ | = number of servers per ingress port i; |
| $N_oS[i]$ | = number of servers per egress port i; |
| NS[i] | = either $N_iS[i]$ or $N_oS[i]$. |

Upon starting a new time slot for scheduling (step 140), the requests from the ingress entities (i.e., VOQs) are obtained for initializing the Request matrix R (step 142). An iteration cycle is performed based on the chosen arbitration iteration strategy (step 144). This is the step wherein the elements of matrix M are computed based on the request matrix R and the details are set forth in the flow chart of FIG. 9. Once the M matrix is computed, the following takes place, as shown in the consolidated step 146. The scheduling matrix S is updated by adding the found matches to the initial S matrix (i.e., S←S+M). The remaining request (R, or RR) matrix is updated by removing the found matches (i.e., R←R−M). Also, if all the servers at an ingress point are matched then the requests from that entity are removed. Mathematically, this is accomplished by utilizing the following relationship:

If $|r[S,i]|=N_1S[i]$, then set $r[R,i]\leftarrow 0$

Further, if all the servers at an egress point are matched then the requests to that entity are removed by utilizing the following relationship:

If $|c[S,i]|=N_oS[i]$, then set $c[R,i]\leftarrow 0$

Thereafter, a final wrap-up procedure 148 is effectuated, which essentially involves the updating of the egress arbiters' persistent state pointers if the iteration strategy is of the RGA scheme. Otherwise, the final wrap-up procedure has no effect. A plurality of decisions are made subsequently (shown in the consolidated decision block 150) for verifying the following conditions: (i) whether no matches were found in the iteration just completed (i.e., M=0?); (ii) whether there are no more remaining requests to be matched (i.e., R=0?); (iii) if an arbitrary maximum number of iterations (iteration limit) is reached; or (iv) any other stopping condition is met (e.g., timeout). If none of these stop conditions is met, the flow control is returned to perform another iteration cycle at step 144. Otherwise, the iteration process stops and the current scheduling matrix S is sent to the matrix controller (step 152). The scheduling process then stops for that time slot (step 154).

Since the purpose of the scheduler is to compute, at each switch matrix time slot, a matching between the VOQs and the servers within certain performance constraints, the result of the generalized scheduler may be advantageously represented as a matrix of positive integer numbers, in which an element [i,j] is the number of transmission units that the ingress point i will send to the egress point j. It should be appreciated by those skilled in the art that in the state of the art single server scheduling algorithms, this matrix would simply contain Booleans (i.e., request or no request).

The flow chart shown in FIG. 9 provides additional details of the iteration step 144 set forth above. Upon starting the iteration cycle (step 160), a determination is made whether the underlying scheduling algorithm is based on the RGA iterative strategy or the RG iterative strategy (decision block 162). If the RGA strategy is used, grants are selected based on the remaining requests provided to the egress arbiters (step 164). Thereafter, accepts are selected based on the grants issued to the ingress arbiters (step 166). Both steps 164 and 166 are further detailed in the flow chart of FIG. 10.

On the other hand, if the RG iterative strategy is used, iteration requests are selected from the remaining requests at the ingress arbiters which are then sent to the egress side (step 168). Grants are issued based on the received iteration requests at the egress arbiters which are sent to the ingress entities for implicit acceptance (step 170). The flow chart of FIG. 10 depicts additional details relating to the steps 168 and 170. The iteration process then stops (step 172) and returns to the main flow chart of FIG. 8.

Upon starting the arbitration flow process (step 180) of FIG. 10, which FIG. represents a generic selection from a source matrix Y to a destination matrix X, a determination is made whether the arbiter architecture involves the single arbiter per port arrangement or the multiple arbiters per port arrangement (decision block 182). In the single arbiter per port scenario, the following operation is performed for each port (shown at step 184): make a selection for each unused server (i.e., V[X,i] (=up to (NS[i]−|V[S,i]|) sequential selections from V[Y,i]). In the multi-arbiter scenario, the following operations are performed for each port (consolidated at step 186): (i) each available arbiter makes one selection (i.e., v=gather all arbiter selections from V[Y,i]); and (ii) group and validate all selections using a minimization process (i.e., V[X,i]=Minimum{V[(Y,i),v]}). The process is stopped thereafter (step 188), whereupon flow control returns to the flow chart shown in FIG. 9.

Of the numerous scheduling algorithm species that the present invention is capable of generating, the following six algorithms will now be described in additional detail: (i) Multiserver iterative SLIP (MSLIP); (ii) Multiserver Dual Round Robin (MDRR); (iii) iPP-RGA; (iv) iPP-RG; (v) Flexible Ring Dual Round Robin (FRDRR); and (vi) Prioritized Dual Round Robin (PDRR). To concretize and better illustrate the underlying concepts, each of these six algorithms is particularly exemplified with a reference switch platform.

Figure 11:
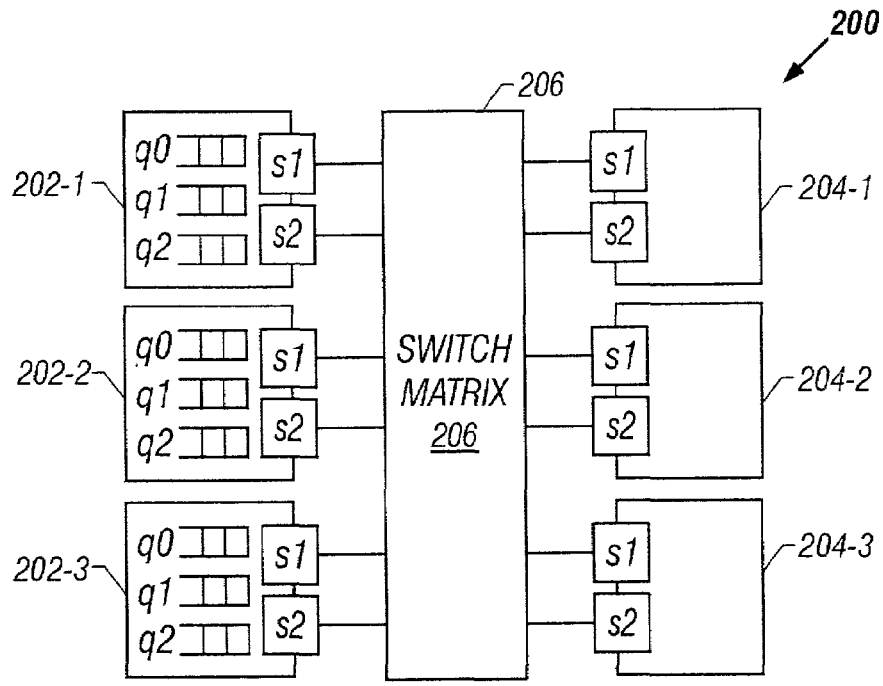
FIG. 11 depicts an exemplary 2-server/3-port switch which serves as an architectural platform for illustrating various particular scheduling mechanisms of the present invention.

Referring now to FIG. 11, depicted therein is an exemplary 2-server/3-port switch 200 which serves as a reference architectural platform for illustrating the various particular scheduling mechanisms of the present invention. A switch matrix 206 is preferably implemented as an optical cross-connect in an exemplary embodiment of the switch element 200. Three ingress (or, input) ports (reference numerals 202-1 through 202-3) and three egress (or, output) ports (reference numerals 204-1 through 204-3) are interconnected via the cross-connect. As there are three output ports/cards, each input port/card is provided with three VOQs, q0 through q2. S1 and S2 refer to the two servers supported by each port/card. For the sake of convenience and simplicity, the various other architectural details which are described elsewhere in the present patent application are omitted in this FIG.

Certain common generalizations, features and notational convention relating to the exemplary architecture are now set forth below which will be employed in describing the various particular scheduling algorithms provided in accordance with the teachings of the present invention:

The switch matrix (coupled to N input and N output ports) imposes a clock rhythm defined by a slot time, also referred to as matrix cycle time.

Each of the N input ports manages N VOQs for the N possible destination output ports.

VOQs contain transmission units (such as PDUs or cells). The transmission units may contain data from sublayer units (i.e., encapsulation). Whereas each transmission unit is preferably comprised of a fixed size, variable size units (e.g., IP packets or frames) can be preprocessed to be packaged into fixed length transmission units.

Each input and output port is operable to support H servers (H can be equal to N, greater than N, or less than N), wherein an input server can process one transmission unit at each slot time, from any VOQ associated with the input port. Further, an output server is operable to process one transmission unit at each slot time.

The input data for the exemplary algorithm species is the matrix containing the number of requests (i.e., the number of transmission units to be sent, with the last one being possibly incomplete, unless the option to hold incomplete transmission is chosen) from input port i to an output port j.

Each of the exemplary algorithm species set forth hereinbelow is iterative. Either RGA iteration strategy or RG iteration strategy is implemented. The exemplary algorithms mainly differ according to the iteration strategy and the arbiter architecture used.

The notational scheme is as follows: OS_MATCH [j]=number of currently matched servers associated with output port j; OS_GRT[j]=number of grants in current iteration issued by output port j; GRANT[i,j] =number of grants in current iteration issued by output port j to input port i; IS_MATCH[i]=number of currently matched servers associated with input port i; and IS_ACC[i]=number of accepts in current iteration issued by input card i.

(A) Multiserver Iterative SLIP (MSLIP)

In the conventional implementation of iSLIP algorithm, each input and output card supports only one server (see Nick McKeown, *The ISLIP Scheduling Algorithm for Input-Queued Switches*, IEEE/ACM Transactions on Networking, Vol. 7, No. 2, April 1999 for additional details). Whereas the algorithm makes use of round robin arbitration and is iterative (with RGA strategy), the methodology is deficient with respect to multiserver architectures, especially where multiple arbiters are also required.

In accordance with the teachings of the present invention, H RRAs are provided (one per server) for each output port to ensure the fairness of each grant independently of the other grants. However, there is only one RRA per each input port, since the fairness and no-starvation properties are ensured by the Grant phase. The Request phase is implemented such that each input port that has at least one unmatched server and remaining data to transmit will issue a maximum of H requests to each output port. In the Grant phase, each incompletely matched output port selects an input request for each yet unmatched server using its RRA. The current RRA value (i.e., pointer) defines the current preferred input port. If the current RRA input has an unmatched server, a grant is issued for that input port and the RRA for the output server is incremented. Otherwise, the RRA is incremented until an unmatched requesting input port is found or until one revolution of the circular queue has been completed. The RRA value's actual update is preferably performed during the Accept phase (i.e., updating upon acceptance). In an output port j where the current RRA[k] value of an unmatched server k is i, a grant is issued if:

($H$-$OS$_MATCH$[j]$-$OS$_GRT$[j]$>0) and ($H$-$IS$_MATCH$[i]$-GRANT$[i,j]$>0)

In the Accept phase, each requesting input port will issue up to H accepts, selecting among the granting output ports with its (i.e., the input port's) RRA, whose current value defines the current preferred output port. As pointed out above, the egress RRAs are updated (to the next position after the grants are issued) only if the grants are accepted in the iteration. This is to ensure that no flow can starve: an output port will keep attempting to grant the input port with highest preference until it accepts a grant in an iteration of the current slot time or in a subsequent slot time although other inputs can be granted. It will give highest preference to the next input only when the current one has accepted a grant. On the other hand, the ingress RRAs (i.e., accept RRAs) on the input side are updated in each iteration. An input port will issue an accept to a grant received from an output port if:

($H$-$IS$_MATCH$[i]$-$IS$_ACC$[i]$>0)

Figure 12A:
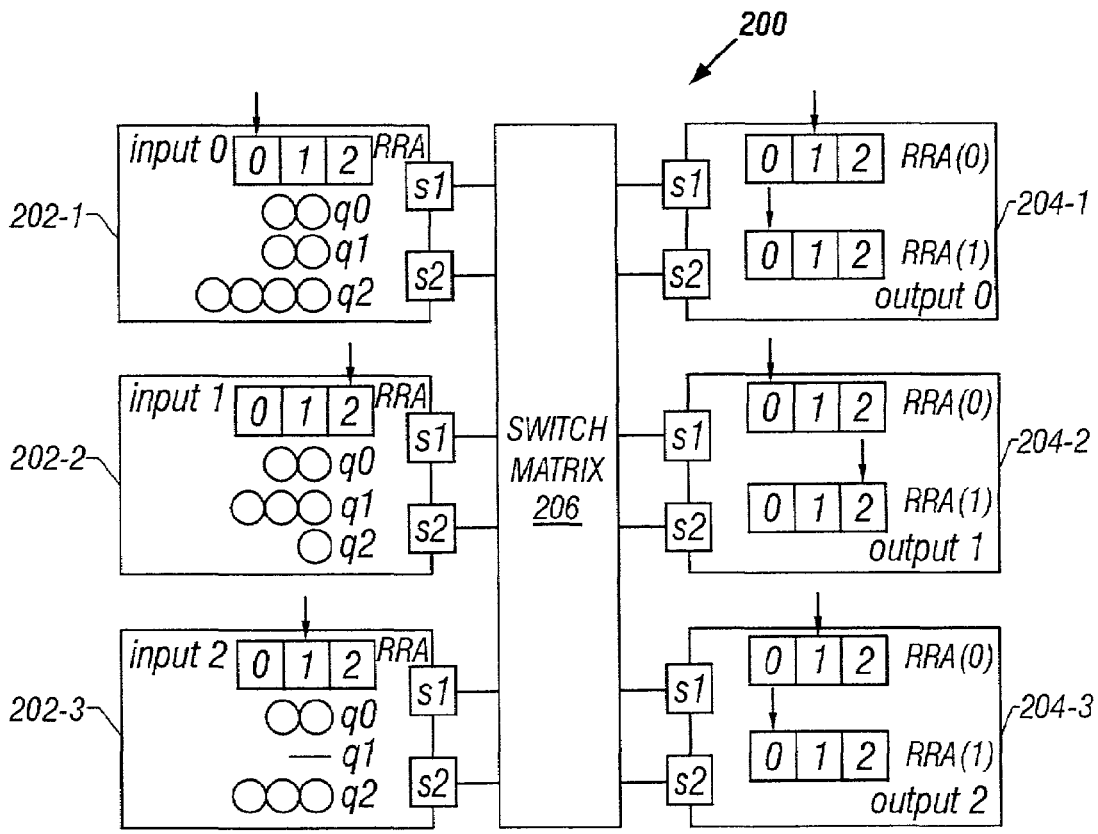
FIGS. 12A–12F illustrate the operation of an exemplary multiserver iterative SLIP (MSLIP) scheduling mechanism of the present invention.

As an iteration stop condition, the Multiserver iSLIP scheduler stops if no more new grants were issued in the last iteration, or if a maximum number of iterations has been reached. FIGS. 12A–12F illustrate the operation of an exemplary Multiserver Iterative SLIP (MSLIP) scheduling mechanism of the present invention by going through two iterations. The initial state of the 2-server/3-port system 200 is shown in FIG. 12A. Each input port has its ingress RRA with the current preference position as shown. Each output port is provided with two RRAs (one for each server supported), also with their current positions as shown.

For purposes of commencing the iterative process, input port 0 (reference numeral 202-1) has two requests for output port 0 (reference numeral 204-1), as VOQ (q0) has two transmission units therein. It should be appreciated by those skilled in the art that in one exemplary embodiment, the switched entities (i.e., transmission units) may be comprised of optical packets (OP) or such other encapsulated units as may be necessary due to burstification in a optical domain.

Continuing with the initial state of the system 200, input port 0 also has two requests for output port 1 (reference numeral 204-2), as can be seen by the two transmission units (exemplified by two "○"s) in the corresponding VOQ, q1. In similar fashion, four requests will be initiated by input port 0 towards output port 2 (reference numeral 204-3) because of the four transmission units in the corresponding q2. With respect to the other two input ports, input port 1 (reference numeral 202-2) and input port 2 (reference numeral 202-3), the following requests are in order: 2, 3 and 1 requests from input port 1, and 2, 0 and 3 requests from input port 2 towards the three output ports, respectively. These requests are shown as elements of the applicable Request matrix depicted in FIG. 12B.

In the Grant phase of iteration 1, each output server RRA is used to select inputs (i.e, requests). In output port 0, RRA associated with server S1 (i.e., RRA(0)) is set to 1, and therefore will issue a grant to input port 1 which had two requests to it (because of the two transmission units in q0). Similarly, the second RRA (RRA(l) associated with server S2) of output port 0 will issue a grant to input port 0 because the pointer of RRA(l) is pointed to 0 of the circular list, which input port 0 had two requests to it (since q0 therein had two transmission units initially).

Similarly, grants with respect to the other output ports can be worked out as follows. In output port 1, the first RRA will issue a grant to input port 0. Its second RRA will issue a grant to input port 2, but as there are no requests from it (i.e., q1 in input port 2 was empty), RRA(2) of output port 1 then accordingly increments its pointer to the next entity in the circular list, namely, input port entity 0, which still has an eligible request to output port 1. Therefore, output 1 will issue a grant to input port 0 in this iteration. Finally, output port 2 issues a grant to input port 1 from its RRA(0) and to input port 0 from its RRA(1). These grants are memorized as elements in the first column of the Grant matrix (shown in FIG. 12B).

In the Accept phase, the RRA of input port 0 is set to 0 and will therefore accept a grant from output port 1, followed by accepting a grant from output port 1, thus matching the two servers (S1 and S2) supported by it. Its RRA then stops at the next value, i.e., 2. Input port 1 accepts a grant from output port 2, then from output port 0, and then stops at 1. Input 2 received no grants, thus leading to no accepts.

Figures 12B, 12C:
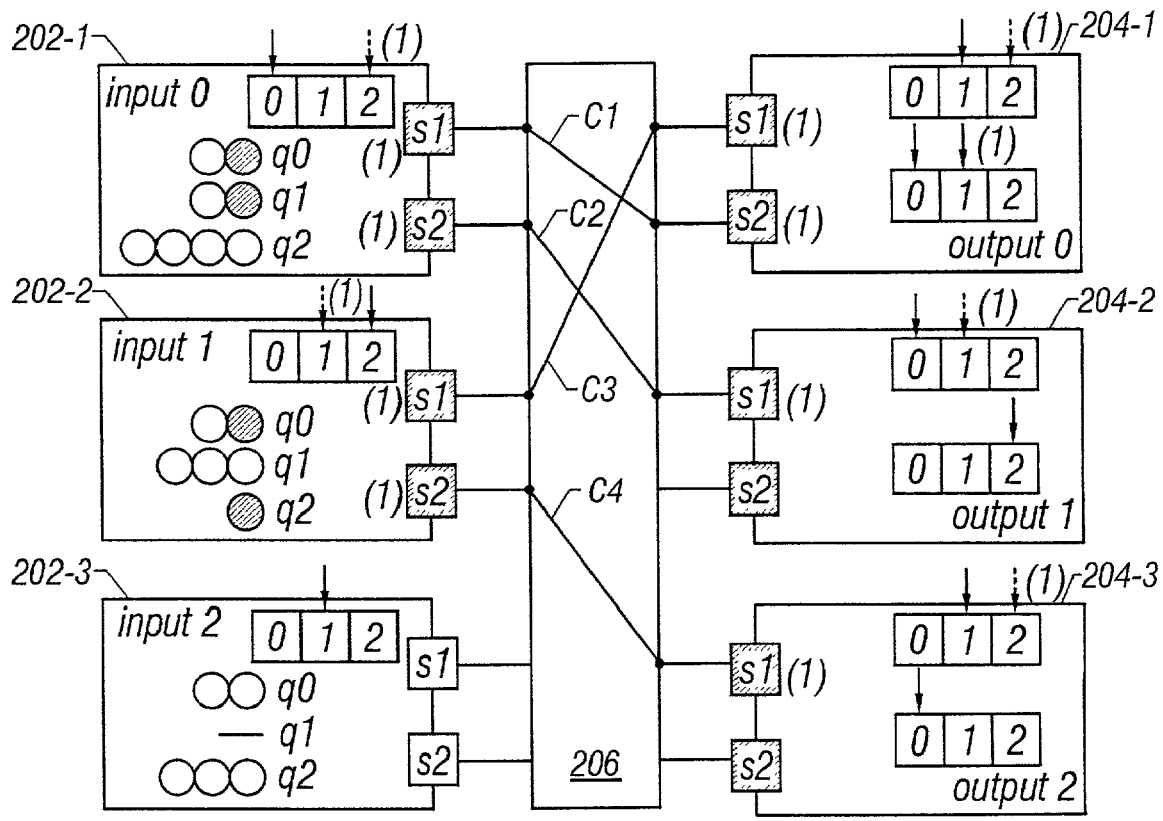

The Accept matrix containing these accepts (shown in FIG. 12B) is added to the Schedule matrix which was initialized to zero. Also, for each accepted grant, the grant arbiter pointers are updated. The two RRA(1) arbiters associated with output port 1 and output port 2, respectively, are not updated since their grants were not accepted. FIG. 12C shows the status of the system after iteration 1, with the four established connections C1–C4.

In iteration 2, input ports 0 and 1 do not issue requests because their servers are already matched. Input 2 issues the same requests as in iteration 1, since none of its servers were matched. Output port 0 will not issue grants, whereas output port 2 still has an unmatched server. A grant will be issued after consulting its RRA(1), which was not updated in the previous iteration. It will issue a grant to input port 2, but the pointer stays at 0 because this is not the first iteration. In the Accept phase, input port 2 accepts this grant and sets its RRA to 0. The resultant accepts are added to the Schedule matrix as before.

Figures 12D, 12E:
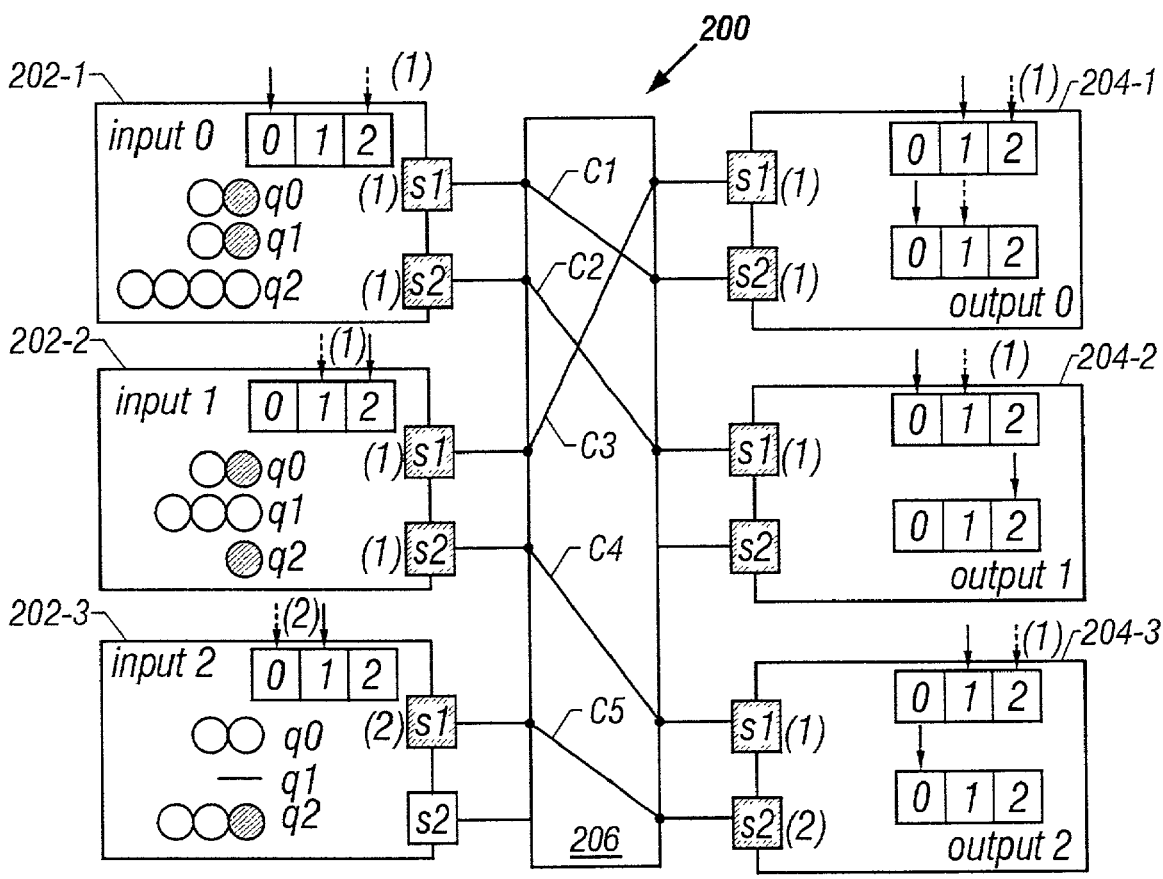
Figure 12F:
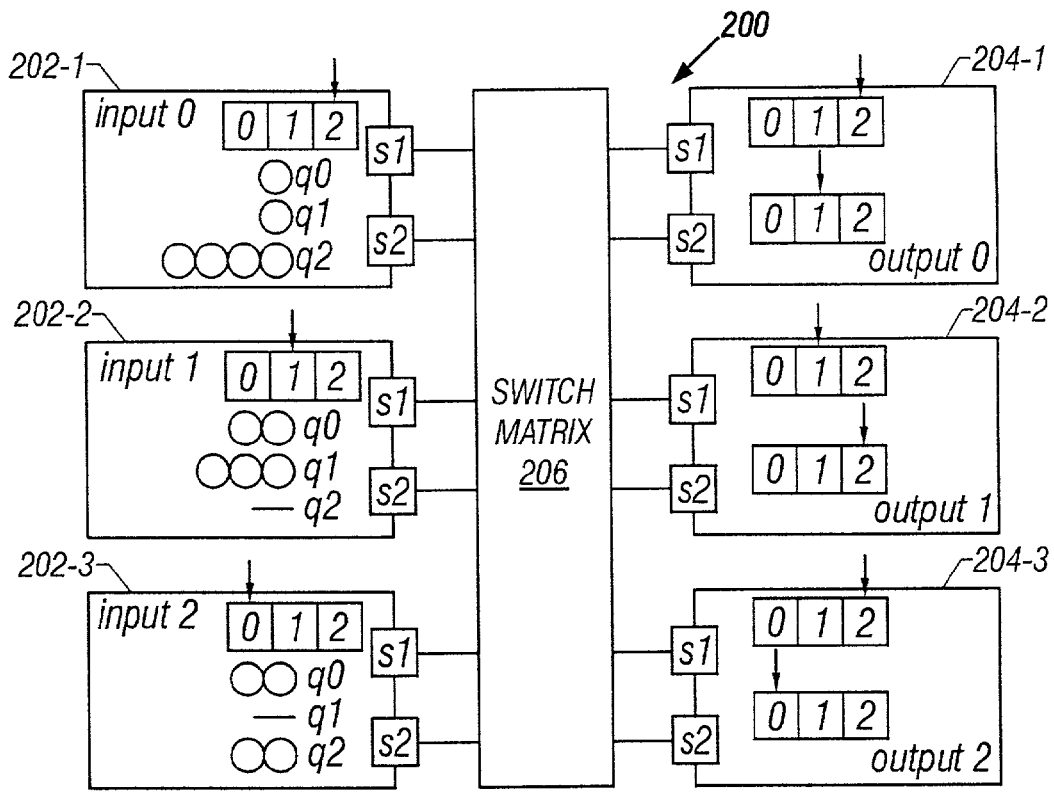

FIG. 12D depicts the Request, Grant, Accept and Schedule matrices associated with iteration 2. The state of the system after iteration 2 is shown in FIG. 12E, which exemplifies the five connections C1–C5 formed therein. There will be a third iteration, in which input port 2 will try again to send requests, but no grants will be issued. Accordingly, the algorithm stops with the schedule obtained at the end iteration 2 as shown in FIG. 12E, wherein the transmission units scheduled to be transported via the switch matrix 206 and the associated ingress and egress servers are shaded. FIG. 12F depicts the state of the system after the scheduled transmission units have been served.

It should be appreciated that the scheduling algorithm species set forth above advantageously generalizes the conventional iSLIP algorithm to suit the multiple server architecture, which architecture becomes particularly relevant in the emergence of high-speed optical routers where several wavelengths can be used to transmit data. Also, the inventive algorithm provides for a timeout mechanism in order to maximize the use of the bandwidth, hence increasing the maximal admissible load, even if the traffic is polarized towards one or more particular output ports.

(B) Multiserver Dual Round Robin (MDRR)

In the conventional DRR algorithms, each input and output card is provided with only one server. A single arbiter is associated with the server. Typically, an iterative strategy using the RG process is implemented in conjunction with RRA. Although the DRR algorithm is adequate in some applications, it is deficient with respect to architectures requiring multiple servers.

In accordance with the teachings of the present invention, each ingress and egress point is provided with a plurality of servers. Further, each server is associated with an arbiter, preferably of the RRA type. In addition to the common notational scheme set forth in the foregoing discussion, we now define IS_REQ[i] to be the number of requests in current iteration used by ingress port i. In the Request phase, the current value of a server RRA of each ingress port (i.e., ingress arbiter) defines the current preferred destination egress port. If both the ingress and egress ports are not fully matched yet, a request is issued for this destination and the RRA is incremented. Otherwise, the RRA is incremented until a potential egress port is found or until a full turn around the circular list is completed. In an ingress port i where the value of current RRA[k] (associated with server k) is j, a request is issued if:

$(H\text{-}IS\_MATCH[i]\text{-}IS\_REQ[i]>0)$ and $(H\text{-}OS\_MATCH[j]>0)$

In the Grant phase, each egress port's unmatched server will use its RRA to select an input among the requests issued thereto. The corresponding servers are then matched for subsequent iterations. An egress port j will issue a grant to a request from the ingress port i equal to the RRA[k] of server k if:

$(H\text{-}OS\_MATCH[j]\text{-}OS\_GRT[j]>0)$

Figure 13A:
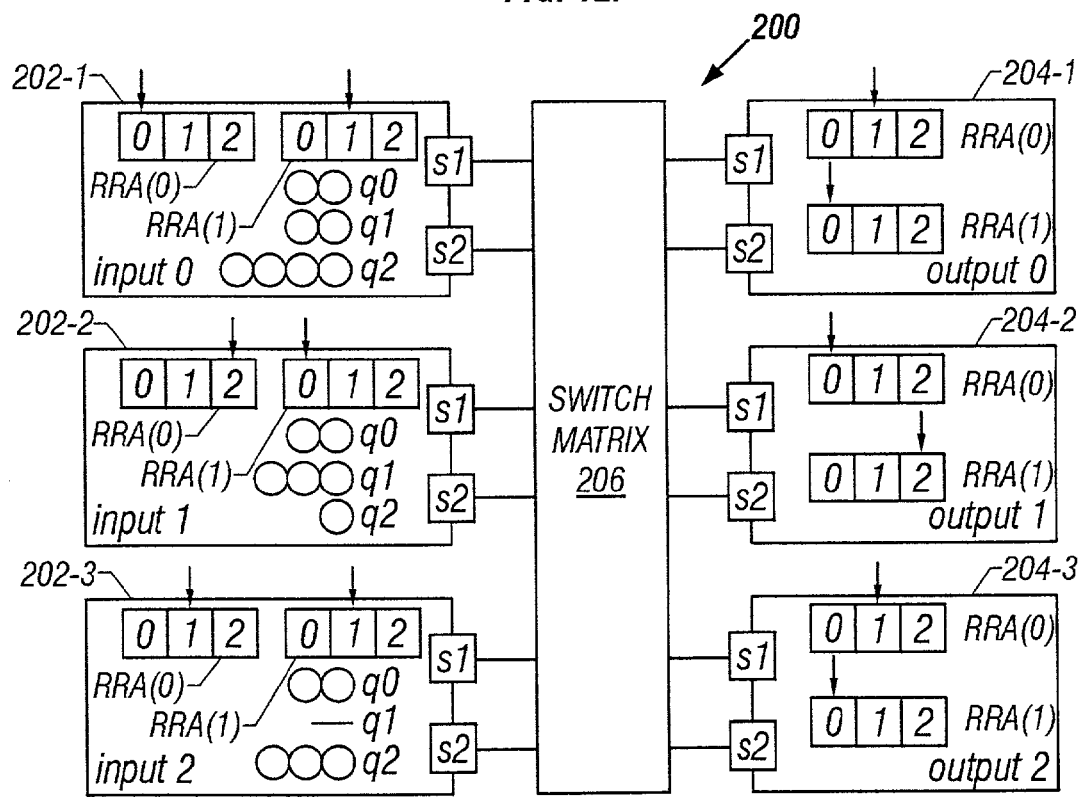
FIGS. 13A–13E illustrate the operation of an exemplary multiserver dual round robin (MDRR) scheduling mechanism of the present invention.

Similar to the Multiserver iSLIP mechanism described above, the Multiserver DRR scheduler algorithm of the present invention stops if no more new grants are issued in an iteration or if a maximum number of iterations has been reached. FIGS. 13A–13E illustrate the operation of an exemplary MDRR scheduling mechanism by going through two iterations. The initial state of the 2-server/3-port system 200 is shown in FIG. 13A. Each input port has its ingress RRAs (one for each server supported) with the current preference positions as shown. Similarly, each output port is provided with two RRAs (one per each server), also with their current positions as shown.

In the first iteration, RRA(0) and RRA(1) of input port 0 will send one request each to output ports 0 and 1 respectively, and stop at the next positions (i.e., 0→1 and 1→2) due to updating. In input port 1, the first arbiter issues a request to output port 2 and the second arbiter issues a request to output port 0. In input port 2, although both RRAs currently point to 1, they will increment their pointers to the next value because there are no requests to output port 1 (i.e., VOQ q1 is empty). Thus, they both select output port 2. These requests selected by the ingress servers's RRAs are collected in the Request matrix shown in FIG. 13B.

Figures 13B, 13C:
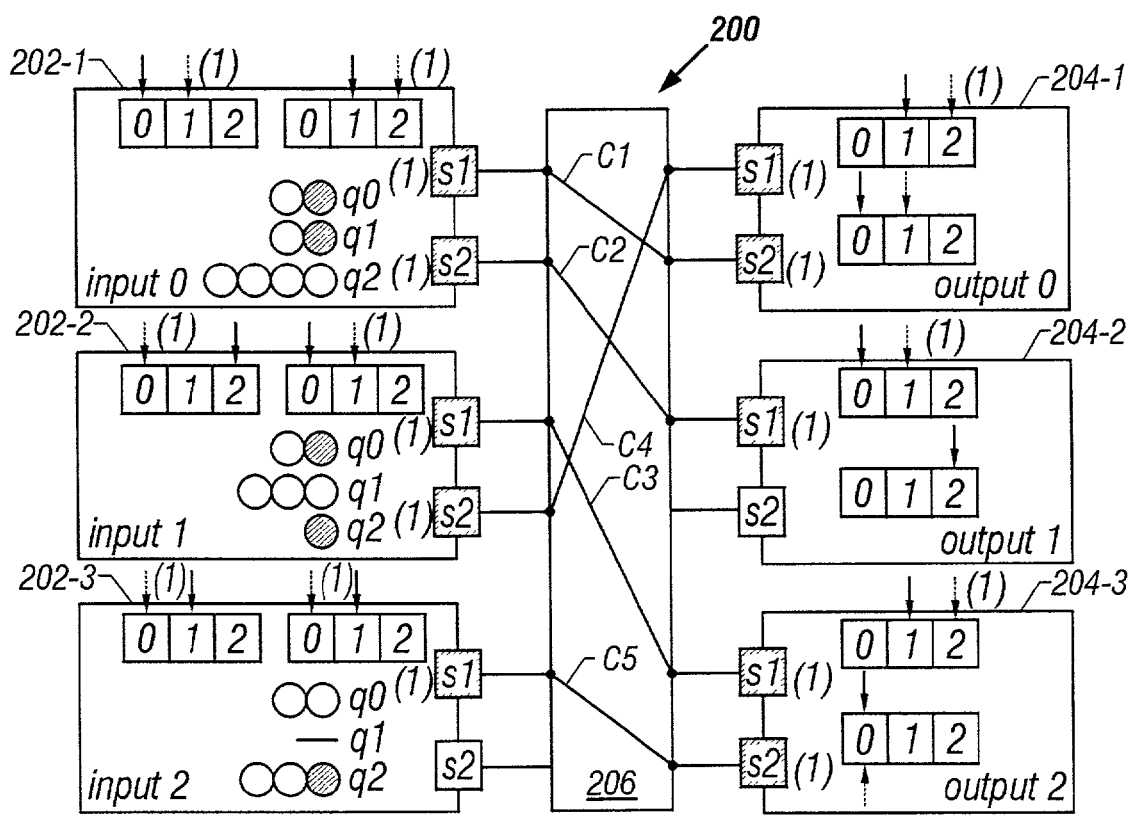

In the Grant phase, output port 0 issues a grant to input port 1 per its RRA(0) and a grant to input port 0 per its RRA(1). In output port 1, the first RRA issues a grant to input port 0. The second RRA will not be solicited, since there was only request to output port 1 (from the second RRA of input port 0). Similarly, output port 2 will grant input port 1 (per RRA(0)). Its second RRA (RRA(1)) will attempt to grant input port 0, but there was no request to it from input port 0. The RRA(1) of output port 2 then increments its pointer to 1 and tries to issue a grant to input port 1. However, this was just granted by RRA(0) of output port 2. Accordingly, the RRA(1) again increments its pointer (now the pointer becomes 2) and issues a grant to input port 2. The pointer of RRA(1) then stops at the next position, i.e., back to input port 0. The grants are captured in the Grant matrix of FIG. 13B. As the grants are implicitly accepted, no separate Accept matrix is necessary. The Schedule matrix is accordingly updated from its initial state to indicate the current connection match status. FIG. 13C depicts the state of the system at the end iteration 1, with five connections (C1–C5) shown therein.

Figures 13D, 13E:
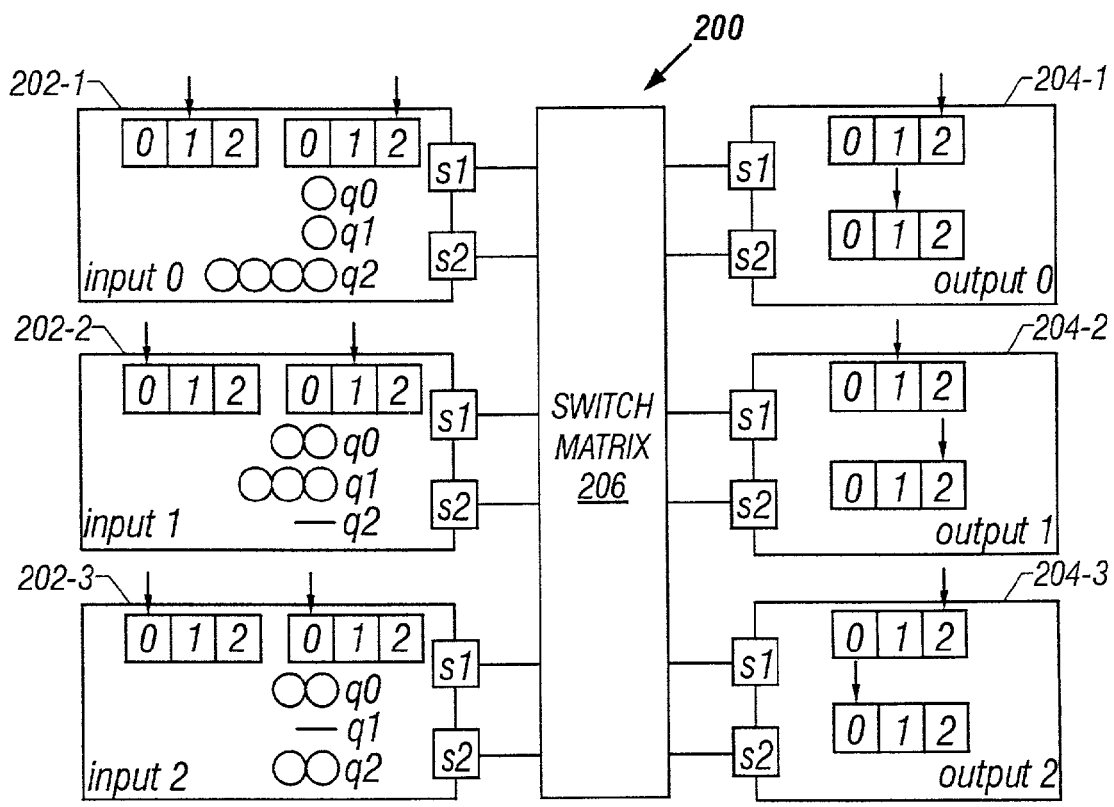

There will be a second iteration in which the second RRA of input port 2 makes a request for output 2 again. However, as can be readily worked out, this request will not be granted, and no additional grants will be issued. FIG. 13D depicts the resultant Request, Grant and Schedule matrices with respect to iteration 2. Because one of the iteration stop conditions has been met (i.e., no more new grants are issued), the iteration halts with the connection matches as shown in FIG. 13C, wherein the transmission units scheduled to be transferred and the matched servers are shaded. FIG. 13E depicts the state of the system after the transfer.

(C) iPP-RGA

The use of a binary tree for switch arbitration is well known (See H. Jonathan Chao, et al., *A terabit IP switch router using optoelectronic technology*, Journal of High Speed Networks, pp. 35–57, IOS Press, 1999, for additional details). The name "Ping Pong" derives from the algorithm's behavior. While the conventional PP algorithm may be advantageous in certain applications because of its simple implementation, it is beset with several deficiencies. For instance, the prior art implementations of the PP algorithm are not iterative. However, as has been pointed earlier, iterative matching is important for improving the utilization of the cross-connect fabric used in a fast switching environment. As an example, consider the following scenario. If an output chooses a particular input and sends a grant, and if the same input had a few grants from other outputs and it selects (through an ingress arbiter) to send to another output, then the first output is not utilized. Implementing an iterative process would solve this problem. Essentially, the next phase of the iteration will drop the input, since it has already picked an output (i.e., matching has been found), and include additional outputs that haven't been matched.

Furthermore, the conventional PP algorithm is operable to pick only one request out of N input requests, which is not adequate for obtaining a maximal match of a switch. Moreover, the prior art implementations of the PP algorithm are deficient with respect to the multiserver, multi-arbiter switch architecture.

The present invention introduces an iterative scheme based on RGA strategy for implementing a plurality of ingress arbiters and egress arbiters within the context of multiple servers. Since the Accept phase is explicit, accept arbiters (RRA) are also provided at the ingress side. These arbiters are operable to select one grant out of a set of grants that they receive from the egress arbiters for every iteration.

The BTAs at the egress side are preferably implemented as two-input arbiters which are updated after every arbitration. As described in detail hereinabove, both reverting and non-reverting options may be implemented with the egress BTAs.

Figure 14A:
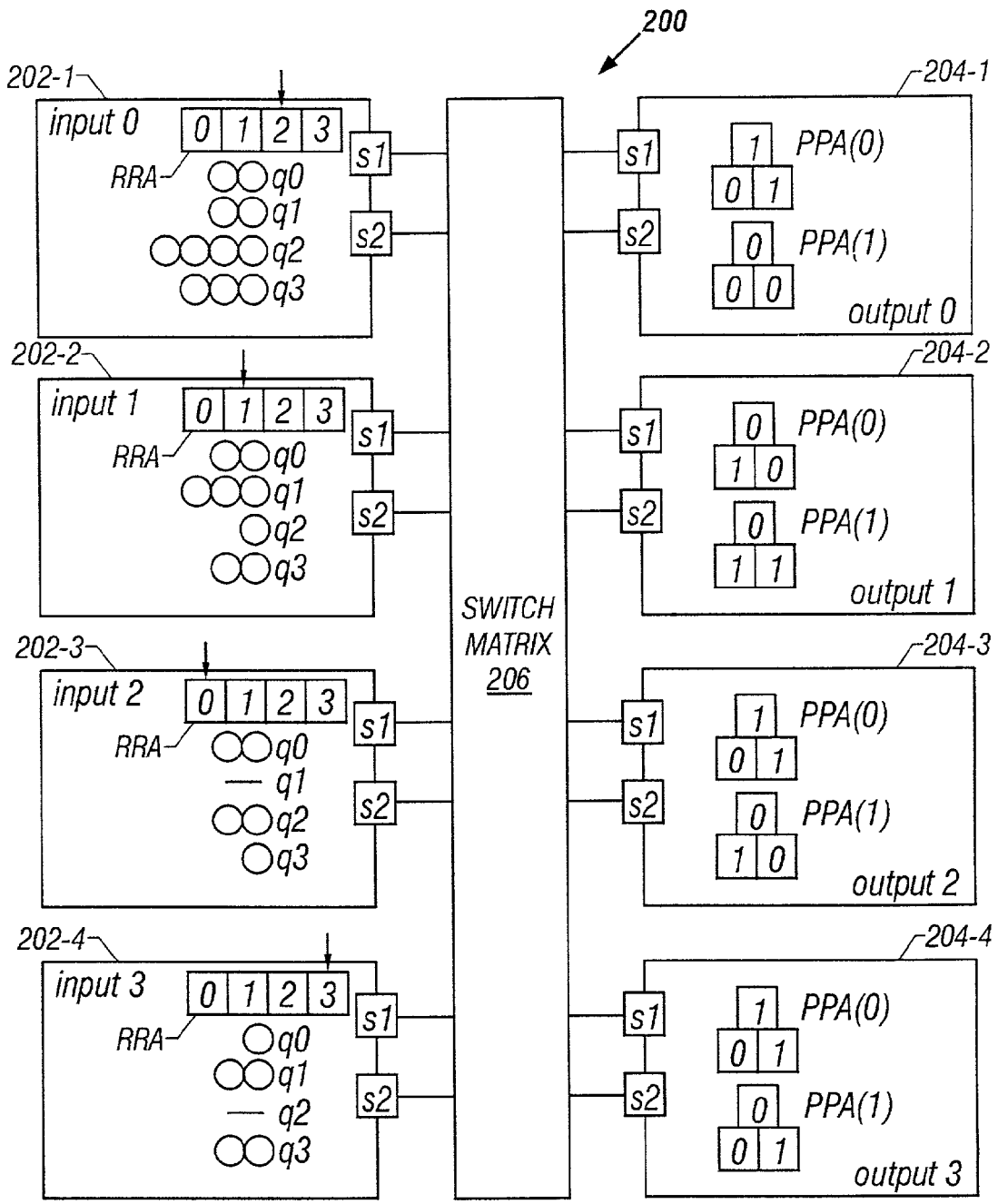

FIGS. 14A–14C illustrate, by way of exemplary iterations, the operation of an iPP algorithm species of the present invention wherein the RGA strategy is used. In this example, N=4 (i.e., four ingress and egress ports). However, the number of servers per port remains as two (H=2) as before. Again as before, a circle represents a request from a particular VOQ. A horizontal line in a VOQ means that it is empty. As for the input RRAs (one per each input port), the solid arrow is the initial position of the persistent pointer at an iteration, whereas the dotted arrow represents its position after an iteration. For the BTAs (or, PP arbiters (PPAs)), the present values of the flags are shown in an inverted tree structure of three squares, where the convention is: 0 indicates left flag and 1 indicates right flag. In the exemplary architecture described herein, each egress server is associated with one PPA.

The initial state of the system 200 is shown in FIG. 14A. The RRAs (one per input port) and PPAs (two per output port, i.e., one per egress server) with their current positions are shown at the ingress and egress sides, respectively. To commence the iterative process, input port 0 has two requests for output port 0 (as there are two circles for VOQ q0, which circles may represent two groups of optical packets in an optical switch implementation). Similarly, it can be readily seen that input port 0 also has 2 requests for output port 1, 4 requests for output port 2, and 3 requests for output port 3. Likewise, input port 1 has 2, 3, 1 and 2 requests for output ports 0, 1, 2, and 3, respectively; input port 2 has 2, 0, 2 and 1 requests for output ports 0, 1, 2, and 3, respectively; and finally, input port 3 has 1, 2, 0 and 2 requests for output ports 0, 1, 2, and 3, respectively. These requests are shown as elements in the applicable Request matrix depicted in FIG. 14B.

In the Grant phase of iteration 1, each output server PPA is used for selecting inputs (i.e., requests) In output port 0, PPA(0) will issue a grant to input port 3, which had one request to that output port (because q0 has one circle as shown in FIG. 14A). The second PPA (i.e., PPA(1)) in output port 0 will lead to a grant to input port 0, which had two requests thereto. In output port 1, the first PPA (i.e., PPA(0)) will grant input port 2; the second PPA will grant input port 1. Output port 2 issues a grant to input port 2 from its PPA(0) and a grant to input port 1 from its PPA(1). Finally, output port 3 will issue a grant to input port 3 from its PPA(0) and a grant to input 0 from its PPA(1). These grants are set forth in the Grant matrix of FIG. 14B.

It should be noted that in PPA(0) of output port 2, there was no request from input port 3 (its q2 is empty), which would have been favored had input port 3 requested it. So the flags choose the next best match, which is input port 2 and only the high level flag is updated after the first iteration.

In the Accept phase of iteration 1, the RRAs at the input side arbitrate and decide which grants to accept out of all the possible grants issued by the PPAs. The largest number of accepts will be from the maximum number of unmatched servers. The accept process can be seen from the RRAs of the input ports as follows. For input port 0, since the pointer is at 2, it will accept grants from output ports 2 and 3 (each had one grant) in order to match its servers S1 and S2. The grant to input port 0 from output port 0 (per its PPA(1)) is not entertained (i.e., rejected) and the RRA's pointer is then updated to 0 (2→3→0). At input port 1, since the pointer is at 1, it will accept the grant from PPA(1) of output port 1. No other grants to input port 1 are available and, accordingly, the pointer is simply updated to 2. At input port 2, since the pointer is at 0, but no grant was issued to it by output port 0, the pointer steps through 1 and 2 whereby it will accept grants from output ports 1 and 2. The pointer is then updated to 3. Finally, at input port 3, since the pointer is on 3, it will accept grant from output ports 3 and 0. The pointer is subsequently updated to 1 (3→0→1).

The Accept matrix shown in FIG. 14B depicts the above-described accepts in a matrix. These accepts are sent to the output PPAs so that the "commitment" of the flags can be done. It should be noted that only one grant (from PPA(1) of output port 0) has not been accepted. FIG. 14C depicts the state of the system after the first iteration. The Schedule matrix (initially set to 0) is updated using the Accept matrix for setting up the matches between the ingress and egress sides. In the next iteration, a request from from input 0 to output 1 will be granted by PPA(1) of output 1. Since a full matching has been found, the next iteration (i.e., third iteration) will stop the algorithm.

It should be appreciated that the PP scheduling mechanism described hereinabove not only accommodates an iterative strategy (namely, the RGA strategy), but is also advantageously operable within the context of the multiserver architecture. Favorable results have been obtained by way of simulation where the performance of the iPP-RGA scheme of the present invention has been observed to be substantially similar to that of the MSLIP scheme described earlier.

Further, those skilled in the art should recognize that an iteration-capable PP scheme may also be implemented in a manner similar to the MDRR scheme set forth hereinabove. It is believed that such an implementation may provide additional improvement in the performance because the mechanism would reduce the number of requests from [$N^2$] to [N] per iteration per server, which would reduce control information exchange between the arbiters.

(D) iPP-RG

This PP algorithmic species of the present invention follows the iterative RG strategy within a multiple server architecture and uses BTAs at both ingress and egress sides. Preferably, the input BTAs can execute in parallel, with a final reduction (minimizing the difference between selected requests and actually remaining requests) so as to make optimal valid requests. The Grant phase is then performed serially, so that each output BTA takes into account the already granted requests. In addition, the remaining requests from an input or to an output that has just been matched are reset to 0 for the rest of the cycle. As opposed to the iPP-RGA mechanism set forth above, there is no revert mode in this case, since the RG approach issues only acceptable grants (implicit acceptance).

In the Request phase, all available ingress server arbiters are presented the same input so that they can perform their selection in parallel. If the remaining requests (in the iterative sense) are represented in a matrix R, then the same row i of this matrix is presented to the arbiters in input port i. Each one will select a certain non-null element in this vector according to the current state of the flags, and then will augment the unreduced arbiter Request matrix. Since a given request could be selected several times, all these selections have to be checked against the actual number of requests, i.e., minimized to this number if necessary. One skilled in the art should appreciate that all these operations can be executed in parallel in a hardware implementation in order to achieve a low degree of latency.

Figure 15A:
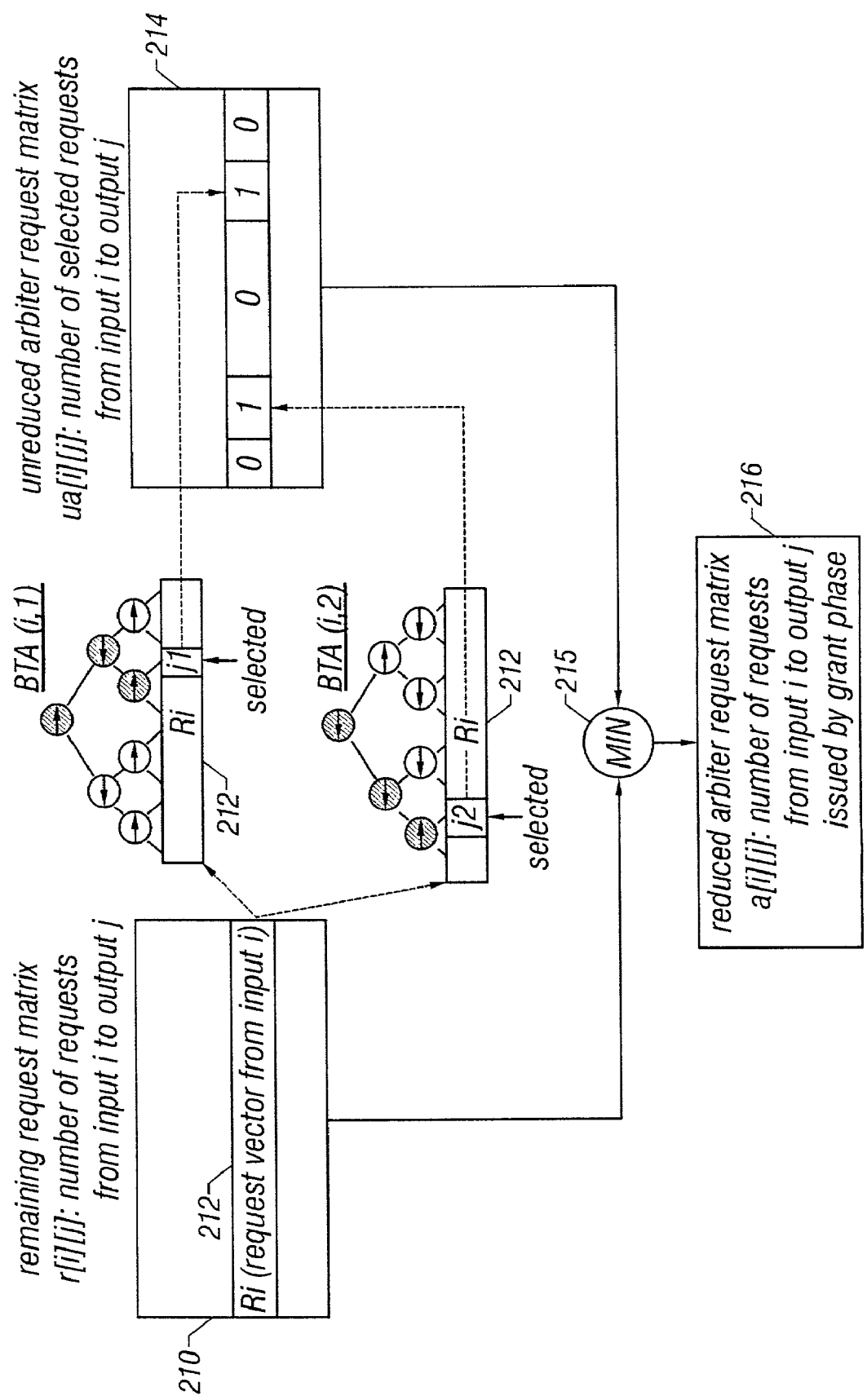
FIGS. 15A and 15B illustrate the operation of an exemplary iterative Ping Pong (iPP) scheduling mechanism using the Request-Grant (RG) arbitration iteration strategy.
Figure 15B:
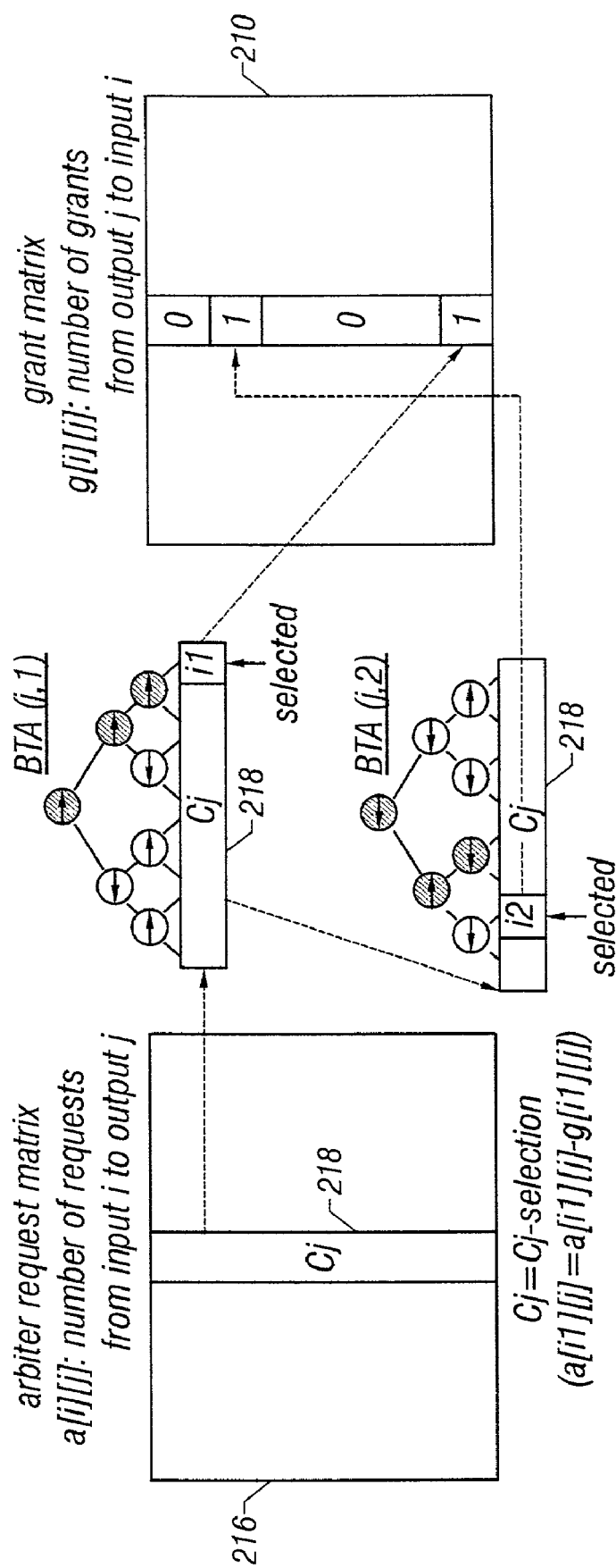

Referring now to FIGS. 15A and 15B, depicted therein is an illustrative mechanism describing the operation of an exemplary iterative PP scheduling mechanism using the RG arbitration strategy. More particularly, FIG. 15A illustrates the Request phase of the iPP-RG algorithm of the present invention. Reference numeral 210 refers to the remaining request (R) matrix wherein r[i][j] refers to the number of requests from input i to output j. Reference numeral 212 refers to a request vector (R[i]) having all the requests from a single input port i to the j output ports, j=1, 2, . . . , N. As pointed out earlier, the same row (i.e, R[i]) is presented to the multiple BTAs supported by input port i. BTA[i,1] represents a BTA operable to select a request from input port i to output port j1 based on the current state of its flags. The shaded circles (with arrows in them) exemplify the BTA selection process which has been described in greater detail hereinbefore. Similarly, BTA[i,2] represents a BTA operable to select a request from input port i to output port j2. It should be apparent that both these requests form respective elements in the request vector R[i].

Reference numeral 214 refers to the unreduced arbiter (UA) request matrix, where ua[i][j] refers to the number of selected requests from input i to output j. Row UA[i] contains integers ua(i,j), which can be greater than 1. A minimizer 215 is employed to obtain a reduced arbiter (A) request matrix 216 based on the R and UA matrices, where a[i][j] denotes the number of requests from input entity i to output entity j which are issued grants in the Grant phase. Mathematically, $\forall$ i and $\forall$ j, $a_{i,j}=\min\{r_{1,j}, ua_{i,j}\}$. FIG. 15B depicts the Grant phase in additional detail. In the Grant phase, each issued grant has to be final. Therefore, the BTAs cannot execute in parallel. Accordingly, the egress BTAs are used serially as follows. The first available arbiter (e.g., BTA [j,i1]) in output port j is presented the column j (C[j]) 218 of the reduced arbiter matrix 216. It performs its binary selection on it, which corresponds to a grant that is added to the grant matrix. However, the granted request is removed from the request matrix so that it cannot be granted again. Once the corresponding element in C[j] has been decremented, it is presented again to the next available arbiter, e.g., BTA[j, i2]. That is, the decremented C[j] which is now equal to {previous C[j]-selection} is presented to BTA[j,i2]. The following matrix algebraic equation may be used for obtaining the decremented C[j] elements:

$$\{a[i1][j]\}_{current} = \{a[i1][j]\}_{prior} - g[i1][j]$$

If output entity j becomes completely matched, the elements in C[j] in the arbiter matrices (as well as in the remaining requests matrix) are set to 0. Similarly, should the input i become completely matched, the elements in rows i (as well as in the remaining requests matrix) are set to 0.

Based on the foregoing discussion regarding the iPP-based scheduling mechanisms, it should be appreciated that the present invention advantageously introduces the robustness of iteration into the conventional PP scheme, wherein either RG or RGA strategies may be implemented depending on implementational objectives. Favorable results have been obtained by way of simulation and it has been observed that the performance of iPP methodology closely matches that of iSLIP, even where multiple servers and multiple arbiters are involved. Further, since binary tree structures are simple to implement in hardware, extremely fast hardware realizations of the instant iPP algorithmic species of the present invention may be readily obtained.

(E) Flexible Ring Dual Round Robin (FRDRR)

A primary goal of the switch scheduler design of the present invention is to maximize the use of switch matrix resources by: (a) establishing the maximum number of simultaneous connections through the matrix for each slot time; and (b) transferring the maximum number of cells through the matrix for each connection. These concerns are particularly important in the context of high-performance optical switching systems operating at terabit capacities.

In situations where all input queues are full, there is little difficulty in satisfying condition (b) above. When a queue is selected for output, a full slot count of cells may be taken from the head of the queue and transferred through the switch matrix. When a queue does not contain enough cells to compose a full slot transmission unit, that queue can be safely ignored for the current matrix cycle, given that full slots may be taken from other queues that have enough data.

It is expected that after a period of time, a short queue will eventually accumulate enough cells to compose a full slot transmission unit.

A problem arises where there is simultaneously uneven data traffic into the different input queues and a requirement that the data be transferred through the switch in less than a predetermined time limit. In that case it will eventually become necessary to transfer short (i.e., unfilled) slots through the matrix in order to clear data cells before they grow stale. Transferring short slots cuts into the capacity of the switch, since the short slots represent unused capacity. Balancing the trade-off between maintaining full slots and avoiding data timeout requires monitoring such parameters as data age, queue length, etc., and ensuring that potentially stale data cells are scheduled through the switch matrix in slots that are as full as possible. However, ultimately there is a limit to the throughput of the switch for any degree of traffic imbalance (i.e., polarization) in queue traffic loads.

The FRDRR scheduling algorithm of the present invention overcomes this problem by favoring the fullest VOQs in the round robin explorations. Thus, the scheme set forth herein makes the maximum use of information as data age parameters, queue statistics/metrics, and the like. Essentially, in one exemplary implementation, the present scheme takes into account the respective lengths of the input VOQs. Further, the ingress RRAs are replaced by a "flexible ring" (a variable circular queue) in which the requests are queued as they are received in the ingress ports. The VOQs are still selected in a round-robin-like fashion from the flexible ring, but it operates on the individual transmission unit requests than on the VOQ identification numbers. Thus, the fullest queues are favored in proportion to their current number of requests. This flexible ring functions as an RRA wherein the arbitrated entities can be dynamically modified (e.g., granted requests are removed and new requests are appended.)

Figures 16A, 16B:
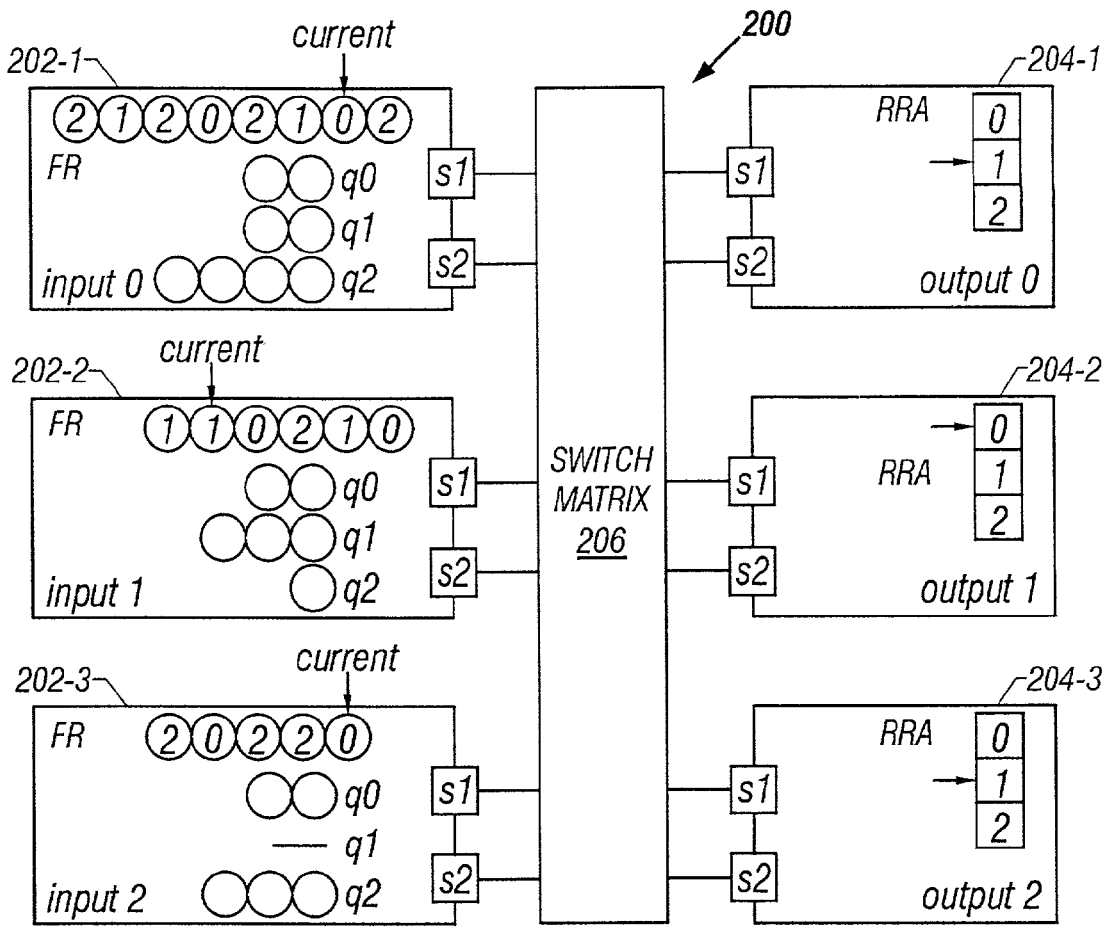
FIGS. 16A–16G illustrate the operation of an exemplary flexible ring dual round robin (FRDRR) scheduling mechanism of the present invention.

FIGS. 16A–16G illustrate the operation of an exemplary FRDRR scheduling mechanism of the present invention. As before, the 2-server/3-port system 200 is used for exemplifying two iterations, wherein each port is associated with a single arbiter and the RG strategy is used. In particular, FIG. 16A depicts the initial state of the system. The current pointer associated with the input ports shows the request that currently has the highest priority in the corresponding flexible ring's circular queue. In iteration 1, the first request set in input port 0 will be for output ports 0 and 1, and the pointer will be stopped at the next request (for output 2). Input port 1 will issue two requests for output port 1 and the pointer will go back to the head of the queue. Similarly, input port 2 will also issue a request for output ports 0 and 2, and the pointer will stop at request for output port 2. These requests are captured in the Request matrix shown in FIG. 16B, where a row contains the requests issued by an input port and a column contains the requests received by an output port (as before with respect to the exemplary algorithmic mechanisms described hereinabove).

Figures 16C, 16D:
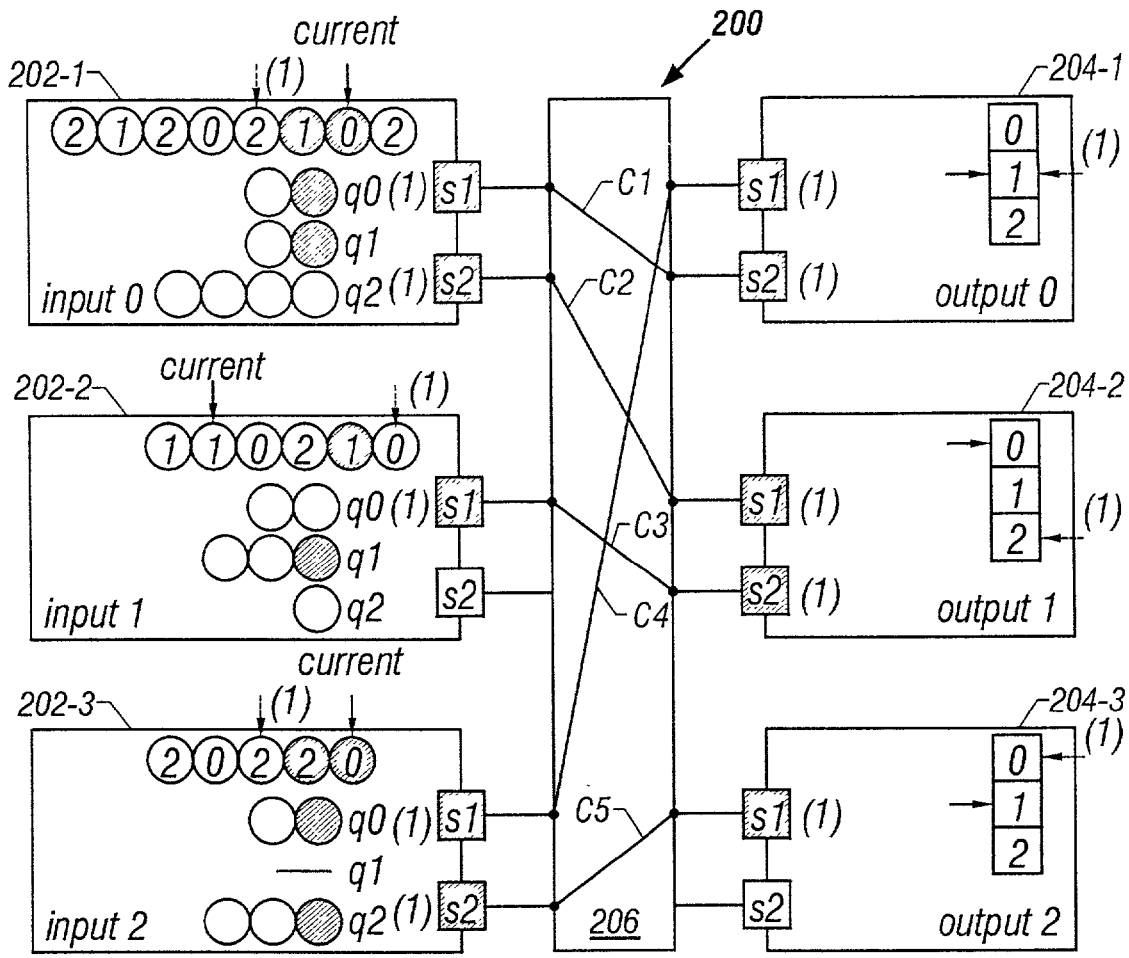

In the Grant phase of iteration 1, the egress RRAs have an initial state from which they commence the granting process. Output port 0 starts issuing a grant to input port 1, but as pointed out in the foregoing, input port had no requests to that output port. Thus, the RRA pointer of output port 0 steps to 2 (issuing a grant to input port 2) and back to 0 (issuing a grant to input port 0). Accordingly, the RRA pointer stops at 1 again (indicating input port 1 for the granting process in the next iteration). Output port 1 had three requests (one from input port 0 and two from input port 1), among which only two can be entertained for granting (because the number of servers, H=2). The RRA associated with output port 1 starts at 0, issuing a grant thereto, and steps thereafter to input port 1 to issue a grant to it. The pointer then stops at 2. Output port 2 will entertain its single request received from input port 2 and issue a grant thereto. Subsequently, the pointer steps through 2 to stop at 0. The resultant Grant matrix is shown in FIG. 16B, which matrix is used to augment the Schedule matrix (initialized to 0), also shown in FIG. 16B. The matching status of the system is depicted in FIG. 16C, with five connection matches (C1–C5) illustrated therein. The matched servers are again illustrated as shaded squares.

Since additional grants can issue, a second iteration will take place. Input ports 0 and 2 are fully matched (i.e., both S1 and S2 of these ports are connected to respective egress servers). However, input port 1 still has one unmatched server (S2). It iterates through the flexible ring's circular queue: output ports 0 and 1 are skipped, since their servers are fully matched. Input port 1 then issues a request to output port 2 and, accordingly, its pointer stops at 0 (for the next request to output port 0). In the Grant phase of iteration 2, output port 2 will select this request from input port 1 and its RRA pointer then stops at 2. This new grant is added to the Schedule matrix. The Request, Grant and Schedule matrices associated with the second iteration are shown in FIG. 16D.

Figure 16E:
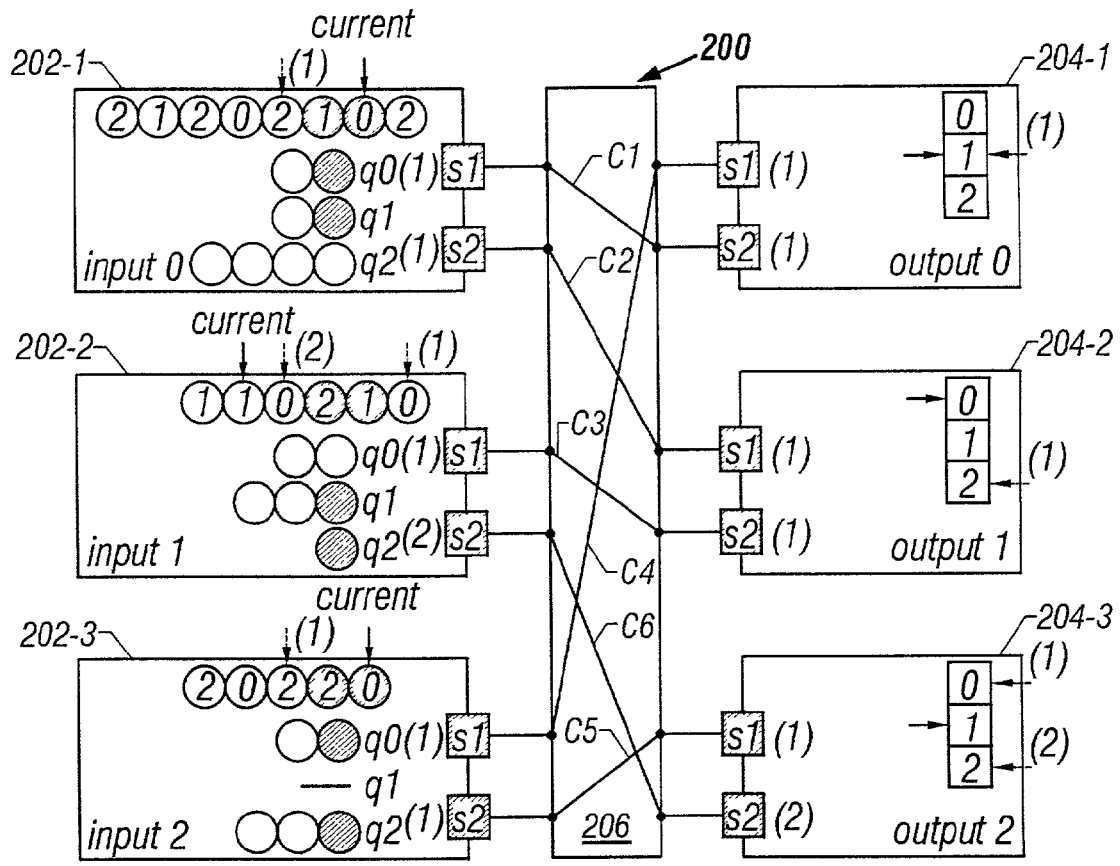
Figure 16F:
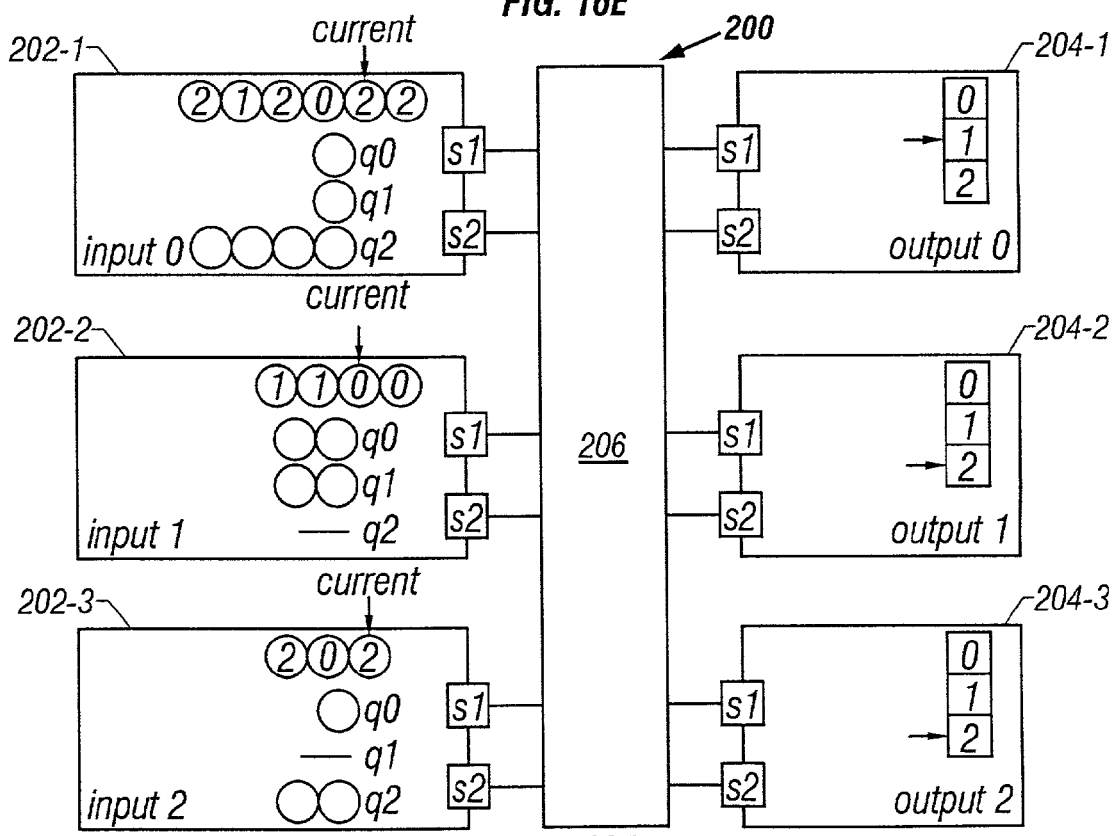
Figure 16G:
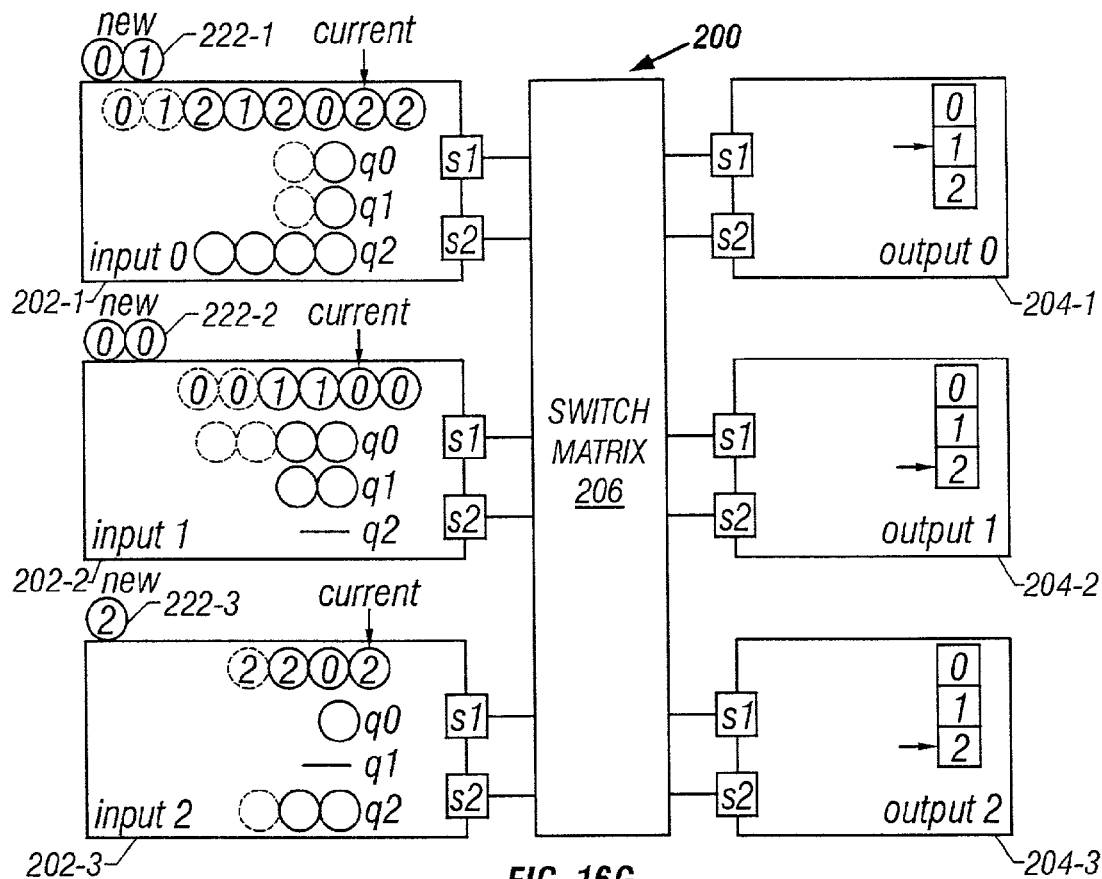

FIG. 16E depicts the status of the system after iteration 2 with six matches. FIG. 16F depicts the system state after the scheduled transfers have been processed through the switch matrix. FIG. 16G depicts an example of where new requests are added, which new requests will be queued in their respective circular lists for the next matrix slot. For example, reference numeral 222-1 refers to two new requests (shown as dotted circles) that will be added to the FR arbiter of input port 0. Similarly, reference numeral 222-2 refers to two new requests to be added to the list of input port 1 and reference numeral 222-3 refers to one new request to be added to the list of input port 2.

(VI) Prioritized Dual Round Robin (PDRR)

In a further enhancement of the MDRR algorithm presented earlier, the requests made by the ingress entities can be prioritized based on different performance criteria. For instance, two levels of priority can be implemented wherein the requests are classified as follows: regular requests and alarm requests. In an exemplary embodiment, two situations could be considered urgent enough to raise an alarm: when a queue fills up ("queue full" alarm) or when a queue's oldest transmission unit is about to go stale (e.g., when the remaining time to process the unit before expiration becomes smaller than a threshold). Also, the filling ratio of the transmission units (with sub-layer data) may be managed by not making requests for incomplete transmission units. Therefore, a VOQ will enter the request competition only if it has at least one full transmission unit or if it has an "age alarm". Additional variations within this context comprise situations where: (i) an input port can issue a request for an incomplete transmission unit even without an alarm if the load is small (i.e., if there is no competition for its servers), and (ii) the scheduler can execute more iterations after the normal stop conditions without considering the priorities so as to try to increase the number of matches.

In comparison with the MDRR scheduling algorithm detailed earlier, the following additional parameters are proposed herein for implementing the priority-related improvements: (i) NCYCLES_LIMIT: threshold number of matrix cycles or slots that is considered small enough to raise the age alarm, and (ii) BACK_TO_NO_PRIORITY: a Boolean value that indicates whether or not to execute more iterations without priorities after obtaining convergence with priorities. Since the requests and grants are made with respect to the priorities, it is possible that no matches are found in an iteration whereas some servers are still available. Therefore, by ignoring the priorities for the remaining servers, more matches can be found. It should be recognized that although this feature increases the efficiency of the algorithm, the number of iterations can also be significantly increased accordingly.

The ingress entity requests are constructed as follows.
For each VOQ, compute NBC_LEFT, the number of cycles left for the oldest transmission unit to become stale (i.e., the expiration delay minus the age of the transmission unit).
If NBC_LEFT<NCYCLES_LIMIT, raise the alarm for this VOQ and count the last (possibly incomplete) transmission unit in the number of requests.
Otherwise, the alarm is not raised and the number of requests will only count the number of completely filled transmission units.
If the total number of requests for all VOQs is smaller than the number of servers in the ingress point (i.e., underload conditions), then search for the fullest incomplete transmission units in regular VOQs (no alarm) to issue more requests.

The various steps of the PDRR algorithm of the present invention may be itemized as follows:
In the Request phase, the alarm requests are processed first (i.e., all the RRAs are used, but only for the alarm requests) to issue the scheduler internal requests at each iteration.
If there are still unmatched servers, proceed with regular requests.
In the Grant phase, use the RRAs only for the alarm requests initially, and proceed with the regular requests if there are still unmatched servers.
After each iteration, check if matches were found. If none were found and if BACK_TO_NO_PRIORITY is true, then reset all the priorities and continue the iterations. When a cycle with no additional matches is encountered, the iterations will stop.

Figure 17A:
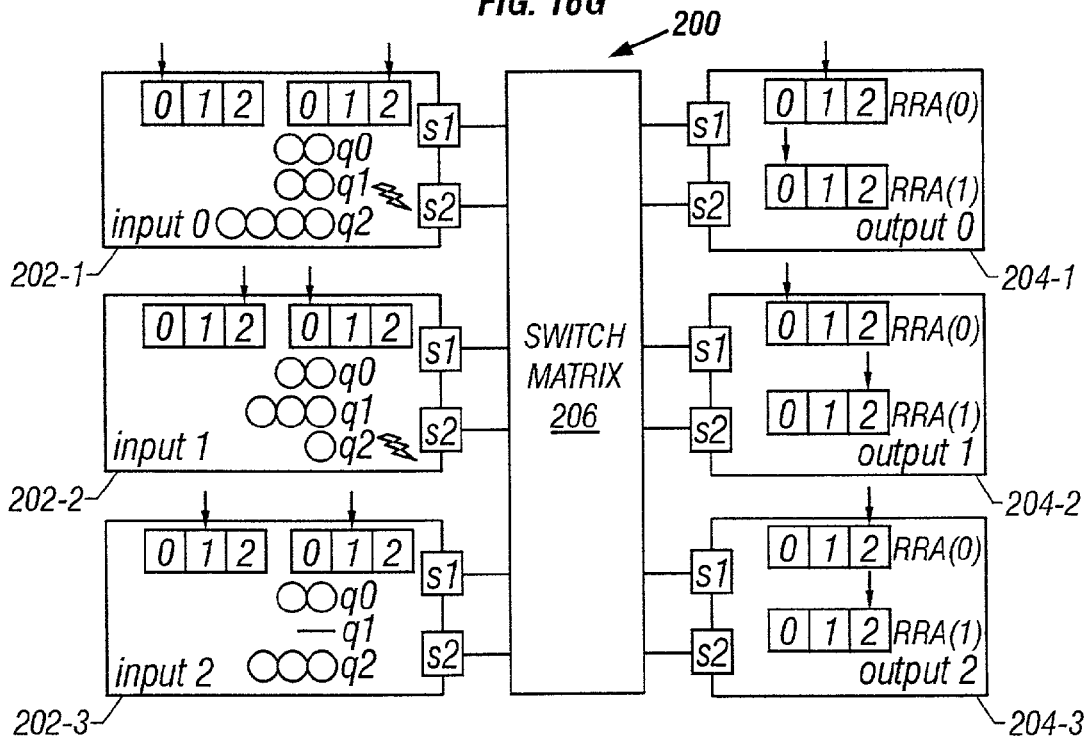
FIGS. 17A–17F illustrate the operation of an exemplary prioritized dual round robin (PDRR) scheduling mechanism of the present invention.

FIGS. 17A–17F illustrate the operation of an exemplary PDRR scheduling mechanism of the present invention. Once again, the exemplary 2-server/3-port system 200 will be utilized for illustrating two iteration cycles, wherein the RG strategy is applied with respect to the one-RRA-per-server architecture (i.e., each port is associated with two RRAs). FIG. 17A depicts the initial state of the system 200. Again, circles represent the pending transmission units (thus, requests associated therewith) for each VOQ. Alarms are depicted as lightning symbols.

In the first iteration, the first RRA (i.e., RRA(0)) in input port 0 is set to 0. There is a request for output port 0 (as VOQ q0 is non-empty); it is, however, without an alarm. Therefore, the RRA's pointer will step through the circle until (and if) it finds a request with an alarm. As can be seen in the example, requests for output port 1 have an alarm (because of the lightning symbol next to the VOQ q1). Accordingly, this RRA will create an iteration request from input port 0 to output port 1 and stop at position 2. The second RRA (i.e., RRA(1) in input port 0 is set at 2, but again, the requests associated with q2 are regular requests. Thus, the pointer will step through positions 2 and 0, select q1 (still having a non-empty alarm request), and stop at position 2. Therefore, input port 0 has selected the two alarm requests from q1, both destined for output port 1.

In input port 1, there is only one alarm request (in VOQ q2) that is destined for output port 2. RRA(0) of input port 1 will select it (its pointer is set at 2), and then stop at position 0. The second RRA (i.e., RRA(1)) attempts to find an alarm request on input port 1, but as there are no more alarm requests, it will select output port 0 when exploring the requests for the next or lower priority value. The RRA's pointer is then updated to position 1.

Figures 17B, 17C, 17D:
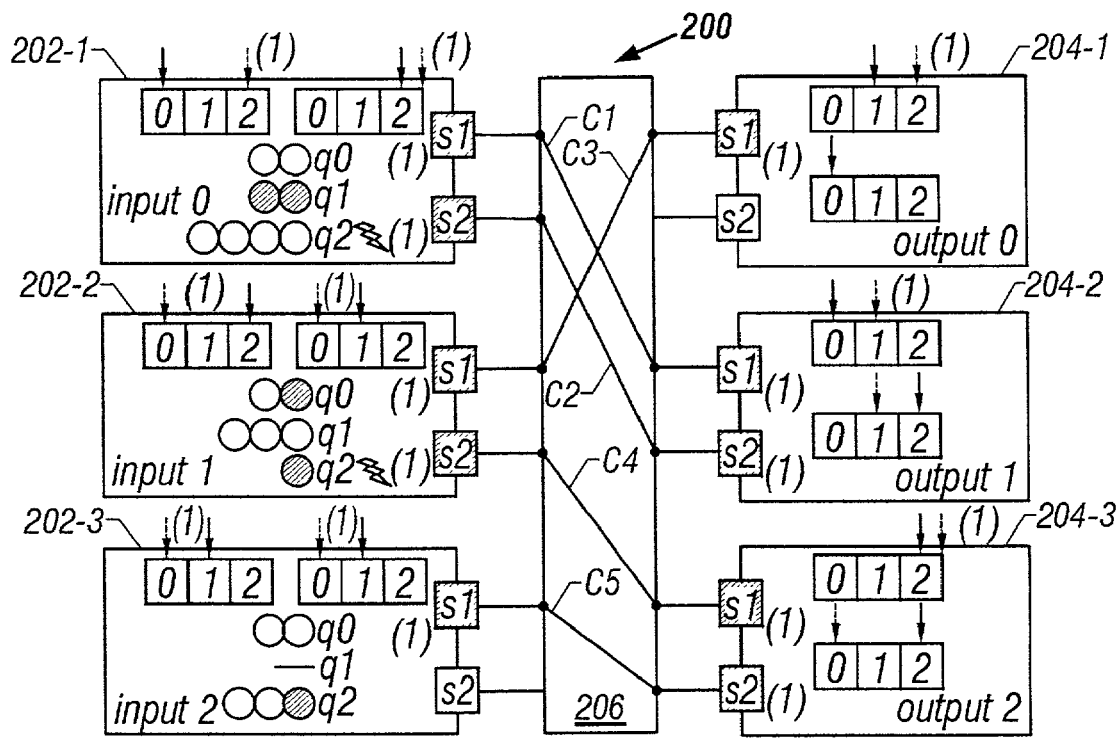

In input port 2, there are no alarm requests; the two RRAs associated therewith will accordingly attempt a futile search for them first. Thereafter, the RRAs explore the requests having the next priority level. RRA(0) is pointed to 1, but q1 is empty. Thus, it steps to position 2, finds a pending request, and stops at position 0. The second RRA (RRA(1)) goes through the same process, whereby another pending request from q2 is selected. FIG. 17B depicts the Request matrix and the associated Alarm matrix obtained in accordance with the foregoing. Preferably, the Alarm matrix is a Boolean table to indicate whether there is at least one alarm request.

As for the Grant phase of the first iteration, a similar selection process is performed on the egress side. In output port 0, where no alarm requests were received, but only one non-alarm request from input port 1, the first RRA will select it (as its pointer is at 1) and then stop at position 2. In output port 1, two requests were received from input port 0, both of which were with an alarm. The two RRAs of output port 1 will select them and then stop at position 1, respectively. In output port 2, an alarm request was received from input port 1, as well as two non-alarm requests from input port 2. The first RRA's pointer is at 2, which therefore steps through 0 to 1 to select the alarm request from input port 1, and then stops at position 2. The second RRA's pointer is at 2, and therefore selects a non-alarm request from input port 2. Its pointer is then updated to position 0. FIG. 17C depicts the state of the system 200 after iteration 1, wherein five connection matches (C1–C5) are illustrated.

Figure 17E:
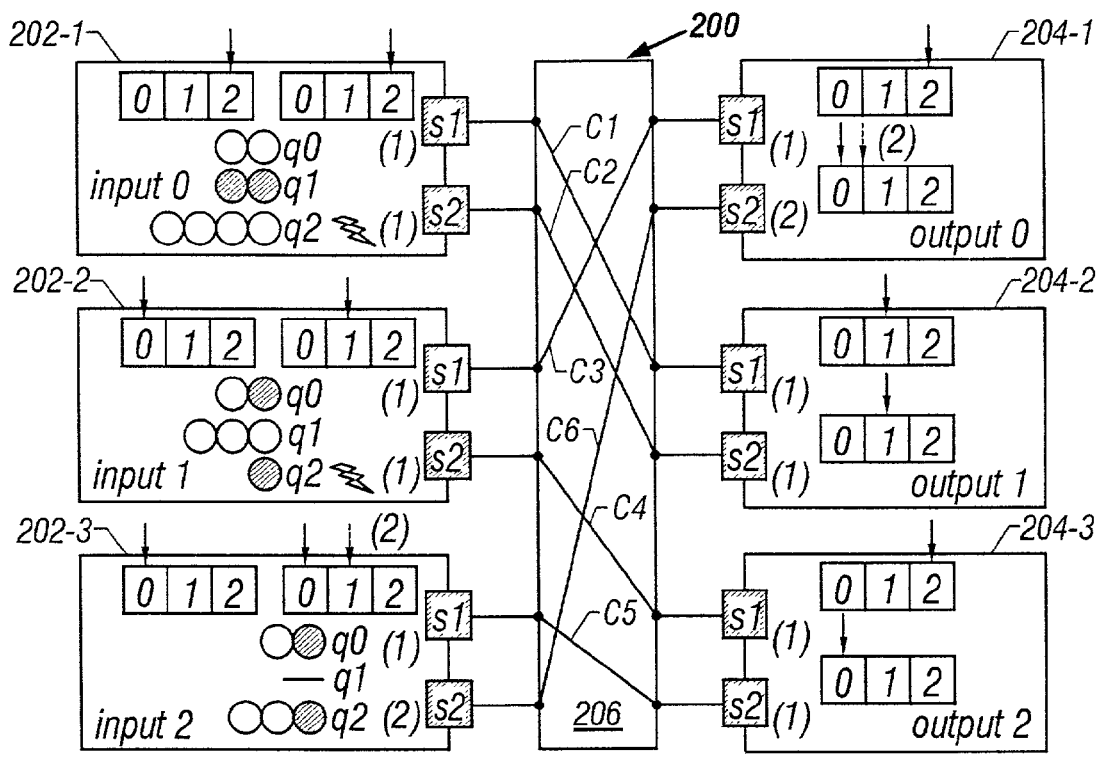
Figure 17F:
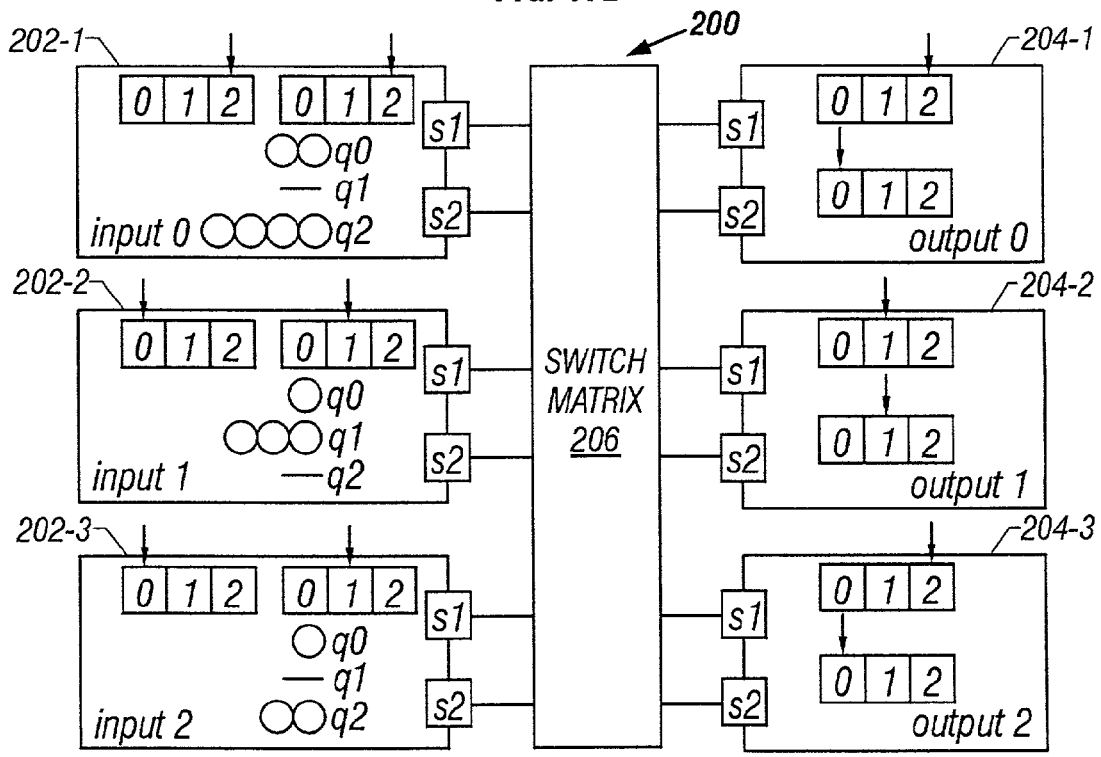

Both S1 and S2 of input ports 0 and 1 are matched; therefore, only input port 2 will attempt to issue requests in iteration 2. Since S1 is matched, the first RRA is no longer involved in the request competition. The second RRA is set at 0 and selects a pending non-alarm request from VOQ q0, and then stops at position 1. Note that if it had been set at 2, it would not have selected q2 because output 2 is already fully matched (i.e., all its servers are used). In other words, matches at the end of iterations are memorized in order to avoid making requests to fully-matched output ports. In the Grant phase of iteration 2, the second RRA of output port 0 will grant the request from input port 2 and increments its pointer to 0. The Schedule matrix is subsequently updated by this additional grant. FIG. 17D depicts the Request, Grant and Schedule matrices obtained after iteration 2. Note that since no alarm requests were involved in iteration 2, the Alarm matrix remains unchanged. FIG. 17E depicts the fully matched state of the system after two iterations, wherein six matches (C1–C6) are illustrated. FIG. 17F depicts the state after the scheduled transmission units have been transferred, which state forms the initial state for the next matrix cycle.

Based on the foregoing Detailed Description of the exemplary algorithmic species of the present invention, several advantages of the innovative features hereof should be apparent. The disparity between transmission and switching speeds can be beneficially alleviated by having multiple servers at both ingress and egress sides of the switching fabric, wherein incoming traffic—which can be comprised of units having variable length (e.g., IP packets)—can be encapsulated into predefined transmission units for maximum throughput. Since multiple arbiters are available, competition for control signals (requests, grants and accepts, or request and grants) can be managed on a parallel basis. Thus, the arbitration times are not negatively impacted. Further, by keeping the slot time constant, parallelization improves the bandwidth of the ports, whereby the overall switching speed of the network element (switch/router) can be significantly improved without increasing the number of ports.

It should further be appreciated that the several algorithmic species described herein are specific variations of a generalized scheduler construct that is advantageously abstracted at a high-level. By varying the arbiter/server architecture, iteration strategy, etc., numerous scheduling algorithms can be spawned that can be fine-tuned to be optimal for different applications. Accordingly, it is convenient to conceptualize the generalized scheduler construct of the present invention as a "metascheduler" whose operation has been detailed in the flow charts presented earlier. It is of some benefit to briefly revisit the overall steps at this juncture. Upon specifying the server/arbiter architecture, arbiter types, iteration strategy, etc., the Schedule matrix is initialized for each matrix cycle. For each iteration within the matrix cycle, the Request matrix containing all pending requests is initialized. As has been pointed out, generation of these requests depends on the various strategies involved. Matches found in the iteration (iteration matrix M), which is reset for each iteration, is used to update the Request matrix (by subtracting the iteration matrix therefrom). The Schedule matrix is cumulatively updated at each iteration such that the matches found in each iteration are added to it. If no additional matches are found, the iterations stop and the Schedule matrix is sent to the switch matrix controller for transferring the data in accordance therewith. The process starts again for the next matrix cycle.

Because of the use of multiple arbiters, any specific algorithm of the present invention can involve either serial or parallel execution of the arbiters. In sequential execution, an arbiter selection depends on previous arbiter selections in a given iteration and for a given port. The parallel execution comprises presenting the same source vector to the arbiters of all non-matched servers, i.e., "available arbiters". The source vector can be either a row or column in an intermediate matrix, depending on the side (ingress or egress) and on the strategy. For instance, rows of the remaining request matrix are presented to the available ingress arbiters during the Request phase of the RG strategy. A matrix reduction procedure may be employed in validating the parallel selection by taking the minimum between the source matrix and the result matrix, element by element.

Those skilled in the art should recognize that the generalized scheduling scheme set forth in the foregoing detailed description is agnostic with respect to any Quality of Service (QoS) parameterization of the incoming traffic. However, it should be realized that the teachings contained herein can be advantageously extended to include various QoS-based features within the muliserver, multi-arbiter scheduling methodology of the present invention. These extensions will be described in further detail immediately hereinbelow.

Figure 18:
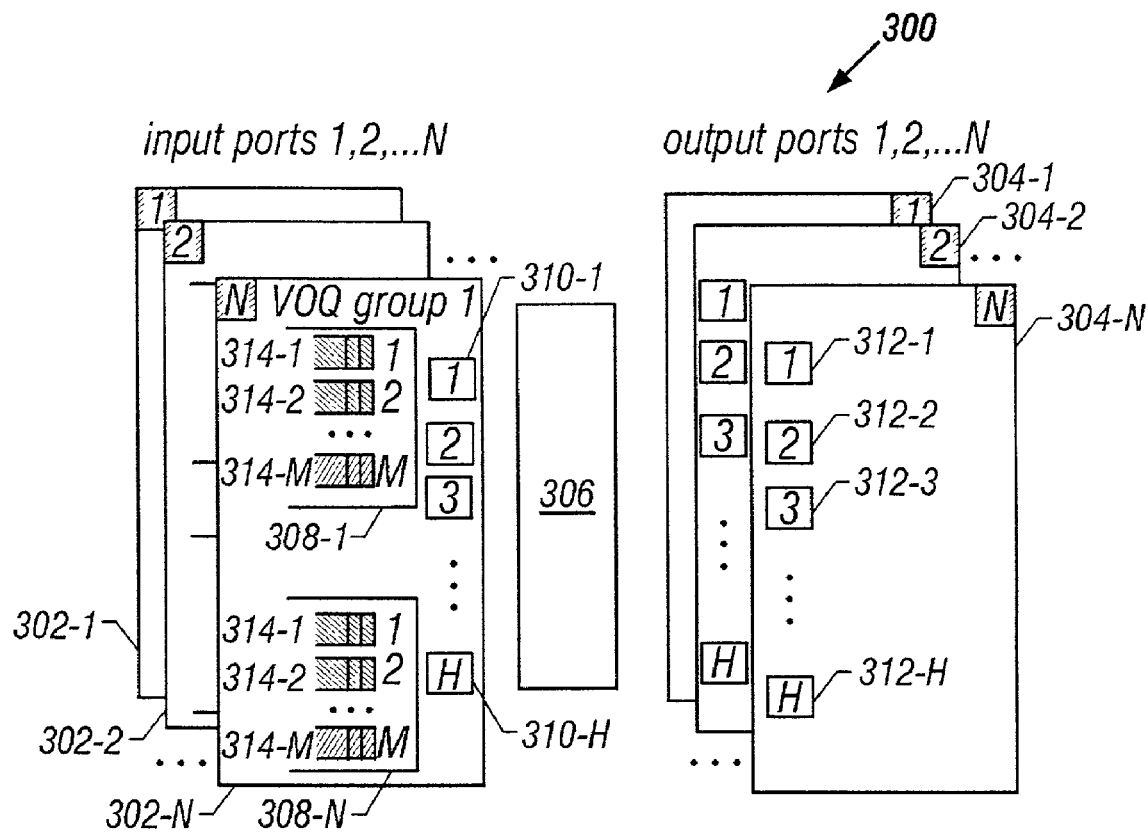
FIG. 18 depicts a high-level architectural block diagram of an exemplary switch element wherein the virtual output queues of the ingress side are sub-divided based on Quality of Service (QoS)

Referring now to FIG. 18, shown therein is a high-level architectural block diagram of an exemplary QoS-aware switch element 300. Similar to the exemplary switch architecture described above in reference to the generalized scheduler scheme of the present invention, the switch element 300 includes an N×N switch matrix 306 disposed between N input ports (reference numerals 302-1 through 302-N) and N output ports (reference numerals 304-1 through 304-N). Once again, it should be remembered that the term "ports" is comprehensive of any ingress or egress architecture and thus includes ports, line cards, burst cards, and the like.

Each input port is provided with a plurality of servers, e.g., H servers with reference numerals 310-1 through 310-H. In similar fashion, each output port is also provided with H servers (reference numerals 312-1 through 312-H). Incoming traffic is assembled in composite transmission units with applicable encapsulation, if necessary to achieve a fixed length. As before, the transmission units are staged through N VOQs supported by each ingress port in order to overcome the HOL blocking problem. H is a divider of N (where H=N, H>N, or H<N) and each ingress server can transfer N/H transmission units at each matrix cycle (or, slot time).

Since the incoming traffic is QoS-based, transmission units are assigned multiple priority levels (also referred to as "planes") depending on one or more applicable QoS parameters. Accordingly, each VOQ is actually a group of sub-queues, each of which sub-queues holds traffic belonging to a particular QoS level. Since the sub-queues belong in a specific VOQ group, they are all scheduled to be routed to the same egress port. In the exemplary switch element 300, reference numerals 308-1 through 308-N refer to N VOQ groups, each having M sub-queues (reference numerals 314-1 through 314-M) that correspond to M QoS-based priority planes. The priority plane or level (a number between and including 1 and M) is obtained from the QoS policy governing the network in which the switch element 300 is deployed. At each slot, an input server can be allocated by the QoS-aware scheduler of the present invention to any of the N*M VOQ sub-queues in its port.

As before, the purpose of the QoS-aware scheduler is to establish a maximal number of connections between the ingress servers and egress servers. In essence, the solution of the present invention implements arbitrations in parallel per priority class. It should be appreciated that the priority class can be adopted either on a per port or per server basis, and the individual arbiters can be implemented as an RRA, BTA, or any other type of arbiter. Also, where the traffic is unbalanced for some reason, internal prioritization (such as alarm levels) of the requests can be additionally included, much like the PDRR scheme described hereinbefore. Where the requests are classified based on internal levels, such levels can be treated as subpriorities in order to distinguish them from the externally-imposed, QoS-based priorities.

Figure 19:
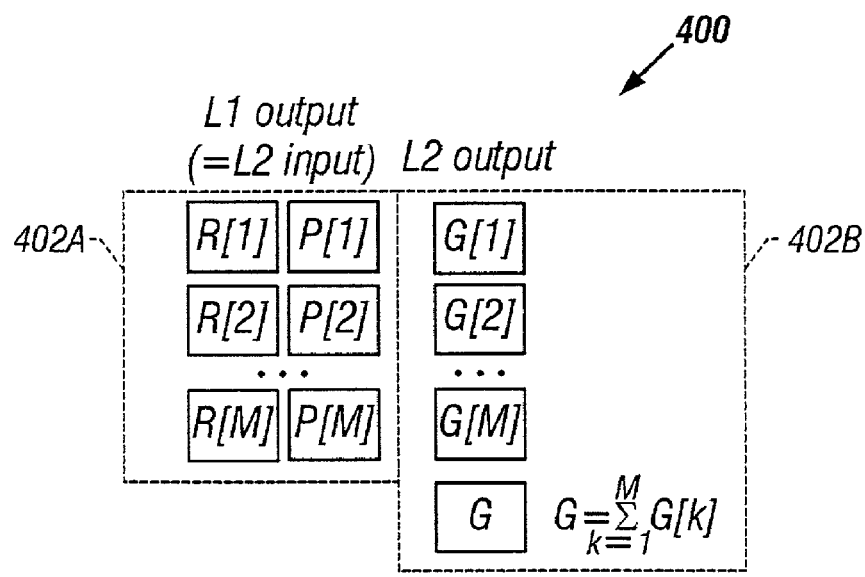
FIG. 19 depicts a hierarchically-arranged formal interface of an exemplary QoS-aware scheduler of the present invention.

FIG. 19 depicts a formal interface associated with an exemplary hierarchically-arranged, two-level QoS-aware scheduler 400 of the present invention. The scheduler 400 is decomposed into two logical partitions. A first level (L1) partition 402A includes appropriate means for preparing the requests and subpriorities (if applicable), wherein such means may be implemented based on the various arbiters, iteration strategies, and arbiter architectures described in detail hereinabove. Thus, in addition to the requests, the L1 scheduler can compute in one exemplary embodiment an internal subpriority number that reflects internal emergencies, such as sub-VOQ length, age of the oldest data, etc. Accordingly, the L1 scheduler constructs a Request matrix (R) and a subpriority matrix (P) for each QoS-based priority plane. This control information is provided to a second level (L2) scheduler 402B that actually computes the scheduling for each slot time. The outcome of L2 scheduler is a set of Grant matrices (G), one for each priority level. In one exemplary embodiment, the L1 scheduler is also responsible for determining whether a non-full transmission unit should be eligible for a request. To formalize the description of the QoS-aware scheduler of the present invention, the following notations will be used:

R[k] represents all requests made at an external, QoS-related priority level k, wherein k→1, 2, . . . , M. The element in row i and column j in R[k] (symbolically, $r_{i,j}[k]$) is the number of requests issued by input port i to output j at priority level k (i.e., from VOQ sub-queue k in VOQ group j in input port i).

P[k] represents a subpriority matrix at level k. The element in row i and column j in P[k] (symbolically, $p_{i,j}[k]$) is the subpriority number associated with the corresponding requests in R[k] due to an applicable internal priority scheme in effect.

The number of subpriority levels is arbitrary. The parameter MAX_SUBPRIORITY_LEVEL defines a predetermined maximum subpriority value.

G[k] represents the Grant matrix at priority level k. The element in row i and column j in G[k] (symbolically, $g_{i,j}[k]$) is the number of servers allocated to sub-VOQ k in VOQ group j in input port i. The number of servers used in output j to receive data from input port i is simply obtained by adding the M values of all G[k], resulting in element [i,j] in the total Grant matrix G.

Figure 20A:
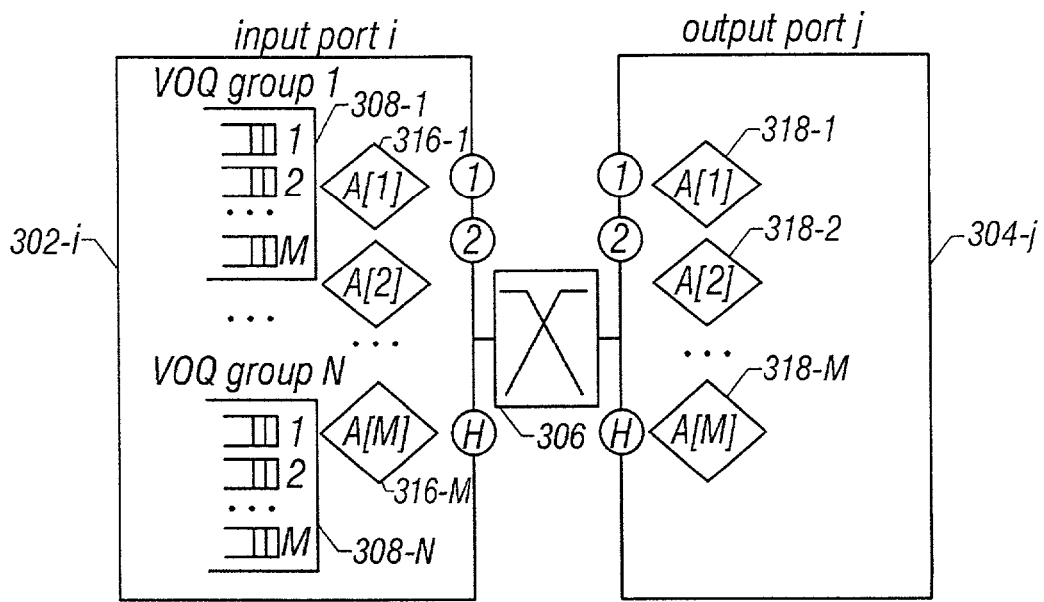
FIG. 20A illustrates a per-port arbiter architecture (monoselection) wherein M arbiters ("port arbiters") are provided per ingress port.

Two exemplary architectural implementations are possible, depending on the availability of arbiters. FIG. 20A depicts a monoselection architecture where M arbiters (A[1] 316-1 through A[M] 316-M) are provided per port, each of the arbiters dealing with an external priority level (per-port arbiter arrangement). In similar fashion, reference numerals 318-1 through 318-M refer to M egress arbiters per port. The ingress and egress arbiters are used to make $S_i$ number of sequential arbitrations, where $S_i$ is the number of available servers in the current iteration. At each step, the highest level active arbiter is selected.

Figure 20B:
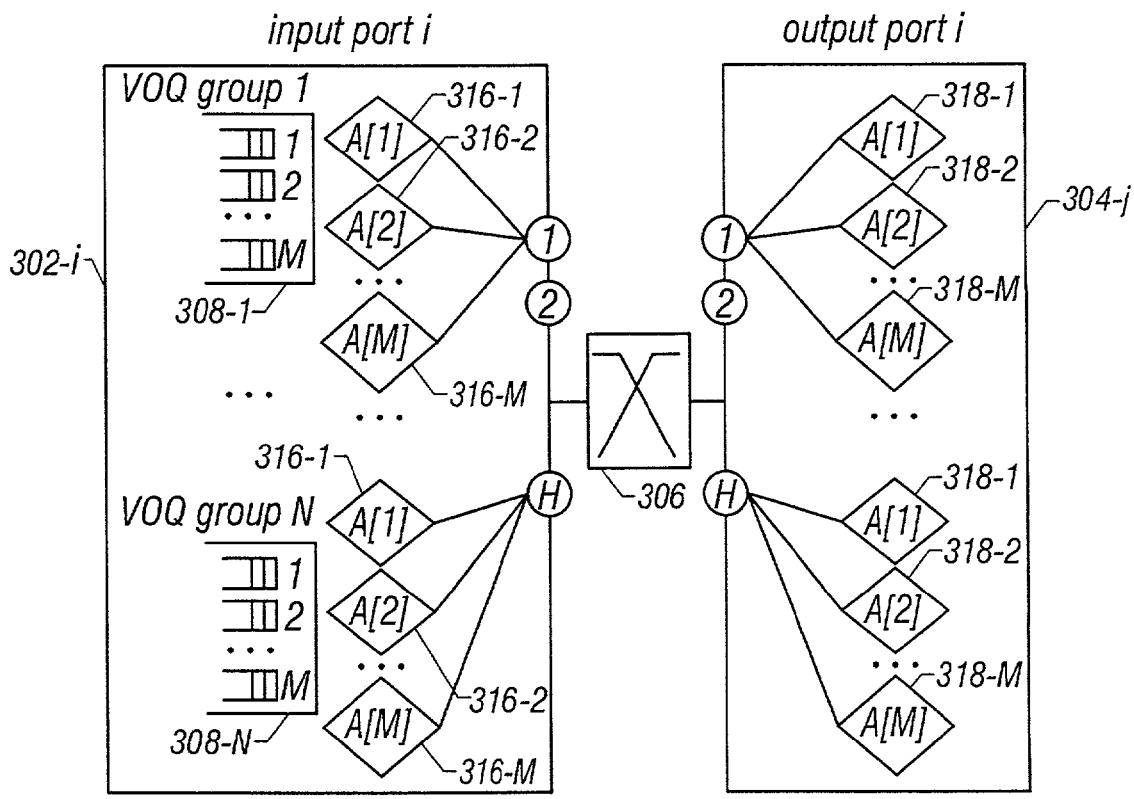
FIG. 20B illustrates a per-server arbiter architecture (multiselection) wherein M arbiters ("server arbiters") are provided for each server of an ingress port.

FIG. 20B illustrates a multiselection architecture where each server is associated with M arbiters (A[1] 316-1 through A[M] 316-M). Each of them is also responsible for a particular QoS-based priority plane (per-server arbiter arrangement). Since there are multiple arbiters per server, parallel arbitration can be advantageously implemented. However, as will be explained in greater detail below, the selection strategy that finalizes all the independent and conflicting arbitrations introduces a supplementary constraint that may offset the parallelization gain. Accordingly, the proposed strategy involves making a priority plane selection at the end of each "phase", after performing parallel selection and parallel minimization processes. The term "phase" as used herein refers to the scheduler strategy's control signals (i.e., requests and grants in the RG strategy and requests, grants and accepts in the RGA strategy). The minimization technique is essentially similar to the technique introduced in the iPP-RG methodology described earlier for generating a reduced arbiter request matrix. Basically, the technique collects all the arbitrations made in parallel and "minimizes" the aggregated totals so that they do not exceed the initial numbers. If the arbiters are well desynchronized (which will be described in greater detail hereinbelow as a further enhancement of the present invention), only a few arbitrations are lost in the process and the parallelization gain is maximized. Furthermore, it should be understood that the arbiters themselves may be implemented using any known arbiter technology (i.e., BTA, RRA, et cetera).

Figure 21:
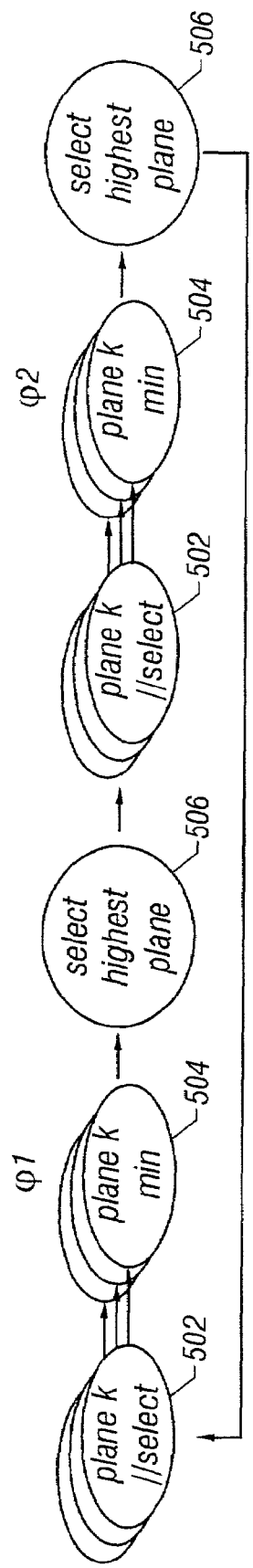
FIG. 21 illustrates an exemplary multiselection arbiter synchronization strategy provided in accordance with the teachings of the present invention.

FIG. 21 illustrates an exemplary mutliselection arbiter synchronization strategy. For each phase (φ1 or φ2), a parallel selection process 502 takes place across M priority planes. This process is followed by a parallel minimization process 504, again performed across the M priority planes. Control signals from the highest priority plane are selected (reference numeral 506), which will proceed to the next phase. This process continues through subsequent iteration cycles until a stop condition is encountered.

The operation of an exemplary two-level, QoS-aware scheduler with respect to the two arbiter arrangements (i.e., per-port monoselection architecture and per-server multiselection architecture) will now be described hereinbelow by way of a select number of iterations using a sample switch configuration. The configuration is the same in both arrangements: 4 ports, 4 servers, 4 levels of QoS-based priorities, 5 levels of internal subpriorities, and RG iteration strategy. FIG. 22 depicts the ingress ports' initial state in the exemplary 4-server/4-port switch. Reference numerals 602-1 through 602-4 refer to four VOQ groups, each destined for a corresponding output port. Each VOQ group includes four sub-queues, as there are 4 priority levels (M=4). By way of example, reference numerals 606-1 through 606-4 refer to the four sub-queues in the VOQ group 602-1. Reference numeral 608-1 refers to a tabular representation of all the requests and their subpriority numbers associated with input port 1, segmented in accordance with its VOQ groups. Reference numerals 610-1 through 610-4 refer to four tabular segments, each corresponding to its respective VOQ group. Each tabular segment includes an R column and a P column, for instance R column 612-1 and P column 612-2 provided for the tabular segment 610-1 that is associated with VOQ group 602-1. By way of example, the first element in the R column 612-1 indicates the number of requests from input port 1 to output port 1 (since VOQ group is 1), which requests have a QoS priority level of 1. Here, that number of requests is 1. The corresponding element in the P column 612-2 is the subpriority number, which is 2 in this instance. Likewise, the remaining tabular segments for input port 1 are populated. Reference numerals 608-2 through 608-4 refer to the cumulative tabular representations corresponding to the other three input ports, respectively.

FIG. 23A illustrates the various iteration matrices involved in the first iteration of the exemplary monoselection architectural scheme, wherein the Initial Request matrices R[1] through R[4] and Subpriority matrices P[1] through P[4] are simply the initial state data in matrix form, rearranged from the tabular representations shown in FIG. 22. At the beginning of the first iteration, all servers are available and each ingress arbiter therefore goes through 4 sequential steps. It should be recalled that in the illustrative per-port arrangement, there are four arbiters, one for each QoS priority plane, per each input port. In input port 1 and step 1, A[1] (priority level 1 arbiter) has to select between two requests, one from VOQ group 1 (i.e., destined to output port 1) and one from VOQ group 4 (i.e., destined to output port 4) ($r_{1,1}[1]$=1 and $r_{1,4}[1]$=1 in the R[1] matrix). Since the request from VOQ group 1 has a subpriority of 2 and the request from VOQ group 4 has a subpriority of 1 ($p_{1,1}[1]$=2 and $p_{1,4}[1]$=1 in the P[1] matrix), A[1] will select the request of VOQ group 1 because of its higher subpriority number. A[2] (priority level 2 arbiter) has to select from a total of four requests from three VOQ groups: 2 requests (with subpriority 0) from VOQ group 1; 1 request (with subpriority 4) from VOQ group 2; and 1 request (with subpriority 4) from VOQ group 3. A[2] will therefore arbitrate between VOQ groups 2 and 3, as the requests from them have the same subpriority of 4. For purposes of illustration, let us suppose that A[2] picks the request from VOQ group 2. With respect to priority plane 3, A[3] entertains requests from all VOQ groups, with subpriority number 1 for requests in VOQ group 1, 2, and 3, and subpriority number 0 for request from VOQ group 4. A[3] will arbitrate between VOQ groups 1, 2 and 3 only (as the pending requests therein have a subpriority number of 1 each) and let us suppose again that it picks the request from VOQ group 3. Finally, A[4] has 1 request from VOQ group 2 (with subpriority 2) and 3 requests from VOQ group 3 (with subpriority 1). A[4] will therefore pick the request from VOQ group 2 because it has the highest subpriority.

All the arbitrations set forth above are performed in parallel. Once the arbitrations are complete, the highest priority has to be finalized to finish step 1. Since A[1] made a selection, it is validated. Thus, the outcome of step 1 is the selection of one request of priority 1 from VOQ group 1. The state of A[1] is updated, whereas the states of the other arbiters (A[2], A[3] and A[4]) remain unchanged. In step 2, the selections in priority planes will be exactly the same, since their states have not changed. In plane 1, there is now only one request left (from VOQ group 4). It is therefore selected by A[1] regardless of its subpriority, and also in the finalization of step 2. Accordingly, the state of A[1] is updated again. In steps 3 and 4, A[1] has no more requests, thus makes no selections and does not update its state. A[3] and A[4] keep making the same selections as in steps 1 and 2, but will be preempted by A[2] selections. In step 3, A[2] arbitrates once more between VOQ groups 2 and 3, and picks VOQ group 2 again. This time, the selection is globally validated, and A[2] updates its state. In step 4, it will have to select between the remaining requests from VOQ group 3 (of subpriority number 4) and VOQ group 1 (of subpriority number 0). The VOQ group 3 is picked and the state of A[2] is accordingly updated. The result of phase 1 arbitration in input port 1 is the following: 2 selections at priority level 1 (VOQ groups 1 and 4) and 2 selections at priority level 2 (VOQ groups 2 and 3).

In input port 2, there are no requests at priority levels 1 and 2 (empty rows $r_{2,j}[1]$ and $r_{2,j}[2]$ in R[1] and R[2] matrices, respectively). At priority level 3, there is 1 request from VOQ group 1 (with subpriority number 3), 3 requests from VOQ group 2 (with subpriority number 2) and 1 request from VOQ group 4 (with subpriority number 2). In step 1, group 1 is selected because of its higher subpriority. In steps 2 and 3, A[3] will arbitrate between groups 2 and 4. Whatever its type (i.e., BTA, RRA, or other), A[3] should pick one request of each group in any order, and change its status twice. In step 4, VOQ group 4 has no more requests, so one more request from group 2 is picked and A[3] is accordingly updated again. In all steps, A[4] made the same selection between 1, 3, and 4 and was always ignored and not updated. The result of phase 1 arbitration in input port 2 is the following: 4 selections at priority level 3 (1 from VOQ group 1, 2 from VOQ group 2, and 1 from VOQ group 4).

In input port 3, there are requests only in priority plane 1, all with the same subpriority number of 0. A[1] will fairly pick one of each, changing its each time a selection is made. Its state therefore will return to the same initial state (since there are as many states as there are ports). In input port 4, there is only request in each priority plane. Accordingly, they will be selected by their respective arbiters regardless of their subpriorities. The priority level 1 request will be validated in step 1, the priority level 2 request in step 2, and so on. Upon completing the validated selections, each arbiter is updated once. In FIG. 23A, the selected requests issued by phase 1 of the RG strategy are collected into four Iteration Request (IR) matrices, each corresponding to a particular priority level.

The request selections validated in phase 1 (i.e., Request phase) are arbitrated in phase 2 (i.e., Grant phase) by output arbiters (not shown). In the present example, the same priorities are used in phase 2 as phase 1. In output port 1, there are 3 requests in priority level 1 and 1 request in priority level 3 (as can be seen from the first column of the corresponding IR[1] and IR[3] matrices). They are all granted in 4 steps, egress side A[1] changing its state three times and A[3] once. In output port 2, there are 5 requests in total. They are all granted, except for the lowest priority request (at priority level 4 from input 4). In output port 3, there are 3 requests (1 at level 1 and 2 at level 2). All these requests are granted by their respective egress A[1] and A[2] arbiters. In output port 4, there are 4 requests in total, 2 at level 1 and 2 at level 3, all of which are granted in 4 steps. Note that in phase 2 of the example illustrated herein, the subpriorities are not used and no arbitration is necessary either.

Figure 23B:
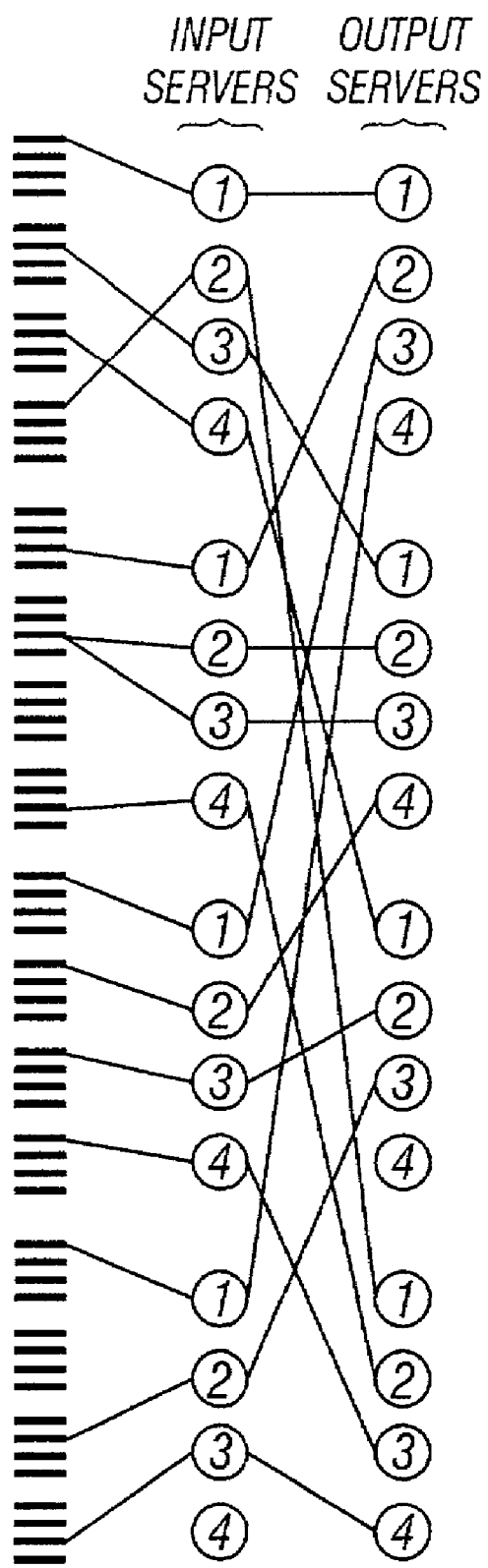
FIG. 23B illustrates the server connections after the first iteration of the exemplary monoselection scheme.

The grants issued by phase 2 of the RG strategy are collectively shown as four Iteration Match (IM) matrices in FIG. 23A, each corresponding to a particular QoS priority level. Summation of these IM matrices results in the Grant (G) matrix, whose elements represent the total number of matches between input port i and output port j. Recall that $g_{i,j} = \Sigma g_{i,j}[k]$, k=1, 2, 3, and 4. FIG. 23B illustrates the server connections based on the Grant matrix after the first iteration in the exemplary monoselection scheme.

Referring now to FIGS. 24A–24D, shown therein are four sets of the matrices relating to four iterations of an exemplary multiselection scheme of the present invention. For the sake of simplicity, ingress and egress arbiters are not shown in these FIGS. Again, the 4-server/4-port switch architecture with the initial port state shown in FIG. 22 is utilized for illustrative purposes. It should be apparent, accordingly, that the R[1]–R[4] and P[1]–P[4] matrices are the same as in the monoselection scheme. The individual multiselection iterations are set forth immediately below.

Iteration 1, Phase 1:

In input port 1, there are 2 requests at priority level 1, one directed to output port 1 and the other directed to output port 4. As before, the request directed to output port 1 has a subpriority number 2, while the request directed to output port 4 has a subpriority number 1. All four level-1 arbiters (A[1] arbiters, each corresponding to one server) are available and will therefore select the same request, i.e., the request directed to output port 1. The other arbiters will make certain selections, but they will be ignored because of the level 1 selection. Priority plane 1 minimization will validate only one arbiter choice for this subpriority-2, level-1 request. This validated selection appears as the first element (row 1 and column 1) in the IR[1] matrix shown in FIG. 24A.

In input port 2, A[1] and A[2] have no requests, as can be seen from the empty second rows of R[1] and R[2], respectively. The four available A[3] arbiters will all pick the request for output port 1 because it has the highest subpriority of 3. After the minimization, only one arbiter choice is validated. Selections by the A[4] arbiters are ignored altogether. In input port 3, there are several requests at priority level 1, all with the same subpriority of 0. The four A[1] arbiters will make a certain selection. For purposes of illustration, let us assume that three arbiters picked a request to output port 3, and the remaining one picked a request to output port 4. By minimization, only 2 choices for output port 3 can be validated. The phase 1 in input port 3 will therefore result in 2 requests for output port 3 and 1 request for output port 4. In input port 4, there is only one request at priority level 1, which is directed to output port 1. All arbiters will therefore select it and by minimization, only one choice is kept. Based on the above, it can be seen that at the end of phase 1 while IR[1] and IR[3] result in non-null matrices, IR[2] and IR[4] comprise null matrices.

Iteration 1, Phase 2:

In output port 1, there are three requests in total: two at level 1 and one at level 3. Since the two level-1 requests (one from input port 1 and the other from input port 4) have a different subpriority, all four available egress A[1] arbiters of output port 1 servers will pick the same request from input port 1 (by virtue of its higher subpriority number 2). After the minimization, this grant is validated, which appears as the [1,1] element in IM[1] and G[1] matrices of FIG. 24A.

In output port 2, there are no requests at any level, as can be seen from the empty second column of the respective IR[1]–IR[4] matrices. In output port 3, there are two level-1 requests from input port 3. All four A[1] egress arbiters will pick this input, so the two requests can be validated. Finally, in output port 4, only one request (level 1 request from input port 3) is present. It is therefore picked by all four A[1] arbiters and is validated subsequently. At the end of phase 2 of iteration 1, four matches have been finalized, all at QoS priority level of 1. Thus, while G[1] is non-empty, the remaining G[2]–G[4] matrices are null. As part of the wrap-up of iteration 1, these matches are added to the current scheduling matrices and are removed from the initial R matrices to obtain Remaining Request (RR) matrices (i.e., updating).

Iteration 2, Phase 1:

FIG. 24B depicts the various matrices associated with iteration 2 of the exemplary multiselection scheme, wherein RR[1]–RR[4] are the remaining request matrices at four priority levels. As pointed out earlier, the RR matrices are simply computed as $rr_{i,j}[k]=r_{i,j}[k]-g_{i,j}[k]$ (for remaining servers) as part of the Request matrix updating process at the end of each iteration. In input port 1, the other level-1 request (directed to output port 4) will be picked this time by the three available arbiters (one has been matched in iteration 1). The other levels are again ignored. In input port 2, the highest subpriority level-3 is selected exactly as in iteration 1. In input port 3, there is only one available server. Its A[1] arbiter will pick one of the requests to output port 1 (two requests), output port 2 (three requests), and output port 4 (four requests). There are no more requests to output port 3 because of the updating process. Let us assume that it picks a request to output port 2. In input port 4, the request with level 1 (directed to output port 1) is selected again, since this was not granted in phase 2 of iteration 1.

Iteration 2, Phase 2:

In phase 2, all requests are entertained by the respective egress arbiters (i.e., grants are issued), except the request at priority level 3 (from input port 2 in output port 1) which is preempted by the request at level 1. This adds three more matches to the scheduling, and input port 3 now has all its four servers matched. Thus, the remaining requests from input port 3 are erased or otherwise removed from further arbitration. The G[1]–G[4] matrices are summed over the first two iterations to obtain the current match status for respective levels. Also, RR[1]–RR[4] are updated for the next iteration.

Iteration 3, Phase 1:

FIG. 24C depicts the various matrices associated with iteration 3. In input 1, there are two available servers. The A[2] arbiters in these two servers will pick among the requests with subpriority 4 at level 2 (i.e., the requests to output ports 2 and 3). Let us assume that they do not choose the same request so the minimization does not eliminate any choice. Priority levels 3 and 4 are ignored once again. In input port 2, the same level-3 request with subpriority 2 is selected for the third time. In input port 3, no remaining requests are present and, therefore, no steps are taken. In input port 4, there are three requests, one at level 2 (to output port 3), one at level 3 (to output port 4) and one at level 4 (to output port 2). Clearly, the request at priority level 2 is selected. The IR matrices of FIG. 24C show these selections.

Iteration 3, Phase 2:

Output port 1 has only one request, at level 3 (from input port 2), and it is granted. Output port 2 also has only one request, at level 2 (from input port 1). This request is granted after the minimization of the three available A[2] egress arbiters. Output port 3 has two requests, both at level 2 (one from input port 1 and the other from input port 4). However, the request from input port 1 has a subpriority of 4, whereas the request from input port 4 has a subpriority of 0. Therefore, the request from input port 1 is granted. Three more matches have been found in iteration 3 which are added to the scheduling tables. Also, input port 1 is now fully matched and, accordingly, all remaining requests therefrom are removed.

Iteration 4, Phase 1:

FIG. 24D depicts the various matrices associated with iteration 4. In input port 2, there are four requests at level 3 and six requests at level 4. Accordingly, the level 3 requests are entertained, all of which have the same subpriority of 2. Three servers are still available. Therefore, the three A[3] ingress arbiters will arbitrate among these requests. For purposes of illustration, one of them could choose a request to output port 1 (out of a total of 3), and the two others could pick the same request to output port 4. The minimization process will discard one of these two picks. In input port 4, there are three requests, one each at priority levels 2 (to output port 3), 3 (to output port 4) and 4 (to output port 2). Clearly, the request to output port 3 at priority level 2 is chosen again.

Iteration 4, Phase 2:

All three validated requests, being unique in the output ports (i.e., output ports 2, 3, and 4), are granted. Thus, three more matches are added to the scheduling matrices. So far, 13 matches have been found in four iterations. Two more matches would be found if a fifth iteration were to be exemplified.

Based on the foregoing, it should be appreciated that the iterative scheduler species of the present invention, which are capable of operating advantageously in the context of multiserver, multi-arbiter architectures, can also be extended to cover QoS-driven traffic constraints as a further enhancement. Accordingly, suitable schedulers can be architected for managing high-speed QoS-aware optical routers deployed as part of the NGN infrastructure.

In setting forth the present invention's generalized scheduler methodology in particular detail hereinabove, one of the solutions has been to employ the multiselection arrangement wherein one arbiter per each server is utilized for effectuating parallel selection. It should be recognized by those skilled in the art that the number of iterations to converge in a parallel selection scheme can be rather high in certain implementations, especially when compared against a per-port arbiter arrangement that affords serial selection. However, the serial selection may take more time in spite of the fewer iterations. Accordingly, there is an incentive to harness the advantages of parallel selection while minimizing the amount of overall scheduling time.

As has been seen before in the case of perserver arbiter architectures, the server arbiters may sometimes issue more than one grant to a particular request, since they are independent. In the exemplary scheduling schemes set forth above, these extra grants are ignored by way of a minimization process, which leads to more iterations to find the maximal matching between ingress and egress ports. For instance, in an architecture with 16 ports and 4 servers on each port, an input i could make two requests to an output j. Three out of four egress server arbiters could select these requests, resulting in three grants for two requests. Hence, there is a wasted grant in output port j in this iteration.

The preferred exemplary solution to address this problem in accordance with the teachings of the present invention involves a desynchronization scheme wherein the state of server arbiters is controlled externally (rather than letting them update their states themselves) by following a predetermined rotating pattern in a desynchronized manner. The state of all the server arbiters is reset before each slot time, regardless of the previous selections and, hence, their states. It should be recognized that not only such a predetermined rotating pattern can be architected to guarantee fairness, but the hardware implementation is quite simple also.

The central idea is to initialize the server arbiters in an exactly desynchronized pattern for each time slot, and then shift the pattern so as to rotate the desynchronization. For purposes of illustration, a 4-port/2-server architecture (i.e., each port has 2 servers) will be described. FIG. 25 depicts a sample rotating pattern for the 4×4 switch. Each entry in the matrix gives the pattern that should be assigned to servers in the port indicated by the row number at the time slot computed by the column number (i.e., slot number modulo 4=column number), with an offset for the server number. The pattern is repeated the same way every 4 slots (4n, 4n+1, 4n+2, and 4n+3, where n=0, 1, 2, . . . ). FIG. 26 shows the initial state of the two arbiters in each output port for the first 3 time slots.

The above scheme can be further illustrated using RRAs, although any cyclic arbiter design may also be employed. At the start of each time slot, all RRAs are reset according to the predetermined rotating pattern. However, during the iterations, each arbiter still updates normally while making the selections. This simplifies the control logic compared to the scheme used in the conventional iSLIP methodology, where the RRAs are updated only after the first iteration and only if the grant was accepted. As shown in FIG. 25, the static rotating pattern can be represented as a matrix M saved in a suitable memory, e.g., a RAM structure. The arbiter [i][k] ($k^{th}$ arbiter in port i) is reset at each slot as M[i] [slot_number MOD N], where N is the number of ports and slot_number denotes the switch matrix's time slot number.

Favorable results have been obtained by way of several simulations using the desynchronization scheme, wherein the scheme has been compared to two other alternatives: per-server arbiters with no desynchronization (i.e., regular parallel selection described hereinbefore) and per-port arbiters (i.e., sequential selection). The simulations have involved the following scenarios: 16 ports with 4 and 16 servers, with a polarized Bernoulli traffic having polarization factors varying from 1.0 (uniform traffic) to 2.0 (highly polarized traffic). In each case, the maximum allowed number of iterations was set to 4. It has been observed that globally the desynchronization scheme improves the regular parallel solution, but without being as efficient as the sequential one (which is slower, however). The improvement increases with the number of servers, since the probability to waste grants by minimization also increases. With 16 servers, the average number of actual iterations used is reduced, and the throughput is also improved.

Based upon the foregoing Detailed Description, it should be apparent that the present invention advantageously provides an innovative multiserver-capable scheduler architecture that is suitable for application in tomorrow's high-speed networks where the transmission speeds are poised to overtake the nodal switching capacities. Various algorithmic species can be designed to suit different arbiter arrangements and architectures. Moreover, as has been illustrated above, the teachings of the present invention can also be practiced in QoS-aware networks.

It is believed that the operation and construction of the present invention will be apparent from the foregoing Detailed Description. While the exemplary embodiments of the invention shown and described have been characterized as being preferred, it should be readily understood that various changes and modifications could be made therein without departing from the scope of the present invention as set forth in the following claims.

What is claimed is:

1. A network element having a switching apparatus for switching information between a plurality of ingress ports and a plurality of egress ports via a cross-connect matrix disposed therebetween, comprising:

a plurality of ingress servers associated with each of said ingress ports, said ingress servers operating to serve a plurality of virtual output queues (VOQs) supported by a corresponding ingress port;

a plurality of egress servers associated with each of said egress ports, each of said egress servers operating to serve outgoing traffic supported by a corresponding egress port;

at least one ingress arbiter associated with each of said ingress ports and at least one egress arbiter associated with each of said egress ports, said at least one ingress arbiter and egress arbiter for effectuating a particular type of arbitration; and a scheduler operating to configure said cross-connect matrix for transporting a plurality of transmission units from at least one of said ingress ports to at least one of said egress ports during each time slot associated with said cross-connect matrix, wherein said scheduler effectuates a particular scheduling mechanism based at least in part upon an ingress arbiter architecture, an egress arbiter architecture and a predetermined arbitration iteration strategy.

2. The network element as set forth in claim 1, wherein said ingress arbiter architecture comprises a single arbiter per port arrangement.

3. The network element as set forth in claim 1, wherein said ingress arbiter architecture comprises a multiple arbiters per port arrangement.

4. The network element as set forth in claim 1, wherein said egress arbiter architecture comprises a single arbiter per port arrangement.

5. The network element as set forth in claim 1, wherein said egress arbiter architecture comprises a multiple arbiters per port arrangement.

6. The network element as set forth in claim 1, wherein said at least one ingress arbiter comprises a binary tree arbiter.

7. The network element as set forth in claim 6, wherein said binary tree arbiter is a reverting binary tree arbiter.

8. The network element as set forth in claim 6, wherein said binary tree arbiter is a non-reverting binary tree arbiter.

9. The network element as set forth in claim 1, wherein said at least one ingress arbiter comprises a round robin arbiter.

10. The network element as set forth in claim 1, wherein said at least one ingress arbiter comprises a flexible ring arbiter.

11. The network element as set forth in claim 1, wherein said at least one egress arbiter comprises a binary tree arbiter.

12. The network element as set forth in claim 11, wherein said binary tree arbiter is a reverting binary tree arbiter.

13. The network element as set forth in claim 11, wherein said binary tree arbiter is a non-reverting binary tree arbiter.

14. The network element as set forth in claim 1, wherein said at least one egress arbiter comprises a round robin arbiter.

15. The network element as set forth in claim 1, wherein said at least one egress arbiter comprises a flexible ring arbiter.

16. The network element as set forth in claim 1, wherein said predetermined arbitration iteration strategy includes a Request-Grant (RG) iteration strategy.

17. The network element as set forth in claim 1, wherein said predetermined arbitration iteration strategy includes a Request-Grant-Accept (RGA) iteration strategy.

18. The network element as set forth in claim 1, wherein requests associated with said VOQs are classified based on an internal priority condition.

19. The network element as set forth in claim 18, wherein said internal priority condition includes an age alarm.

20. The network element as set forth in claim 18, wherein said internal priority condition includes a "queue full" alarm.

21. The network element as set forth in claim 1, wherein said VOQs are classified based on a predetermined number of levels of a Quality of Service (QoS)-related priority condition.

22. The network element as set forth in claim 21, wherein each of said plurality of ingress servers and each of said plurality of egress servers are associated with a predetermined number of ingress arbiters and egress arbiters, respectively, said predetermined number of ingress and egress arbiters equaling said predetermined number of levels of said QoS-based priority condition.

23. The network element as set forth in claim 21, wherein each of said plurality of ingress ports and each of said plurality of egress ports are associated with a predetermined number of ingress arbiters and egress arbiters, respectively, said predetermined number of ingress and egress arbiters equaling said predetermined number of levels of said QoS-based priority condition.

24. The network element as set forth in claim 1, wherein each of said plurality of ingress servers is associated with a corresponding ingress arbiter and each of said plurality of egress servers is associated with a corresponding egress arbiter, said network element further including means to desynchronize initialization of said ingress arbiters and said egress arbiters at the beginning of each time slot.

25. A scheduling system for use in a network switching element having a cross-connect fabric disposed between a plurality of ingress ports and a plurality of egress ports, each of said ingress ports having a plurality of ingress servers and each of said egress ports having a plurality of egress servers, wherein each ingress port supports a plurality of virtual output queue groups (VOQ groups), each of said VOQ groups having sub-queues therein based on a Quality of Service (QoS) priority level, said scheduling system comprising:

a first level (L1) scheduler partition operable to generate requests in accord with an arbitration iteration strategy used in computing matches between said ingress servers and said egress servers, said requests being organized based on said QoS priority level; and a second level (L2) scheduler partition operating, in response to said requests assembled by said first level scheduler partition, to generate a scheduling matrix at each slot time associated with said cross-connect fabric, said scheduling matrix identifying matches between at least a portion of said ingress servers and a portion of said egress servers.

26. The scheduling system as set forth in claim 25, wherein said L1 scheduler partition includes a plurality of ingress arbiters, each corresponding to a particular QoS priority level.

27. The scheduling system as set forth in claim 26, wherein each of said ingress servers per said ingress port is associated with said plurality of ingress arbiters.

28. The scheduling system as set forth in claim 26, wherein each of said ingress ports is associated with said plurality of ingress arbiters.

29. The scheduling system as set forth in claim 26, wherein said ingress arbiters are comprised of round robin arbiters.

30. The scheduling system as set forth in claim 26, wherein said ingress arbiters are comprised of binary tree arbiters.

31. The scheduling system as set forth in claim 25, wherein said L2 scheduler partition includes a plurality of egress arbiters, each corresponding to a particular QoS priority level.

32. The scheduling system as set forth in claim 31, wherein each of said egress servers per said egress port is associated with said plurality of egress arbiters.

33. The scheduling system as set forth in claim 31, wherein each of said egress ports is associated with said plurality of egress arbiters.

34. The scheduling system as set forth in claim 31, wherein said egress arbiters are comprised of round robin arbiters.

35. The scheduling system as set forth in claim 31, wherein said egress arbiters are comprised of binary tree arbiters.

36. The scheduling system as set forth in claim 25, wherein said L1 scheduler partition includes means for prioritizing said requests based on an internal subpriority condition.

37. The scheduling system as set forth in claim 36, wherein said internal subpriority condition includes an age alarm.

38. The scheduling system as set forth in claim 36, wherein said internal subpriority condition includes a "queue full" alarm.

39. The scheduling system as set forth in claim 25, wherein said arbitration iteration strategy comprises a Request-Grant (RG) iteration strategy.

40. The scheduling system as set forth in claim 25, wherein said arbitration iteration strategy comprises a Request-Grant-Accept (RGA) iteration strategy.

41. A scheduling methodology for use in a network switching element having a cross-connect fabric disposed between a plurality of ingress ports and a plurality of egress ports, each of said ingress ports having a plurality of ingress servers and each of said egress ports having a plurality of egress servers, wherein each ingress port supports a plurality of virtual output queues (VOQs), said scheduling methodology comprising the steps:

for each matrix cycle associated with said cross-connect fabric, initializing a scheduling matrix and a request matrix, said request matrix for building requests associated with an arbitration iteration strategy used in computing matches between said ingress servers and egress servers;

performing an arbitration iteration to obtain a current match matrix;

updating said request matrix and said scheduling matrix based on said current match matrix;

if all of said plurality of ingress servers associated with a particular ingress port are matched, removing requests, issued from said particular ingress port, from said request matrix;

if all of said plurality of egress servers associated with a particular egress port are matched, removing requests, directed to said particular egress port, from said request matrix;

resetting said current match matrix and performing next arbitration iteration using said updated request matrix; and upon encountering a particular stop condition, terminating further iterations and forwarding said updated scheduling matrix to a controller for configuring at least one connection path in said cross-connect fabric based on said updated scheduling matrix so as to effectuate transfer of transmission units between matched ingress and egress servers.

42. The scheduling methodology as set forth in claim 41, wherein said arbitration iteration strategy comprises a Request-Grant (RG) iteration strategy.

43. The scheduling methodology as set forth in claim 41, wherein said arbitration iteration strategy comprises a Request-Grant-Accept (RGA) iteration strategy.

44. The scheduling methodology as set forth in claim 41, wherein said particular stop condition includes determining if no new matches were found in said next arbitration iteration.

45. The scheduling methodology as set forth in claim 41, wherein said particular stop condition includes determining if said updated request matrix is a null matrix.

46. The scheduling methodology as set forth in claim 41, wherein said particular stop condition includes determining if a predetermined maximum number of iterations has been reached.

47. The scheduling methodology as set forth in claim 41, wherein said particular stop condition includes determining if an iteration timeout has been reached.

48. The scheduling methodology as set forth in claim 41, wherein said requests are prioritized based an internal priority condition.

49. The scheduling methodology as set forth in claim 48, wherein said internal priority condition includes an age alarm.

50. The scheduling methodology as set forth in claim 48, wherein said internal priority condition includes a "queue full" alarm.

51. The scheduling methodology as set forth in claim 41, wherein said requests are classified based on a predetermined number of levels of a Quality of Service (QoS)-related priority condition.

52. The scheduling methodology as set forth in claim 41, wherein said transmission units include variable length Internet Protocol (IP) packets.

53. The scheduling methodology as set forth in claim 41, wherein said transmission units include fixed length cells.

54. The scheduling methodology as set forth in claim 41, wherein said transmission units include protocol data units (PDUs).

55. The scheduling methodology as set forth in claim 41, wherein said arbitration iteration is performed in accord with a multiserver, iterative SLIP algorithm.

56. The scheduling methodology as set forth in claim 41, wherein said arbitration iteration is performed in accord with a multiserver, iterative Ping Pong algorithm.

57. The scheduling methodology as set forth in claim 41, wherein said arbitration iteration is performed in accord with a multiserver, iterative dual round robin algorithm.

58. The scheduling methodology as set forth in claim 41, wherein said arbitration iteration is performed in accord with a multiserver, flexible ring dual round robin algorithm.

59. The scheduling methodology as set forth in claim 41, wherein said arbitration iteration is performed in accord with a multiserver, prioritized dual round robin algorithm.

* * * * *